US007752127B2

(12) United States Patent
Polk

(10) Patent No.: US 7,752,127 B2
(45) Date of Patent: Jul. 6, 2010

(54) APPARATUS AND METHODS FOR PROVIDING A NATIONAL PORTAL FOR ELECTRONIC SERVICES

(75) Inventor: John D. Polk, McLean, VA (US)

(73) Assignee: ACS State & Local Solutions, Inc., Teaneck, NJ (US)

( * ) Notice: Subject to any disclaimer, the term of this patent is extended or adjusted under 35 U.S.C. 154(b) by 1592 days.

(21) Appl. No.: 10/259,746

(22) Filed: Sep. 30, 2002

(65) Prior Publication Data

US 2004/0019545 A9  Jan. 29, 2004

Related U.S. Application Data

(60) Provisional application No. 60/325,200, filed on Sep. 28, 2001.

(51) Int. Cl.
G06F 40/00 (2006.01)
(52) U.S. Cl. ....................................................... 705/39
(58) Field of Classification Search .................. 705/40, 705/7, 39
See application file for complete search history.

(56) References Cited

U.S. PATENT DOCUMENTS

| 5,220,501 | A | | 6/1993 | Lawlor et al. |
| 5,245,368 | A | | 9/1993 | Farrell et al. |
| 5,590,360 | A | | 12/1996 | Edwards |
| 5,806,842 | A | | 9/1998 | Steinhilber et al. |
| 5,892,900 | A | | 4/1999 | Ginter et al. |
| 5,917,965 | A | | 6/1999 | Cahill et al. |
| 5,946,669 | A | | 8/1999 | Polk |
| 6,034,605 | A | | 3/2000 | March |
| 6,052,674 | A | | 4/2000 | Zervides et al. |
| 6,070,150 | A | | 5/2000 | Remington et al. |
| 6,119,107 | A | * | 9/2000 | Polk ............................ 705/40 |
| 6,233,428 | B1 | | 5/2001 | Fryer |
| 6,270,351 | B1 | | 8/2001 | Roper |
| 6,401,079 | B1 | | 6/2002 | Kahn et al. |
| 6,567,821 | B1 | | 5/2003 | Polk |
| 6,615,190 | B1 | | 9/2003 | Slater |
| 6,662,194 | B1 | * | 12/2003 | Joao ............................ 707/104.1 |
| 7,072,909 | B2 | | 7/2006 | Polk |
| 7,165,049 | B2 | | 1/2007 | Slater |

(Continued)

FOREIGN PATENT DOCUMENTS

WO    WO 00/46732    8/2000

OTHER PUBLICATIONS

Hendershott (Child Support Enforcement in West Virginia), West Virginia University, Department of Sociology and Anthropology), Dec. 2000, pp. 1-66.*

(Continued)

Primary Examiner—Romain Jeanty
(74) Attorney, Agent, or Firm—Finnegan, Henderson, Farabow, Garrett & Dunner LLP

(57) ABSTRACT

Apparatus and methods for providing a single location where an entity may conduct electronic services over a national portal. The entity includes an employer, a state, an employee, or any other entity. The electronic services include employee obligations, employee garnishments, new hire reporting, communications, call center, exception handling, regulation database, other databases, human resources, search engine, payments, disbursements, and future uses. Future uses includes additional users (e.g., additional entities) or additional uses (e.g., additional services).

18 Claims, 38 Drawing Sheets

U.S. PATENT DOCUMENTS

| | | | |
|---|---|---|---|
| 7,174,315 | B2 | 2/2007 | Phillips et al. |
| 7,225,155 | B1 | 5/2007 | Polk |
| 7,317,823 | B1 | 1/2008 | Price et al. |
| 2002/0046074 | A1 | 4/2002 | Barton |

OTHER PUBLICATIONS

U.S. District Court, District of Minnesota Civ. Action No. 02-CV-1321 DWF/JSM: *Pay Child Support Online Inc.* v. *ACS State & Local Solutions, Inc.*, ACS's Memorandum of Law in Support of Its Motion for Summary Judgment of Validity and Literal Infringement, 29 pages, Sep. 16, 2003 (Exhibit A).

U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Memorandum of Law Opposing Motion for Summary Judgment, 31 pages, Oct. 21, 2003 (Exhibit B).

U.S. District Court, District of Minnesota Civ. Action No. 02-CV-1321 DWF/JSM: *Pay Child Support Online Inc.* v. *ACS State & Local Solutions, Inc.*, ACS' Reply Memorandum in Support of its Motion for Summary Judgment of Validity and Literal Infringement, 22 pages, Oct. 28, 2003 (Exhibit C).

U.S. District Court, District of Minnesota Civ. Action No. 02-CV-1321 DWF/JSM: *Pay Child Support Online Inc.* v. *ACS State & Local Solutions, Inc.*, Order, 2 pages, Dec. 12, 2003 (Exhibit D).

U.S. District Court, District of Minnesota Civ. Action No. 02-CV-1321 DWF/JSM: *Pay Child Support Online Inc.* v. *ACS State & Local Solutions, Inc.*, ACS's Supplemental Brief on Obviousness in Support of ACS' Motion for Summary Judgment, 14 pages, Jan. 12, 2004 (Exhibit E).

U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Brief Regarding Obviousness, 10 pages, Jan. 12, 2004 (Exhibit F).

U.S. District Court, District of Minnesota Civ. Action No. 02-CV-1321 DWF/JSM: *Pay Child Support Online Inc.* v. *ACS State & Local Solutions, Inc.*, ACS's Response to the New Issues Raised in PCSO's Supplemental Brief on Obviousness, 8 pages, Jan. 23, 2004 (Exhibit G).

U.S. District Court, District of Minnesota Civ. Action No. 02-CV-1321 DWF/JSM: *Pay Child Support Online Inc.* v. *ACS State & Local Solutions, Inc.*, PCSO, PSI and Hill's Response to New Issued Raised by ACS, 3 pages, Jan. 29, 2004 (Exhibit H).

U.S. District Court, District of Minnesota Civ. Action No. 02-CV-1321 DWF/JSM: *Pay Child Support Online Inc.* v. *ACS State & Local Solutions, Inc.*, Memorandum Opinion and Order, 22 pages, Apr. 5, 2004 (Exhibit I).

U.S. District Court, District of Minnesota Civ. Action No. 02-CV-1321 DWF/JSM: *Pay Child Support Online Inc.* v. *ACS State & Local Solutions, Inc.*, Joint Motion for Entry of Order of Judgment, 6 pages, Jul. 22, 2004 (Exhibit J).

U.S. District Court, District of Minnesota Civ. Action No. 02-CV-1321 DWF/JSM: *Pay Child Support Online Inc.* v. *ACS State & Local Solutions, Inc.*, Order of Judgment, 3 pages, Jul. 28, 2004 (Exhibit K).

U.S. District Court, District of Minnesota Civ. Action No. 02-CV-1321 DWF/JSM: *Pay Child Support Online Inc.* v. *ACS State & Local Solutions, Inc.*, Judgment in a Civil Case, 2 pages, Jul. 29, 2004 (Exhibit L).

U.S. District Court of Delaware Civil Action No. 08cv00189-UNA; *JPMorgan Chase & Co., et al.* v. *Affiliated Computer Services, Inc., et al.*—Jeffrey Norwine's Objections and Responses to Defendant's Second amended Notice of Rule 30(b)(1) Deposition and Subpoena Duces Tecum of Jeffrey Norwine, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—Penny Joines's Objections and Responses to Defendant's Second amended Notice of Rule 30(b)(1) Deposition and Subpoena Duces Tecum of Penny Joines, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—Gregory Phillips's Objections and Responses to Defendant's Second amended Notice of Rule 30(b)(1) Deposition and Subpoena Duces Tecum of Gregory Phillips, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—Rebecca Deporte's Objections and Responses to Defendant's Second amended Notice of Rule 30(b)(1) Deposition and Subpoena Duces Tecum of Rebecca Deporte, dated Jun. 16, 2009 (13 pp.).

U.S. District Court of Delaware Civil Action No. 08cv00189-UNA; *JPMorgan Chase & Co., et al.* v. *Affiliated Computer Services, Inc., et al.*—ACS's Objections And Responses To Plaintiff's Notice to Take Deposition of Affiliated Computer Services, Inc. and ACS State and Local Solutions, Inc., dated May 26, 2009 (36 pp.).

U.S. District Court of Delaware Civil Action No. 08cv00189-UNA; *JPMorgan Chase & Co., et al.* v. *Affiliated Computer Services, Inc., et al.*—Stephen T. Schreiner's Objections and Responses to Defendant's Notice of Rule 30(b)(1) Deposition and Subpoena Duces Tecum of Stephen T. Schreiner, dated May 26, 2009 (7 pp.).

U.S. District Court of Delaware Civil Action No. 08cv00189-UNA; *JPMorgan Chase & Co., et al.* v. *Affiliated Computer Services, Inc., et al.*—Thomas Bradshaw's Objections and Responses to Defendant's Notice of Rule 30(b)(1) Deposition and Subpoena Duces Tecum of Thomas Bradshaw, dated May 26, 2009 (7 pp.).

U.S. District Court of Delaware Civil Action No. 08cv00189-UNA; *JPMorgan Chase & Co., et al.* v. *Affiliated Computer Services, Inc., et al.*—Kim Slater's Objections and Responses to Defendant's Notice of Rule 30(b)(1) Deposition and Subpoena Duces Tecum of Kim Slater, dated May 18, 2009 (12 pp.).

U.S. District Court of Delaware Civil Action No. 08cv00189-UNA; *JPMorgan Chase & Co., et al.* v. *Affiliated Computer Services, Inc., et al.*—Plaintiff's Objections to Defendant's Second Notice of Rule 30(b)(6) Deposition of Plaintiff JPMorgan, dated May 15, 2009 (19 pp.).

U.S. District Court of Delaware Civil Action No. 08cv00189-UNA; *JPMorgan Chase & Co., et al.* v. *Affiliated Computer Services, Inc., et al.*—Plaintiff's Objections to Defendant's First Notice of Rule 30(b)(6) Deposition of Plaintiff JPMorgan, dated May 15, 2009 (19 pp).

U.S. District Court of Delaware Civil Action No. 08cv00189-UNA; *JPMorgan Chase & Co., et al.* v. *Affiliated Computer Services, Inc., et al.*—Plaintiff's Answer to ACS's Third Amended Counterclaims, dated May 15, 2009 (18 pp.).

U.S. District Court of Delaware Civil Action No. 08cv00189-UNA; *JPMorgan Chase & Co., et al.* v. *Affiliated Computer Services, Inc., et al.*—Redacted Version of Defendant's Answer and Counterclaims to JPMorgan Chase's Second Amended Complaint for Declaratory Judgment and Patent Infringement, dated May 8, 2009.

U.S. District Court of Delaware Civil Action No. 08cv00189-UNA; *JPMorgan Chase & Co., et al.* v. *Affiliated Computer Services, Inc., et al.*—Plaintiff's First Supplemental Objections and Responses to Defendant's Fifth Set of Interrogatories, dated Jun. 5, 2009, (19 pp).

U.S. District Court of Delaware Civil Action No. 08cv00189-UNA; *JPMorgan Chase & Co., et al.* v. *Affiliated Computer Services, Inc., et al.*—Defendant's Objections to Plaintiff's Third Notice of Deposition of Defendants, dated Jun. 2, 2009, (24 pp).

Complaint for Declaratory Judgment and Patent Infringement, *JPMorgan Chase & Co. et al.* v. *Affiliated Computer Services, Inc. et al.*; (U.S.D.C. Del., Apr. 2008) (33 pp.).

"Child Support Application Banking Convention: A Guide for Child Support Enforcement Entities & Their Financial Institutions," Bankers EDI Council, (Mar. 28, 1997), (25 pp.).

Defense Finance and Accounting Service (www.dfas.mil), A Quick Guide to Working with the Military as an Employer, (15 pp.).

Defense Finance and Accounting Service (www.dfas.mil), Child Support and Alimony, (Apr. 11, 2003), (5 pp.).

Defense Finance and Accounting Service (www.dfas.mil), Commercial Debt Garnishment from Federal Civilian Employees, (Apr. 11, 2003), (6 pp.).

Defense Finance and Accounting Service (www.dfas.mil), Electronic Commerce, (Feb. 27, 2003), (4 pp.).

Defense Finance and Accounting Service (www.dfas.mil), Garnishment (Apr. 15, 2003), (4 pp.).

Defense Finance and Accounting Service (www.dfas.mil), Involuntary Allotment from Military Personnel for Commercial Debt, (Apr. 11, 2003), (5 pp.).
"Electronic Funds Transfer Project: Final Report," Washington State Department of Social Health Services, (Oct. 1994), (76 pp.).
"Electronic Funds Transfer/ Electronic Data Interchange," [Retrieved on Jun. 9, 2002], retrieved from the Internet at http://www.acf.dhhs.gov/programs/cse/pol/dc19328.htm, (Jun. 15, 1993), (7 p.).
"Electronic transfer of funds and data [online]," [Retrieved on Jun. 9, 2002], retrieved from the Internet at http://www.acf.dhhs.gov/programs/cse/pol/dc19013.htm, (May 24, 1990), (2 p.).
Graham et al., "The Employer Direct Deposit Pilot of the Iowa/Nebraska EFT Project," Colo., Policy Studies Inc., (Jun. 1992), (175 pp.).
Graham, N.L. & Levy, M.A., "Implementing a Child Support Payment Center," Colo., Policy Studies Inc., (Jan. 1991), (58 pp.).
Jessica Pearson, Ph.D., Evaluation of Colorado's Credit Bureau Reporting Initiative, (Apr. 25, 1997), (29 pp.).
National Child Support Enforcement Association, NCSEA News, Summer 1997 Conference Edition, vol. XXVII, No. 3 (4 pp.).
Nickerson, J.M. & Haby, E.M., "EFT Pilot Project Design for Iowa: The Iowa-Nebraska Electronic Funds Transfer Project," (Sep. 1988), (53 pp.).
Nickerson, J.M. & Haby, E.M., "EFT Pilot Project Design for Nebraska: The Iowa-Nebraska Electronic Funds Transfer Project," (Sep. 1988), (40 pp.).
Oracle EDI Gateway, User's Guide, ORACLE®, Release 11, (Mar. 1998), (246 pp.).
Oracle Human Resources, North American User's Guide, ORACLE®, Release 11, vol. 1, (Mar. 1998), (908 pp.).
Oracle Payroll, User's Guide, ORACLE®, Release 11, vol. 1, (Mar. 1998), (934 pp.).
Public Law 104-193, 110 Stat. 2105, 104th Congress, (Aug. 22, 1996), (251 pp.).
Public Law 100-485, 102 Stat. 2343, 100th Congress, (Oct. 13, 1988), (87 pp.).
U.S. District Court, District of Minnesota Civ. Action No. 02-CV-1321 DWF/SRN: *Pay Child Support Online Inc.* v. *ACS State & Local Solutions, Inc.*, Memorandum in Support of Plaintiff and Counter-Defendant's Motion to Dismiss, (Sep. 16, 2002), (26 pp.).
U.S. District Court, District of Minnesota Civ. Action No. 02-CV-1321 DWF/SRN: *Pay Child Support Online Inc.* v. *ACS State & Local Solutions, Inc.*, ACS State & Local Solutions, Inc.'s Opposition to the Motion to Dismiss of Pay Child Support Online Inc. and Daniel J. King, (Oct. 7, 2002), (28 pp.).
U.S. District Court, District of Minnesota Civ. Action No. 02-CV-1321 DWF/SRN: *Pay Child Support Online Inc.* v. *ACS State & Local Solutions, Inc.*, Memorandum Opinion and Order, (Dec. 2, 2002), (8 p.).
U.S. District Court, District of Delaware Civ Action No. 08-189-SLR: *JPMorgan Chase* v. *Affiliated Computer Services*, Answer to JP Morgan Chase's Complaint for Declaratory Judgment and Patent Infringement, (May 23, 2008), (26 pp.).
U.S. District Court of Delaware Civ. Action No. 08-189-SLR: *JPMorgan Chase* v. *Affiliated Computer Services*, Plaintiff's Objections and Responses to Defendants' First Set of Interrogatories, (Aug. 4, 2008), (27 pp.).
*Child Support Application Banking Convention*, The National Automated Clearing House Association, 1993, Herndon, VA (11 pages).
Summary of Apr. 14th APA ACH Committee, Apr. 19, 1994 (22 pages).
Letter by Pat Hagen, OCSE, Apr. 26, 1994 (2 pages).
Chapman, Irene, Speech for ERICSA (Eastern Region Interstate Child Support Association), New Orleans, Jun. 7, 1994 (13 pages).
Chapman, Irene, Summary of Jun. 8th Teleconference of the APA ACH Committee, Jun. 10, 1994 (2 pages).
Chapman, Irene, *Child Support & Withholding and Price Costco and the Family Perspective, The Corporate Connection*, May 1996 (4 pages).
Workshop Materials Houston Chapter of the American Payroll Association, Jul. 21, 1995 (63 pages).
Screen prints from City of Houston Payroll System, Jan. 23, 1996 (14 pages).

Zeidner, Rita, Comments, American Payroll Association, Mar. 22, 1996 (6 pages).
Lang, Scott, letter regarding *Child Support Application Banking Convention: A Guide for Employers & Their Financial Institutions*, Apr. 12, 1996 (4 pages).
Camp, Dave, Letter to James Owen, Meijer, Inc., Jun. 17, 1996 (1 page).
*Program Eases Child Support Payments for Colorado*, Aug. 15, 1996 (1 page).
Bryant, Amy, Memo to Alicia Key and Cecelia Burke, Office of the Attorney General of Texas, Feb. 27, 1997 (9 pages).
Bryant, Amy, EFT/EDI Deductions for Child Support, City of Houston, Mar. 30, 1997 (65 pages).
National Child Support Enforcement Association, "State Legislatures Address PRWORA'S Child Support Requirements," NCSEA News, Summer 1997, vol. 27, No. 3 (44 pages).
Bryant, Amy, *An Employer's View Point on What is Happening with Direct Deposit of Child Support*, NCSEA News, Summer 1997 (3 pages).
Amorette N. Bryant, Draft of Article for American Payroll Association, *First Hand Experience—Implementing Direct Deposit of Child Support Payments*, undated (6 pages).
*The Guide to Successful Direct Deposit*, 13$^{th}$ Ed., American Payroll Association, Mar. 1, 2000 (301 pages).
"Standing Tall For Children", Conference Notebook, NCSEA 46$^{th}$ Annual Conference & Exposition, Phoenix, Arizona, Aug. 1997 (453 pages).
Polk, John D., Centralized Collection/Disbursement, NCSEA Conference Notebook, Aug. 1997 (18 pages).
NCSEA 45th Conference Notebook, "Putting Children in the Winners Circle," Louisville, Kentucky, Aug. 1996 (434 pages).
John D. Polk, Central Payment Processing: a Sure Bet, NCSEA Conference Notebook, Louisville, Kentucky, Aug. 1996 (4 pages).
Office of Child Support Enforcement web page, Dec. 20, 1994 (12 pages).
U.S. District Court of Delaware Civil Action No. 08cv00189-UNA; *JPMorgan Chase & Co., et al.* v. *Affiliated Computer Services, Inc., et al.*—Complaint for Declaratory Judgment and Patent Infringement, (Apr. 4, 2008), (33 pp.).
U.S. District Court of Delaware Civil Action No. 08cv00189-UNA; *JPMorgan Chase & Co., et al.* v. *Affiliated Computer Services, Inc., et al.*—Letter dated Nov. 7, 2007 from ACS State and Local Solutions, Inc. to JPMorgan Chase & Co. regarding payment processing patents held by ACS State & Local Solutions, Inc., (1 p.), (Exhibit I).
U.S. District Court of Delaware Civil Action No. 08cv00189-UNA; *JPMorgan Chase & Co., et al.* v. *Affiliated Computer Services, Inc., et al.*—Letter dated Nov. 19, 2007 from JPMorgan Chase & Co., to ACS State and Local Solutions, Inc. regarding payment processing patents held by ACS State & Local Solutions, Inc. and Federal Express Receipt Tracking No. 790385857370, (2 pp.), (Exhibit J).
U.S. District Court of Delaware Civil Action No. 08cv00189-UNA; *JPMorgan Chase & Co., et al.* v. *Affiliated Computer Services, Inc., et al.*—Payment Processing Patents—Lotus Notes, Nov. 21, 2007, (1 p.), (Exhibit K).
U.S. District Court of Delaware Civil Action No. 08cv00189-UNA; *JPMorgan Chase & Co., et al.* v. *Affiliated Computer Services, Inc., et al.*—EPPICard—the safe and secure way to access your payments!, www.eppicard.com; (Apr. 3, 2008) (1 p.); Civil Cover Sheet (2 pp.): Civil Action No. 08-189, Acknowledgement Of Receipt for AO Form 85, Notice of Availability of a United States Magistrate Judge to Exercise Jurisdiction, (1 p.), (Exhibit L).
U.S. District Court of Delaware Civil Action No. 08cv00189-SLR; *JPMorgan Chase & Co., et al.* v. *Affiliated Computer Services, Inc., et al.*—Answer to JPMorgan Chase's Complaint for Declaratory Judgment and Patent Infringement, (May 23, 2008), (26 pp.).
U.S. District Court of Delaware Civil Action No. 08cv00189-SLR; *JPMorgan Chase & Co., et al.* v. *Affiliated Computer Services, Inc., et al.*—Answer to Counterclaims for Declaratory Judgment, (Jun. 2, 2008), (6 pp.).
U.S. District Court of Delaware Civil Action No. 08cv00189-SLR; *JPMorgan Chase & Co., et al.* v. *Affiliated Computer Services, Inc., et al.*—Defendant ACS's Unopposed Motion for Leave to Amend Answer and Counterclaims, (Aug. 4, 2008), (4 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's Complaint for Declaratory Judgment and Patent Infringement, (Aug. 8, 2008), (28 pp.); Certificate of Service, (1 p.).

U.S. District Court of Delaware Civil Action No. 08cv00189-SLR; *JPMorgan Chase & Co., et al.* v. *Affiliated Computer Services, Inc., et al.*—Answer to Amended Counterclaims for Declaratory Judgment and Patent Infringement, (Aug. 22, 2008), (11 pp.).

U.S. District Court of Delaware Civil Action No. 08cv00189-SLR; *JPMorgan Chase & Co., et al.* v. *Affiliated Computer Services, Inc., et al.*—Plaintiff's Motion for Leave to File Amended and Supplemental Complaint, (Aug. 28, 2008), (3 pp.).

U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (42 pp.).

U.S. District Court of Delaware Civil Action No. 08cv00189-SLR; *JPMorgan Chase & Co., et al.* v. *Affiliated Computer Services, Inc., et al.*—First Amended and Supplemental Complaint for Declaratory Judgment and Patent Infringement, (Aug. 28, 2008), (47 pp.), (Exhibit 2).

U.S. District Court of Delaware Civil Action No. 08cv00189-SLR; *JPMorgan Chase & Co., et al.* v. *Affiliated Computer Services, Inc., et al.*—[Proposed] Order, (__/__/08), (2 pp.); Rule 7.1.1 Statement, (Aug. 28, 2008), (2 pp.), (Exhibit 3).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 1—Exhibits A-F, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 2—Exhibits G-N, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Exhibits to First Amended and Supplemental Complaint for Declaratory Judgment and Patent Infringement—vol. 3—Exhibits O-P, (Aug. 28, 2008), (2 pp.).

U.S. District Court of Delaware Civil Action No. 08cv00189-SLR; *JPMorgan Chase & Co., et al.* v. *Affiliated Computer Services, Inc., et al.*—Letter dated Mar. 11, 2008 from ACS State and Local Solutions, Inc. to Lona S. Gros, CPPB regarding ACS Response to RFP for File No. O 51500 CP, Solicitation # 2223009 Centralized Collection Unit for the Department of Social Services, Office of Family Support, Support Enforcement Services, (filed Aug. 28, 2008), (325 pp.), (Exhibit O—Exhibit 1-11).

U.S. District Court of Delaware Civil Action No. 08cv00189-SLR; *JPMorgan Chase & Co., et al.* v. *Affiliated Computer Services, Inc., et al.*—States, Counties Automate Child Support Processing, 2008 Factiva, Inc., (Aug. 1, 1996), (filed Aug. 28, 2008), (4 pp.), (Exhibit P).

U.S. District Court of Delaware Civil Action No. 08cv00189-SLR; *JPMorgan Chase & Co., et al.* v. *Affiliated Computer Services, Inc., et al.*—Plaintiffs' Opening Brief in Support of Their Motion for Leave to File Amended and Supplemental Complaint, (Aug. 28, 2008), (10 pp.).

U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc. Answer and Counterclaims to JPMorgan Chase's First Amended and Supplemental Complaint for Declaratory Judgment and Patent Infringement, (Sep. 22, 2008), (34 pp.).

U.S. District Court of Delaware Civil Action No. 08cv00189-SLR; *JPMorgan Chase & Co., et al.* v. *Affiliated Computer Services, Inc., et al.*—Answer to ACS's Counterclaims to JPMorgan's First Amended and Supplemental Complaint for Declaratory Judgment and Patent Infringement, (Oct. 9, 2008), (12 pp.).

U.S. District Court of Delaware Civil Action No. 08cv00189-SLR; *JPMorgan Chase & Co., et al.* v. *Affiliated Computer Services, Inc., et al.*—Defendant ACS's Motion for Leave to File First Amended Answer and Counterclaims to JPMorgan's First Amended and Supplemental Complaint, (Dec. 10, 2008), (3 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Compliant for Declaratory Judgment and Patent Infringement, (Dec. 10, 2008), (39 pp.).

U.S. District Court of Delaware Civil Action No. 08cv00189-SLR; *JPMorgan Chase & Co., et al.* v. *Affiliated Computer Services, Inc., et al.*—First Amended Answer and Counterclaims to JPMorgan Chase's First Amended and Supplemental Complaint for Declaratory Judgment and Patent Infringement, (Dec. 10, 2008), (44 pp.), (Exhibit 2).

U.S. District Court of Delaware Civil Action No. 08cv00189-SLR; *JPMorgan Chase & Co., et al.* v. *Affiliated Computer Services, Inc., et al.*—[Proposed] Order and Rule 7.1.1 Statement, (Dec. 10, 2008), (5 pp.), (Exhibit 3).

U.S. District Court of Delaware Civil Action No. 08cv00189-SLR; *JPMorgan Chase & Co., et al.* v. *Affiliated Computer Services, Inc., et al.*—Defendant ACS's Opening Brief in Support of Motion for Leave to File First Amended Answer and Counterclaims, (Dec. 10, 2008), (12 pp.).

U.S. District Court of Delaware Civil Action No. 08cv00189-SLR; *JPMorgan Chase & Co., et al.* v. *Affiliated Computer Services, Inc., et al.*—Plaintiff JPMorgan's Answering Brief in Opposition to Defendant ACS's Motion for Leave to File a First Amended Answer and Counterclaims, (Jan. 9, 2009), (37 pp.).

U.S. District Court of Delaware Civil Action No. 08cv00189-SLR; *JPMorgan Chase & Co., et al.* v. *Affiliated Computer Services, Inc., et al.*—Declaration of Stephen T. Schreiner, Esq., in Support of Plaintiff JPMorgan's Answering Brief in Opposition to Defendant ACS's Motion for Leave to File a First Amended Answer and Counterclaims, (Jan. 9, 2009), (4 pp.).

U.S. District Court of Delaware Civil Action No. 08cv00189-SLR; *JPMorgan Chase & Co., et al.* v. *Affiliated Computer Services, Inc., et al.*—Direct Express® Debit MasterCard®, Financial Management Service, www.fms.treas.gov/directexpresscard/index.html, (Nov. 12, 2008), filed Jan. 9, 2009, (3 pp.), (Exhibit A).

U.S. District Court of Delaware Civil Action No. 08cv00189-SLR; *JPMorgan Chase & Co., et al.* v. *Affiliated Computer Services, Inc., et al.*—Treasury Announces Direct Express® Debit Card for SSA and SSI Recipients, Financial Management Service, www.fms.treas.gov/afc/jan_article3.html, (Feb. 21, 2008), filed Jan. 9, 2009, (3 pp.), (Exhibit B).

U.S. District Court of Delaware Civil Action No. 08cv00189-SLR; *JPMorgan Chase & Co., et al.* v. *Affiliated Computer Services, Inc., et al.*—Direct Express®, Debit Card Services for Federal Benefit Recipients, Financial Agency Agreement Between The Financial Management Service U.S. Department of the Treasury and Comerica Bank, Effective Date: Jan. 3, 2008, (44 pp.), (Exhibit C).

U.S. District Court of Delaware Civil Action No. 08cv00189-SLR; *JPMorgan Chase & Co., et al.* v. *Affiliated Computer Services, Inc., et al.*—eVerge Group—www.eVergeGroup.com—"eVerge Group Case Study—Affiliated Computer Services," (Jan. 9, 2009), (2 pp.). (Exhibit D).

U.S. District Court of Delaware Civil Action No. 08cv00189-SLR; *JPMorgan Chase & Co., et al.* v. *Affiliated Computer Services, Inc., et al.*—Supplemental Information Disclosure Statement and Substitute for Form 1449A PTO, (Dec. 30, 2004), (filed Jan. 9, 2009), (14 pp.), (Exhibit E).

U.S. District Court of Delaware Civil Action No. 08cv00189-SLR; *JPMorgan Chase & Co., et al.* v. *Affiliated Computer Services, Inc., et al.*—Electronic Information Disclosure Statement, (Jan. 9, 2009), (3 pp.), (Exhibit F).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Set of Requests for Production, (Jul. 16, 2008), (48 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Amended Set of Requests for Production, (Nov. 24, 2008), (46 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Second Set of Requests for Production, (Nov. 24, 2008), (55 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Third Set of Requests for Production, (Jan. 9, 2009), (18 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' First Set of Interrogatories, (Aug. 4, 2008), (30 pp.).

U.S. District Court of Delaware Civil Action No. 08cv00189-SLR; *JPMorgan Chase & Co., et al.* v. *Affiliated Computer Services, Inc., et al.*—Plaintiffs' Supplemental Objections and Responses to Defendants' Amended First Set of Interrogatories, (Nov. 3, 2008), (24 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Second Set of Interrogatories, (Sep. 15, 2008), (19 pp.).

U.S. District Court of Delaware Civil Action No. 08cv00189-SLR; *JPMorgan Chase & Co., et al.* v. *Affiliated Computer Services, Inc., et al.*—Plaintiffs' Supplemental Objections and Responses to Defendants' Amended Second Set of Interrogatories, (Nov. 3, 2008), (17 pp.).

U.S. District Court of Delaware Civil Action No. 08cv00189-SLR; *JPMorgan Chase & Co., et al.* v. *Affiliated Computer Services, Inc., et al.*—Plaintiffs' Objections and Responses to Defendants' Third Set of Interrogatories, (Nov. 24, 2008), (17 pp.).

U.S. District Court of Delaware Civil Action No. 08cv00189-SLR; *JPMorgan Chase & Co., et al.* v. *Affiliated Computer Services, Inc., et al.*—Plaintiffs' Initial Disclosures Pursuant to Fed. R. Civ. P. 26(a)(1), (Aug. 1, 2008), (15 pp.).

U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' First Set of Requests for Production of Documents to Defendants Affiliated Computer Services, Inc. and ACS State & Local Solutions Inc., (Jul. 17, 2008), (77 pp.).

U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' Second Set of Requests for Production of Documents to Defendants Affiliated Computer Services, Inc. and ACS State & Local Solutions, Inc., (Nov. 7, 2008), (74 pp.).

U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' First Set of Interrogatories to Defendants Affiliated Computer Services, Inc. and ACS State & Local Solutions, Inc., (Jul. 17, 2008), (37 pp.).

U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' First Amended and Consolidated Set of Interrogatories to Defendants Affiliated Computer Services, Inc. and ACS State & Local Solutions, Inc., (Nov. 7, 2008), (36 pp.).

U.S. District Court of Delaware Civil Action No. 08cv00189-SLR; *JPMorgan Chase & Co., et al.* v. *Affiliated Computer Services, Inc., et al.*—ACS's Objections and Responses to Plaintiffs' Second Set of Interrogatories to Defendants Affiliated Computer Services, Inc. and ACS State & Local Solutions, Inc., (Nov. 7, 2008), (17 pp.).

U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s Initial Disclosures, (Aug. 1, 2008), (17 pp.).

U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s First Supplemental Initial Disclosures, (Jan. 12, 2009), (14 pp.).

Kroener III, William F., Stored Value Cards and Other Electronic Payment Systems, FIL-59-96, Aug. 6, 1996, letter to Chief Executive Officer, (1 p.).

Federal Deposit Insurance Corporation—General Counsel's Opinion No. 8; Stored Value Cards and Other Electronic Payment Systems, 61 Federal Register 150, Aug. 2, 1996, pp. 40490-40494, (6 pp.).

Federal Deposit Insurance Corporation—Insurability of Funds Underlying Stored Value Cards and Other Nontraditional Access Mechanisms, 73 Federal Register 220, Nov. 13, 2008, pp. 67155-67157, (3 pp.).

Cason, Katherine L., Electronic Benefits Transfer: New Strategies for Improving Public Assistance Programs, Southern Rural Development Center Information Brief, No. 6, Dec. 1998, (6 pp.); http://srdc.msstate.edu/publications/brief6.pdf.

Letter to DiNuzzo, Joseph A., Insurance Coverage of Deposits for Which Insured Institution Acts as Fiscal Agent for Department of Treasury in Disbursing Social Security and Other Income to Recipients, FDIC-93-35, Jun. 28, 1993, (2 pp.); www.fdic.gov/regulations/laws/rules/4000-8240.html#tail.

National Child Support Enforcement Association, NCSEA News, Summer 1997 Conference Edition, vol. XXVII, No. 3 (4 pages).

Public Law 104-193-Aug. 22, 1996, 110 STAT. 2105, 104th Congress (251 pages).

Complaint for Declaratory Judgment and Patent Infringement, *JPMorgan Chase & Co. et al.* v. *Affiliated Computer Services, Inc. et al.*; (U.S.D.C. Del., Apr. 2008) (33 pages).

U.S. District Court of Delaware Civil Action No. 08cv00189-SLR; *JPMorgan Chase & Co., et al.* v. *Affiliated Computer Services, Inc., et al.*—Defendant ACS's Objections and Responses to Plaintiffs' Third Set of Requests for Production of Documents to Defendants Affiliated Computer Services, Inc. and ACS State & Local Solutions Inc., (Mar. 9, 2009), (52 pp.).

U.S. District Court of Delaware Civil Action No. 08cv00189-SLR; *JPMorgan Chase & Co., et al.* v. *Affiliated Computer Services, Inc., et al.*—Defendants Affiliated Computer Services, Inc. and ACS State & Local Solutions, Inc.'s Objections and Responses to Plaintiffs' Third Set of Interrogatories (Nos. 27-40), (Apr. 29, 2009), (44 pp.).

U.S. District Court of Delaware Civil Action No. 08cv00189-SLR; *JPMorgan Chase & Co., et al.* v. *Affiliated Computer Services, Inc., et al.*—Affiliated Computer Services, Inc. and ACS State & Local Solutions, Inc.'s Second Supplemental Initial Disclosures, (Apr. 21, 2009), (13 pp.).

U.S. District Court of Delaware Civil Action No. 08cv00189-SLR; *JPMorgan Chase & Co., et al.* v. *Affiliated Computer Services, Inc., et al.*—Plaintiffs' Fourth Supplemental Objections and Responses to Defendants' Amended First Set of Interrogatories (Nos. 1-6), (Apr. 24, 2009), (21 pp.).

U.S. District Court of Delaware Civil Action No. 08cv00189-SLR; *JPMorgan Chase & Co., et al.* v. *Affiliated Computer Services, Inc., et al.*—Answer to ACS's First Amended Counterclaims, (Mar. 18, 2009), (16 pp.).

U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), (Apr. 3, 2009), (46 pp.).

U.S. District Court of Delaware Civil Action No. 08cv00189-SLR; *JPMorgan Chase & Co., et al.* v. *Affiliated Computer Services, Inc., et al.*—Second Amended Answer and Counterclaims to JPMorgan Chase's First Amended and Supplemental Complaint for Declaratory Judgment and Patent Infringement (Redacted public version), (Apr. 3, 2009), (49 pp.).

U.S. District Court of Delaware Civil Action No. 08cv00189-SLR; *JPMorgan Chase & Co., et al.* v. *Affiliated Computer Services, Inc., et al.*—Second Amended and Supplemental Complaint for Declaratory Judgment and Patent Infringement, (Apr. 2, 2009), (45 pp.).

U.S. District Court of Delaware Civil Action No. 08cv00189-SLR; *JPMorgan Chase & Co., et al.* v. *Affiliated Computer Services, Inc., et al.*—Exhibits to Second Amended and Supplemental Complaint for Declaratory Judgment and Patent Infringement—vol. 3—Exhibits O-W, (Apr. 2, 2009), (2 pp.).

U.S. District Court of Delaware Civil Action No. 08cv00189-SLR; *JPMorgan Chase & Co., et al.* v. *Affiliated Computer Services, Inc., et al.*—Harry W. Wiggins, Prepared Statement of Harry W. Wiggins, Vice President, Child Support Services, Lockheed Martin IMS Children and Family Services Before the House Government Reform and Oversight Committee Human Resources Subcommittee—"Social Service Privatization: The Benefits and Challenges to Child Support Enforcement Programs", Federal Information Systems Corporation Federal News Service, Section: In the News (Nov. 4, 1997), (8 pp.), (Exhibit P).

U.S. District Court of Delaware Civil Action No. 08cv00189-SLR; *JPMorgan Chase & Co., et al. v. Affiliated Computer Services, Inc., et al.*—Steven Marjanovic, Bottomline Taps Lockheed to Market Software That Deducts Child Support, American Banker, Inc., The American Banker, Section: Technology/Operations; p. 15 (Jul. 12, 1996), (2 pp.). (Exhibit Q).

U.S. District Court of Delaware Civil Action No. 08cv00189-SLR; *JPMorgan Chase & Co., et al. v. Affiliated Computer Services, Inc., et al.*—PMR news briefs, IOMA Payrool Manager's Report, Section: p. 13 (Sep. 4, 1997), (3 pp.), (Exhibit R).

U.S. District Court of Delaware Civil Action No. 08cv00189-SLR; *JPMorgan Chase & Co., et al. v. Affiliated Computer Services, Inc., et al.*—States, Counties Automate Child Support Processing, 2008 Factiva, Inc., (Aug. 1, 1996), (3 pp.), (Exhibit S).

U.S. District Court of Delaware Civil Action No. 08cv00189-SLR; *JPMorgan Chase & Co., et al. v. Affiliated Computer Services, Inc., et al.*—Metropolitan Digest/Los Angeles County News In Brief: Los Angeles County; New Computer Keeps Track of Child Support Payments, The Times Mirror Company; Los Angeles Times, Section: Metro; Part B; p. 2; Metro Desk (Mar. 9, 1995), (2 pp.), (Exhibit T).

U.S. District Court of Delaware Civil Action No. 08cv00189-SLR; *JPMorgan Chase & Co., et al. v. Affiliated Computer Services, Inc., et al.*—Carla Rivera, Electronic Child Support System Unveiled; Government: Critics Say New Computer System Is Plagued With Problems and May Be Inadequate. A Few Bugs Just Need To Be Worked Out, District Attorney Responds, The Times Mirror Company; Los Angeles Times, Section: Metro: Part B; p. 1; Metro Desk (Mar. 10, 1995), (3 pp.), (Exhibit U).

U.S. District Court of Delaware Civil Action No. 08cv00189-SLR; *JPMorgan Chase & Co., et al. v. Affiliated Computer Services, Inc., et al.*—Dan Morain, State to Stay With Child-Support Computer Setup; Technology: Tracking System Is Incomplete And Consultant Lists 1,400 Problems, But Official Defends Project, Times Mirror Company; Los Angeles Times, Section: Part A; p. 3; Metro Desk (May 2, 1997), (3 pp.). (Exhibit V).

U.S. District Court of Delaware Civil Action No. 08cv00189-SLR; *JPMorgan Chase & Co., et al. v. Affiliated Computer Services, Inc., et al.*—Lockheed Martin IMS Retains Landmark Child Support Payment processing Contract in Los Angeles County; * Awarded three-year, $24 million contact * Processes more than $350 million annually for Los Angeles County * Is nation's oldest, privatized child support payment processing operation, PR Newswire Association, Inc., PR Newswire, Section: State and Regional News (Dec. 4, 2000), (3 pp.), (Exhibit W).

U.S. District Court of Delaware Civil Action No. 08cv00189-SLR; *JPMorgan Chase & Co., et al. v. Affiliated Computer Services, Inc., et al.*—Attachment A1, U.S. Patent No. 7,317,823 Claim Chart (ACS's Identification of Prior Art, '823 Patent), (23 pp.).

U.S. District Court of Delaware Civil Action No. 08cv00189-SLR; *JPMorgan Chase & Co., et al. v. Affiliated Computer Services, Inc., et al.*—Attachment A2, U.S. Patent No. 5,917,965 Claim Chart (ACS's Identification of Prior Art, '965 Patent), (60 pp.).

U.S. District Court of Delaware Civil Action No. 08cv00189-SLR; *JPMorgan Chase & Co., et al. v. Affiliated Computer Services, Inc., et al.*—Attachment A3, Access Card '190 (51 pp.).

U.S. District Court of Delaware Civil Action No. 08cv00189-SLR; *JPMorgan Chase & Co., et al. v. Affiliated Computer Services, Inc., et al.*—Attachment A4, Access Card '049 (36 pp.).

U.S. District Court of Delaware Civil Action No. 08cv00189-SLR; *JPMorgan Chase & Co., et al. v. Affiliated Computer Services, Inc., et al.*—Attachment A5, Access Card '315 (36 pp.).

U.S. District Court of Delaware Civil Action No. 08cv00189-SLR; *JPMorgan Chase & Co., et al. v. Affiliated Computer Services, Inc., et al.*—Attachment A6, DPC '190 (58 pp.).

U.S. District Court of Delaware Civil Action No. 08cv00189-SLR; *JPMorgan Chase & Co., et al. v. Affiliated Computer Services, Inc., et al.*—Attachment A7, DPC '049 (39 pp.).

U.S. District Court of Delaware Civil Action No. 08cv00189-SLR; *JPMorgan Chase & Co., et al. v. Affiliated Computer Services, Inc., et al.*—Attachment A8, DPC '315 (33 pp.).

U.S. District Court of Delaware Civil Action No. 08cv00189-SLR; *JPMorgan Chase & Co., et al. v. Affiliated Computer Services, Inc., et al.*—Attachment A9, SAS '190 (68 pp.).

U.S. District Court of Delaware Civil Action No. 08cv00189-SLR; *JPMorgan Chase & Co., et al. v. Affiliated Computer Services, Inc., et al.*—Attachment A10, SAS '049 (43 pp.).

United States District Court for the District of Delaware, Civil Action No. 08-189-SLR (*JPMorgan Chase & Co. et al. v. Affiliated Computer Services, Inc., and ACS State & Local Solutions, Inc.*), "Stipulation of Partial Dismissal Pursuant to Fed. R. Civ. P. 41(a)(1)(A)(ii) Based on Covenant and Agreement Not to Sue," dated Jul. 27, 2009 (5 pp.).

United States District Court for the District of Delaware, Civil Action No. 08-189-SLR (*JPMorgan Chase & Co. et al. v. Affiliated Computer Services, Inc., and ACS State & Local Solutions, Inc.*), "Stipulation of Partial Dismissal Pursuant to Fed. R. Civ. P. 41(a)(1)(A)(ii) Based on Covenant and Agreement Not to Sue," dated Nov. 17, 2009 (7 pp.).

* cited by examiner

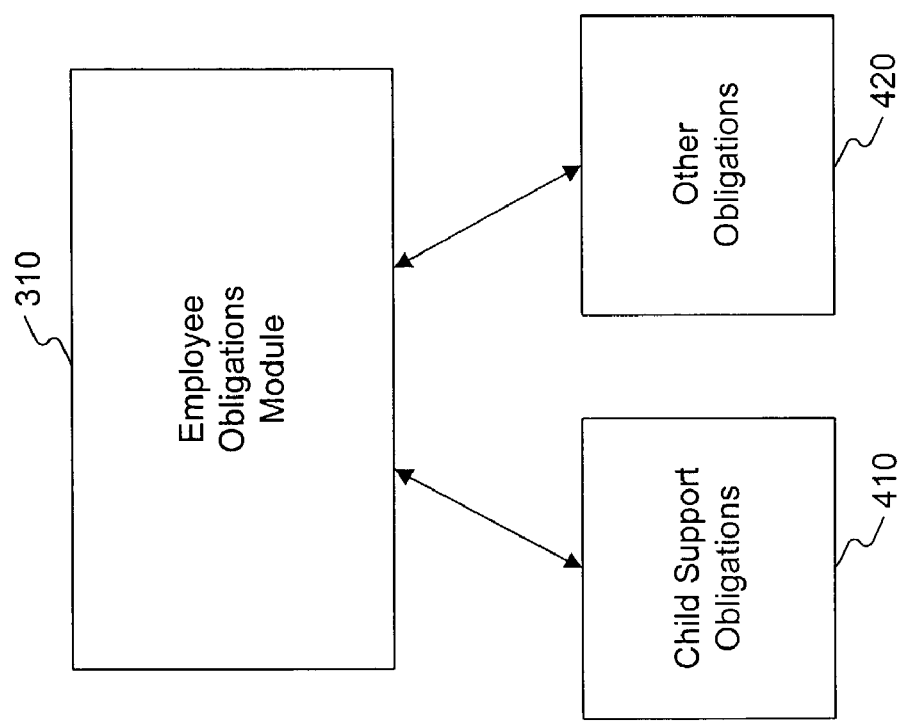

APPARATUS AND METHODS FOR PROVIDING A NATIONAL PORTAL FOR ELECTRONIC SERVICES

This application claims priority under 35 U.S.C. §119 based on U.S. Provisional Application No. 60/325,200, filed Sep. 28, 2001, the complete disclosure of which is incorporated herein by reference.

DESCRIPTION OF THE INVENTION

1. Field of the Invention

The present invention relates to apparatus and methods for providing electronic services. In particular, the present invention relates to apparatus and methods for a national portal to provide electronic services.

2. Background of the Invention

Currently, employers must access a host of different electronic services to conduct day-to-day operations. These operations include electronic communications, payment requirements, reporting requirements, and other mandatory and permissive payment and reporting obligations. Examples of electronic communications include email and other types of electronic communications. Examples of payment and reporting obligations include the payment of taxes, the payment of employee child support obligations, the payment of employee garnishments, the reporting of newly hired employees, registration of vehicles, and the payment of parking fees or tickets. There is a need for a system that allows an employer to access a single site for these electronic services. There is also a need for a system that allows others (such as employees, states, banks, and others) to access this site.

This invention addresses the need for a system for providing electronic services over a national portal.

SUMMARY OF THE INVENTION

The apparatus and methods consistent with the present invention overcome the shortcomings of conventional systems by providing a single location, or "portal," where an entity may obtain electronic services.

In an embodiment of the invention, a method for providing electronic services at a national portal may include receiving at the national portal an electronic communication from an employer, interacting with a government agency to process the communication, and processing the communication at the national portal.

Exemplary apparatus and methods consistent with the present invention are recited in the attached claims. It is to be understood that both the foregoing general description and the following detailed description are exemplary and explanatory only and are not restrictive of the invention, as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the following description, serve to explain the principles of the invention. In the drawings:

FIG. 4 is a block diagram of one embodiment of the employee obligations module, as shown in FIG. 3;

DESCRIPTION OF THE EMBODIMENTS

Introduction

The systems and processes consistent with the principles of the present invention as disclosed herein provide for a single location, or "portal," where an entity located anywhere in the nation may obtain electronic services.

These electronic services may include electronic communications, payment requirements, reporting requirements and other mandatory and permissive payment and reporting obligations. In one embodiment, the portal is a national portal known as the National Employer Service Center (NESC). In one implementation of this embodiment, the NESC is a national portal on the World Wide Web of the Internet. The NESC may provide for processing of applications, databases, and standards that may be utilized by employers, states, employees, banks, and others. The term "state" as used herein means an agency or other portion of a state government, and the term "others" may include any third party. The NESC may be used as a central location for these users to process information, including financial information as well as any other data. However, it should be recognized that these embodiments and implementations are merely exemplary, and other implementations may also be used.

Systems

Figure 1A:
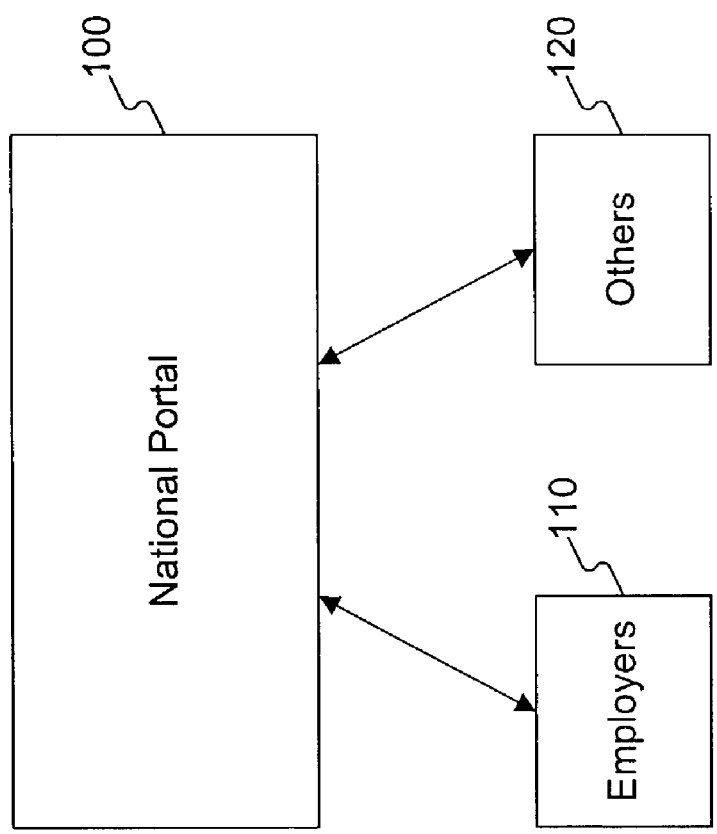
FIGS. 1A-1E are block diagrams of some of the embodiments of a national portal.

FIG. 1A is a block diagram of one embodiment of a national portal. As shown in FIG. 1A, national portal 100 may be utilized by employers 110 and by others 120.

Figure 1B:
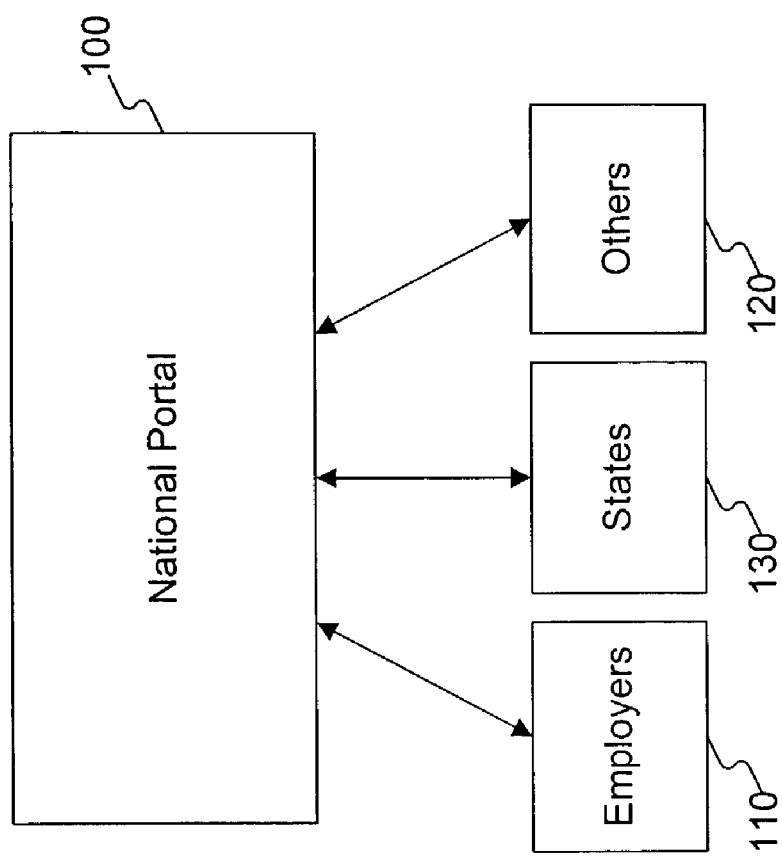

FIG. 1B is a block diagram of another embodiment of a national portal. As shown in FIG. 1B, national portal 100 may be accessed by employers 110, states 130, and others 120. In the embodiment of FIG. 1B, employers 110 may access the national portal 100 for electronic services. Some of these services may include services that require interaction with states 130 or other government agencies. National portal 100 as shown in FIG. 1B, therefore, may allow employers 110 to access one or more states 130. Similarly, employers 110 may access other entities 120 via national portal 100. These other entities 120 may include employees, banks, local government agencies, and any other entity.

Figure 1C:
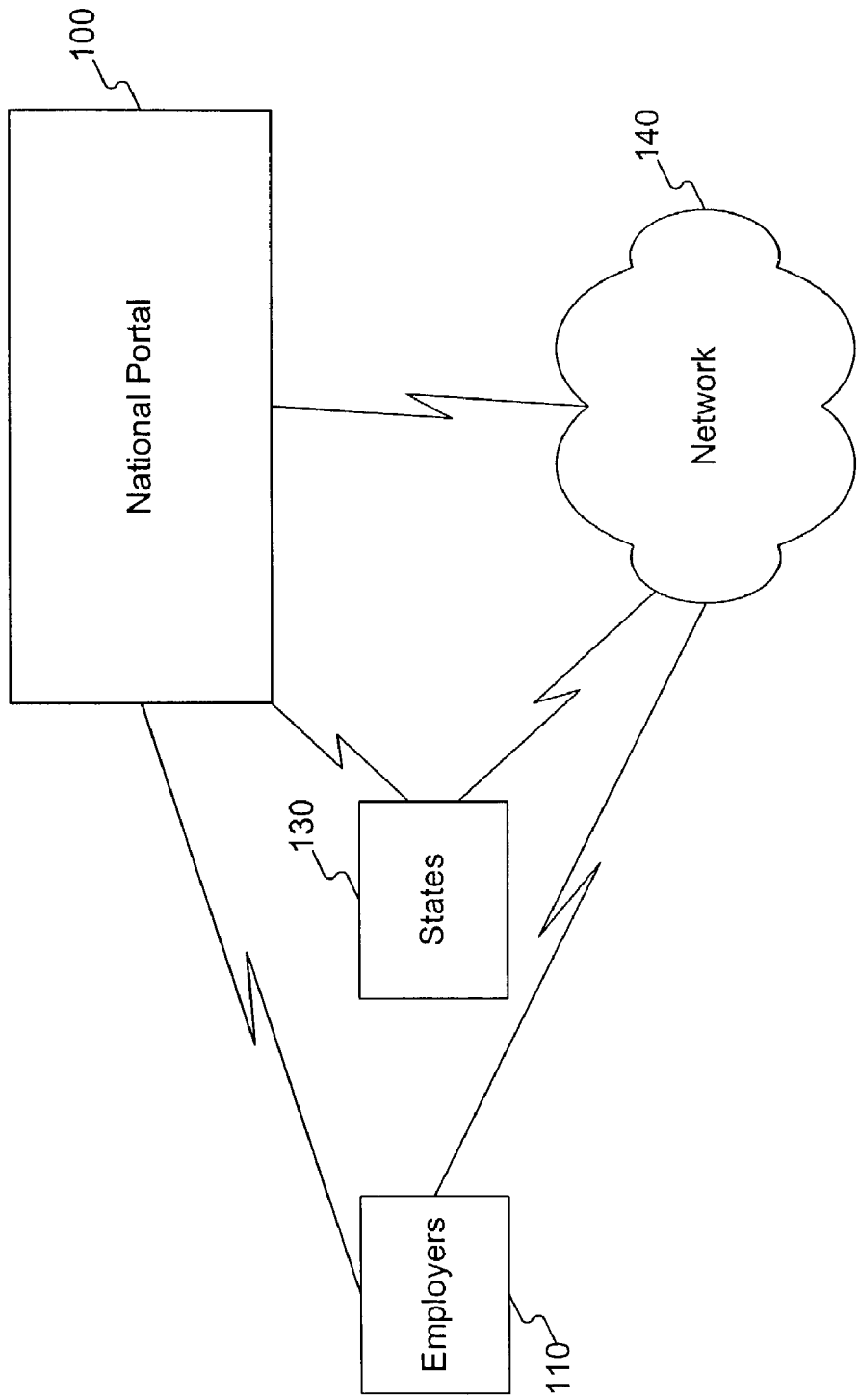

FIG. 1C is a block diagram of another embodiment of a national portal. As shown in FIG. 1C, employers 110 and states 130 may access national portal 100. In addition, employers 110 and states 130 may access a network 140 connected to national portal 100. In this embodiment, employers 110 and states 130 may access national portal 100 directly, or via network 140 (such as the Internet or any other network). Therefore, in this embodiment, employers 110 and states 130 may have at least two ways to access the national portal. However, other ways may also be used. For example, in addition to a direct connection or an indirect connection via network 140, employers 110 and states 130 (and any other entity 120) may also access the national portal by other ways, such as, for example, a dial-up connection, FTP, e-mail, e-mail using an attachment, delivery of a tape, delivery of paper, or by facsimile. Other ways of transmission are also included within the scope of the invention.

Figure 1D:
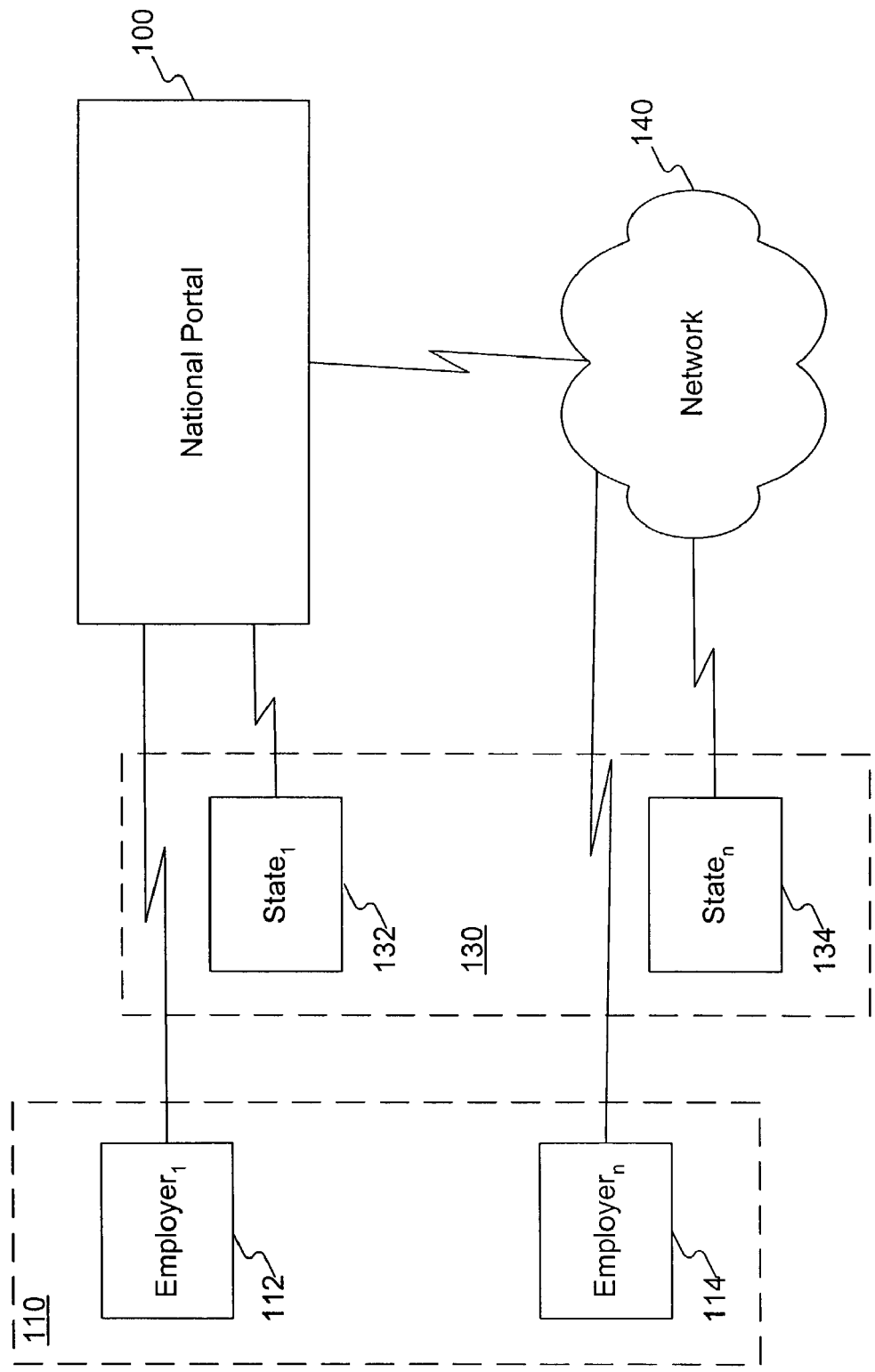

FIG. 1D is a block diagram of another embodiment of a national portal. As shown in FIG. 1D, employers 110 and states 130 may have access to the national portal directly or via the network, as shown in FIG. 1C. In FIG. 1D, however, employers 110 and states 130 may have both direct access to national portal 100 and indirect access to national portal 100 via network 140. FIG. 1D also illustrates that more than one employer and more than one state may have access to the national portal. As shown in FIG. 1D, employer$_1$ 112 and state$_1$ 132 may have direct access to national portal 100. However, employer$_n$ 114 may have access to national portal 100 via network 140, and state$_n$ 134 may also have access to national portal 100 via network 140. As shown in FIG. 1D, moreover, any number of employers (employers$_n$ 114) or any number of states (states$_n$ 134) may have access to national portal 100, either directly (not shown) or via network 140 (shown).

Figure 1E:
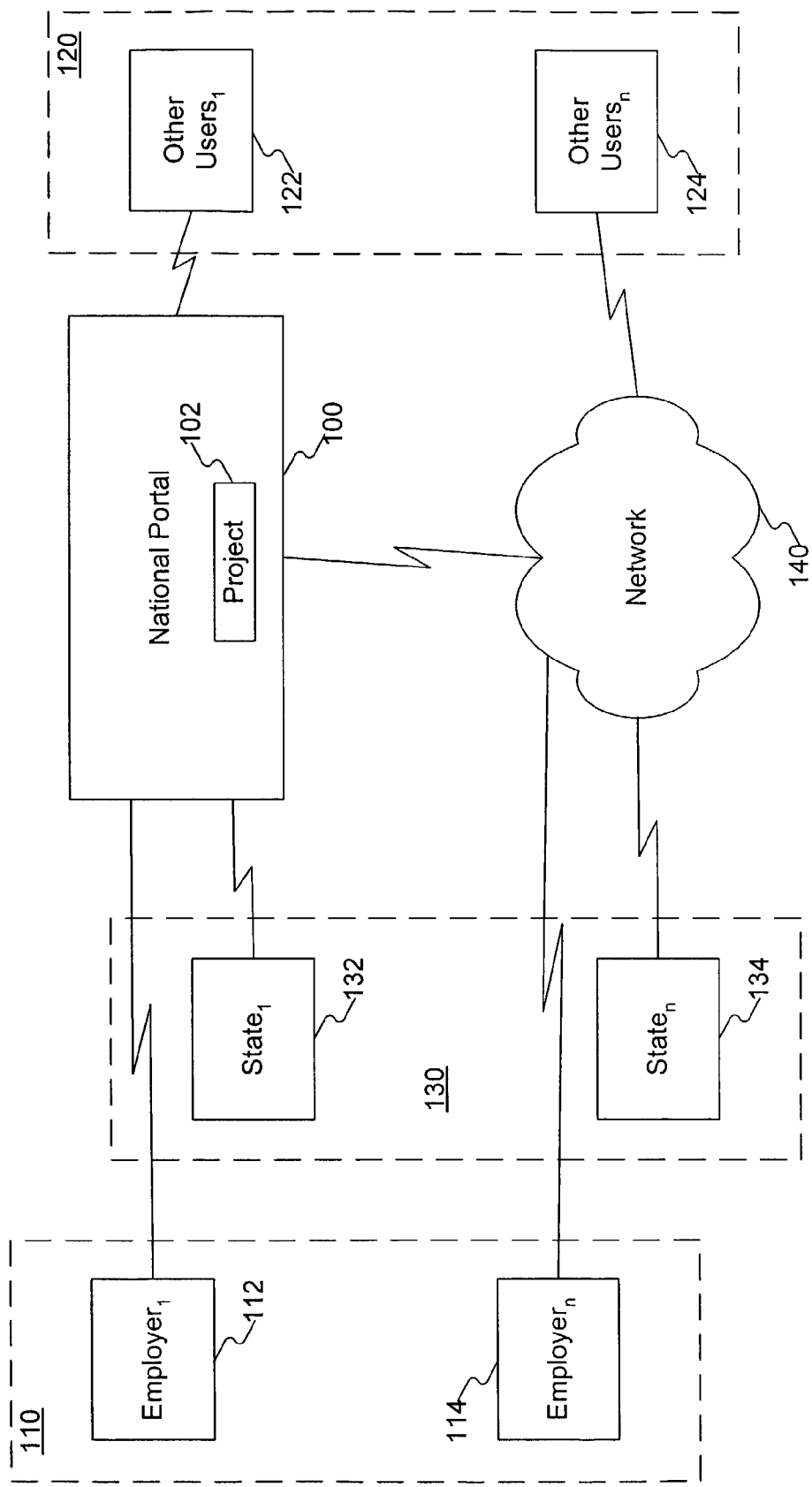

FIG. 1E is a block diagram of another embodiment of a national portal. As shown in FIG. 1E, employers 110 and states 130 may have direct access to national portal 100, and employers 110 and states 130 may have indirect access to the national portal via network 140. FIG. 1E also shows that other users 120 may have access to the national portal, either direct access or indirect access via the network. Other users$_1$ 122 may have direct access to national portal 100, and other users$_n$ 124 may have indirect access to national portal 100 via the network 140. FIG. 1E also shows that national portal 100 may contain one or more projects 102. Project 102 at national portal 100 may include an application such as garnishment of wages, or other type of activity that may be performed by national portal 100 for employers 110, states 130, or other users 120.

Figure 2A:
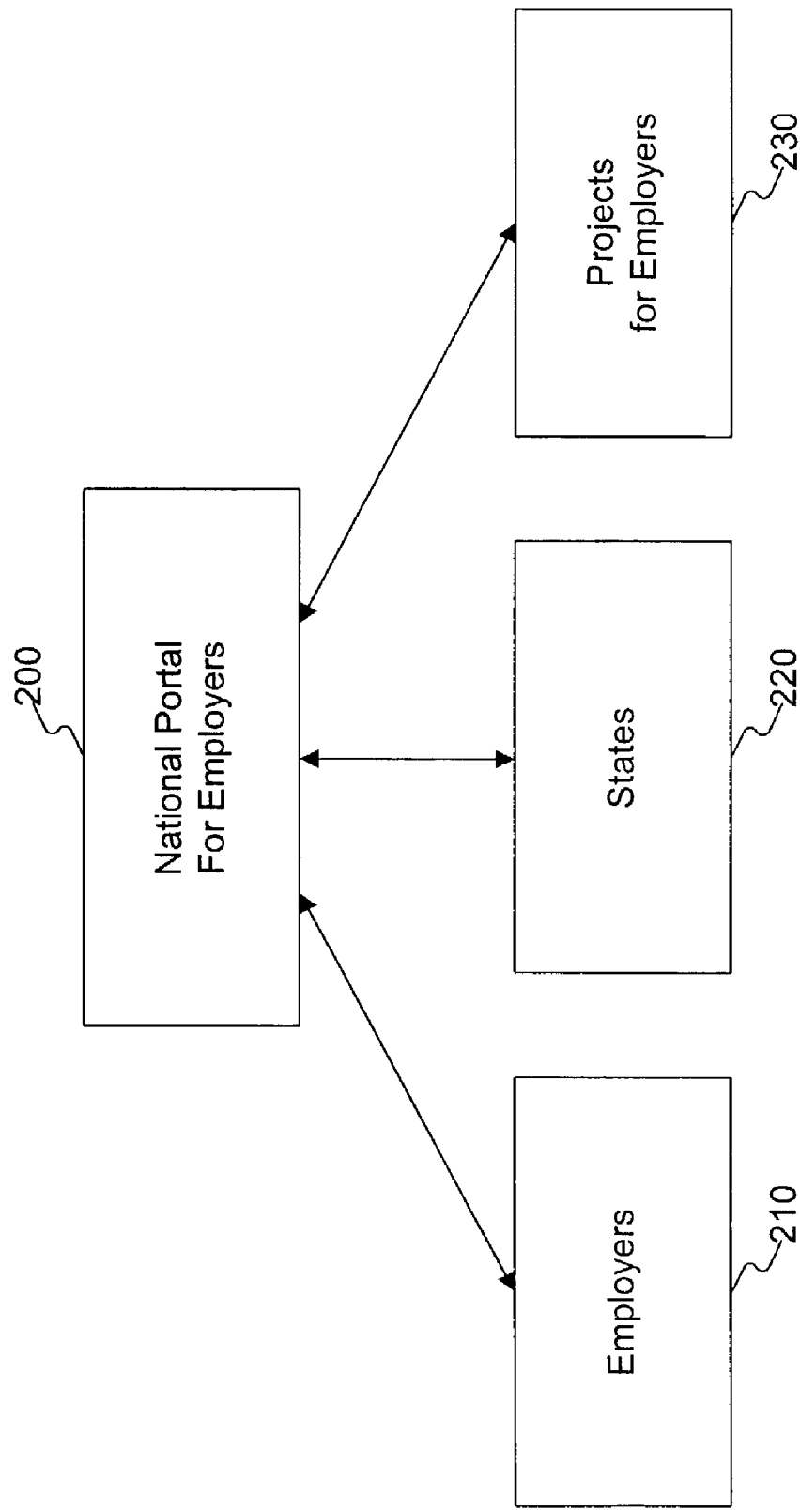
FIG. 2A is a block diagram of one embodiment of a national portal for employers.

FIG. 2A is a block diagram of one embodiment of a national portal for employers 200. As shown in FIG. 2A, employers 210, states 220, and projects for employers 230 may access national portal for employers 200. Employers 210 may access the national portal for employers 200 for services that are available to employers, e.g., projects for employers 230. Some of the services may require interactions with states, and therefore states 220 also may have access to the national portal for employers. Projects for employers 230 may include various applications such as garnishment of wages, and other services that are needed by employers. Employers 210 may access national portal 200 to initiate, process, and/or terminate projects for employers 230. As shown in FIG. 2A, national portal for employers 200 may provide a single location for many employers 210 to access projects for employers 230. Similarly, national portal for employers 200 provides a single location for employers 210 to access states 220. Notably, states 220 may access national portal for employers 200, regardless whether these states need to access an employer (or an employer needs to access a state).

Figure 2B:
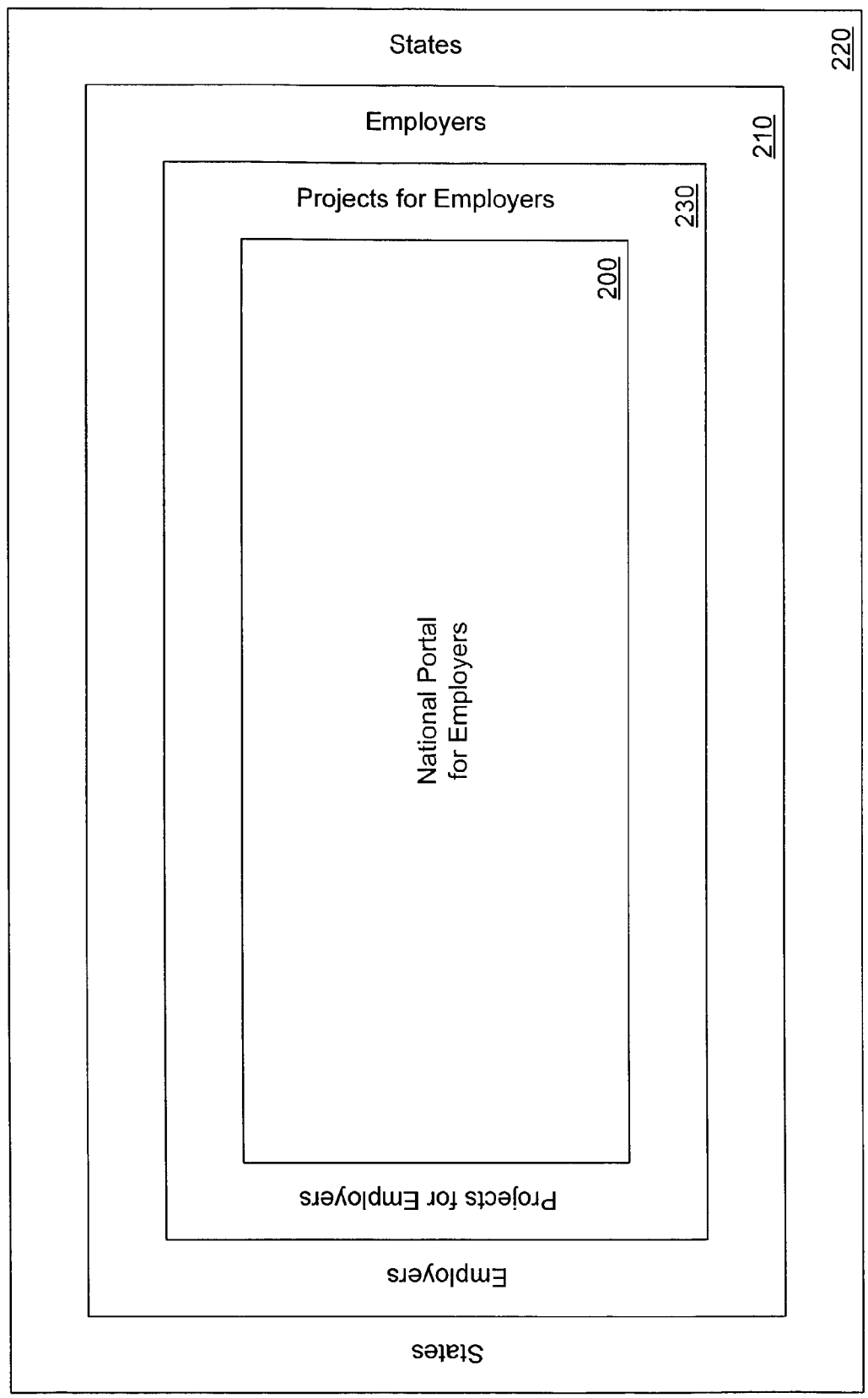
FIG. 2B illustrates one embodiment of a national portal for employers, which includes employers, states, and projects for employers.

FIG. 2B illustrates another embodiment of a national portal for employers 200, which may include employers, states, and projects for employers. The illustration in FIG. 2B depicts the universe in which national portal for employers 200 functions. As shown in FIG. 2B, there may be a universe of states 220 in which there are smaller universes. One universe that exists within the universe of states 220 may include a universe of employers 210. The universe of employers 210 may exist completely within the universe of states 220. Within the universe of employers 210, there may also be a universe of projects for employers 230. The universe of projects for employers 210 may exist within the universe of employers 210. Within the universe of projects for employers 230, there may be national portal for employers 200. National portal for employers 200 is depicted as not including all projects for employers. However, in another embodiment, the national portal for employers 200 may include all projects for employers 230.

Figure 2C:
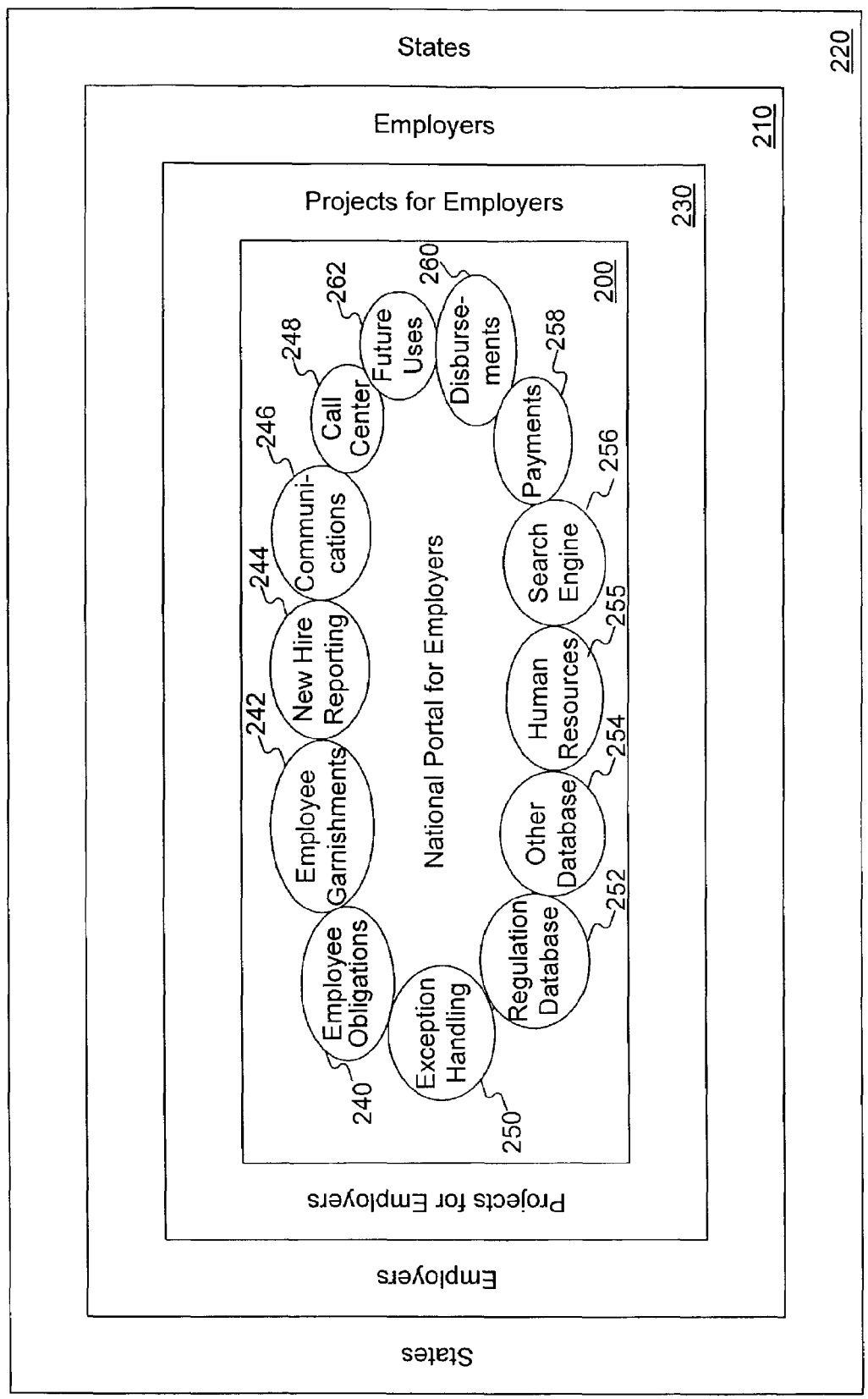
FIG. 2C illustrates the embodiment of the national portal for employers, shown in FIG. 2B, with one embodiment of a group of services offered by this national portal.

FIG. 2C illustrates the embodiment of the national portal for employers 200, shown in FIG. 2B, with one example of a group of services offered by this national portal. As shown in FIG. 2C, the services offered by national portal for employers 200 may include employee obligations 240, employee garnishments 242, new hire reporting 244, communications 246, call center 248, exception handling 250, regulation database 252, other databases 254, human resources 255, search engine 256, payments 258, disbursements 260, and future uses 262. National portal for employers 200 depicted in FIG. 2C may include other services (not shown). As shown in FIG. 2C, states 220, employers 210, and projects 230 for employers may all interact with national portal 200, which may include one or more of the services.

FIGS. 2B and 2C show that the universe of employers 210 may exist within the universe of states. However, in other embodiments (not shown), national portal 200 for employers may include employers 210 who are not within the universe of states 220. Similarly, other entities (including governmental or non-governmental entities) may also interact with the national portal for employers. In addition, FIGS. 2B and 2C depicts projects for employers, which may suggest that the projects are only for employers. However, in other embodiments (not shown), the projects that may be implemented through the national portal for employers may be projects for entities other than employers. As noted above, the national portal may also be used by entities other than employers (such as, for example, states, employees, banks, and any other entity).

Figure 3:
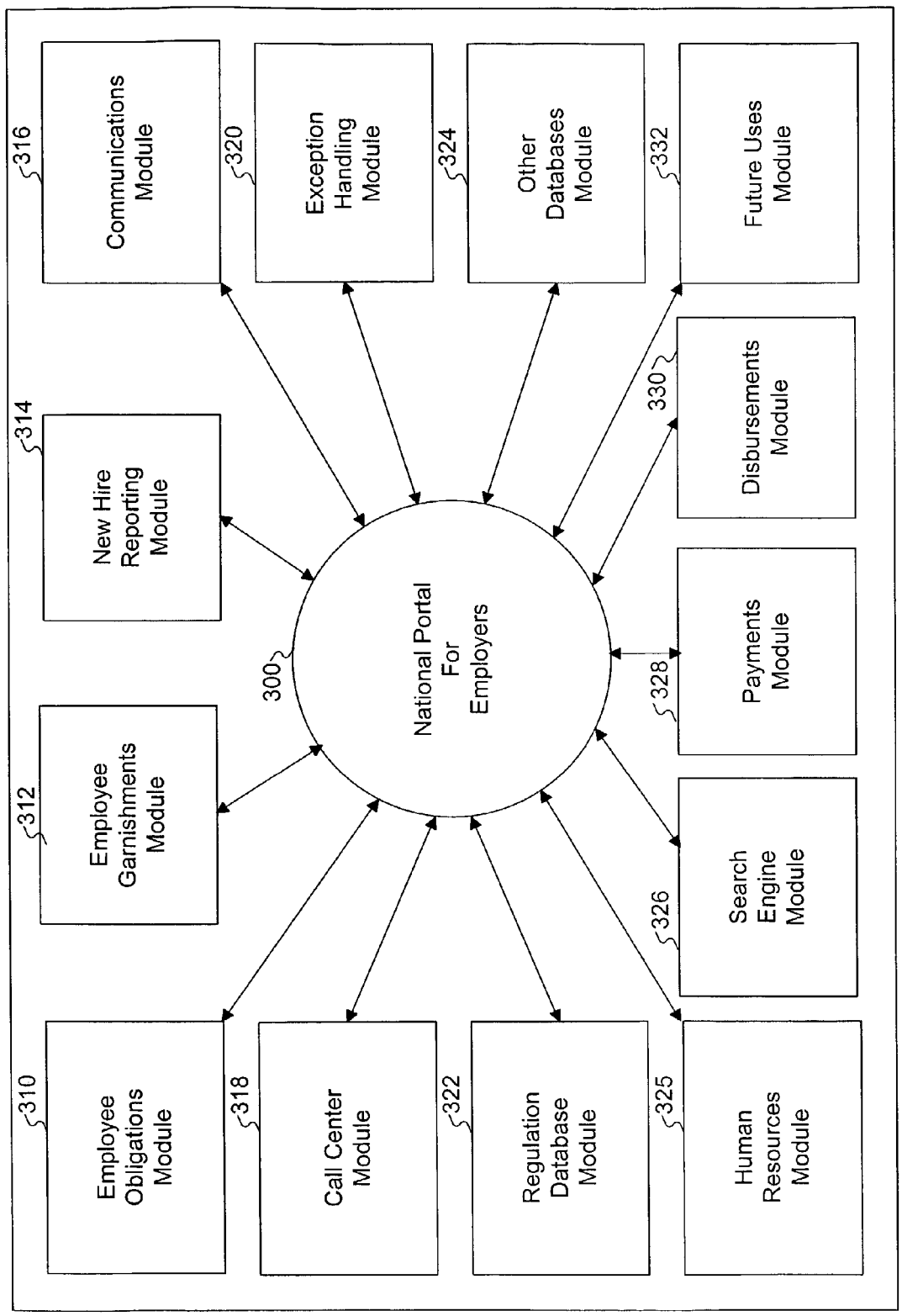
FIG. 3 is a block diagram of one embodiment of the modules for the services offered in the national portal, as shown in FIG. 2C.

FIG. 3 is a block diagram of one embodiment of the modules for the services offered in a national portal. Like FIG. 2C, FIG. 3 depicts the services that are available through a national portal for employers 300. However, FIG. 3 denotes that each of these services may be implemented by individual modules. Other embodiments may implement these services in other ways. As shown in FIG. 3, national portal for employers 300 may include employee obligations module 310, employee garnishments module 312, new hire reporting module 314, communications module 316, call center module 318, exception handling module 320, regulation database module 322, other databases module 324, search engine module 326, payments module 328, disbursements module 330, and future uses module 332. Each of these modules is described herein. As indicated by future uses module 322, national portal for employers 300 contemplates that other modules may be readily added.

FIG. 4 is a block diagram of one embodiment of employee obligations module 310, as shown in FIG. 3. As shown in FIG. 4, employee obligations module 310 may include child support obligations 410 and other obligations 420. Child support obligations 410 may be processed as described in U.S. Pat. Nos. 5,946,669 and 6,119,107. Child support obligations 410 may also be processed by other methodologies. Employee obligations module 310 may also process other obligations 420 (e.g., alimony obligations).

In one implementation of employee obligations module 310, an employer may collect obligations owed by an employee of the employer for processing through the national portal. One example of an obligation by an employee that may be processed by the employer through the national portal is a child support obligation. In one implementation, the employer may transmit the child support obligation owed by the employee to the national portal for processing. In this implementation, the child support obligation may be transmitted directly to the national portal (as shown in FIG. 1D) or may be transmitted to the national portal via a network (also as shown in FIG. 1D).

Figure 5A:
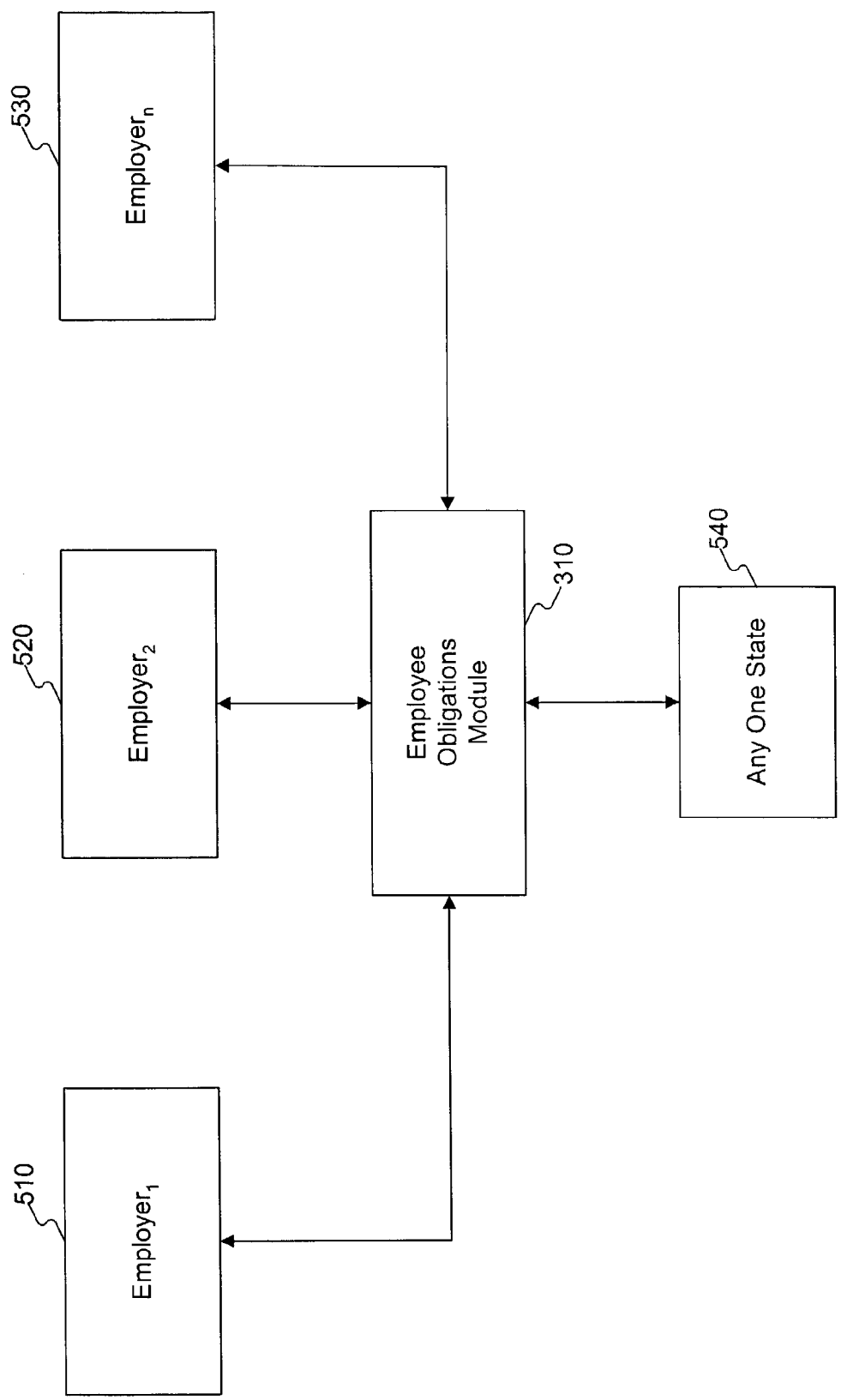
FIG. 5A is a block diagram of one embodiment of an employee obligations module with multiple employers in one state.

FIG. 5A is a block diagram of one embodiment of employee obligations module 310 with multiple employers in one state. As shown in FIG. 5A, employee obligations module 310 may include multiple employers but only one state. Employee obligations module may include $employer_1$ 510, $employer_2$ 520, and $employer_n$ 530. Employee obligations module may also include any one state 540. As shown in FIG. 5A, $employer_1$ 510, $employer_2$ 520, $employer_n$ 530 and any one state 540 may communicate with employer obligations module 310, and employee obligations module 310 may communicate with any of these entities. As shown in FIG. 5A, any number of employers may interact with employee obligations module 310. However, in this one embodiment, only one state (any one state 540) may communicate with employee obligations module 310.

Figure 5B:
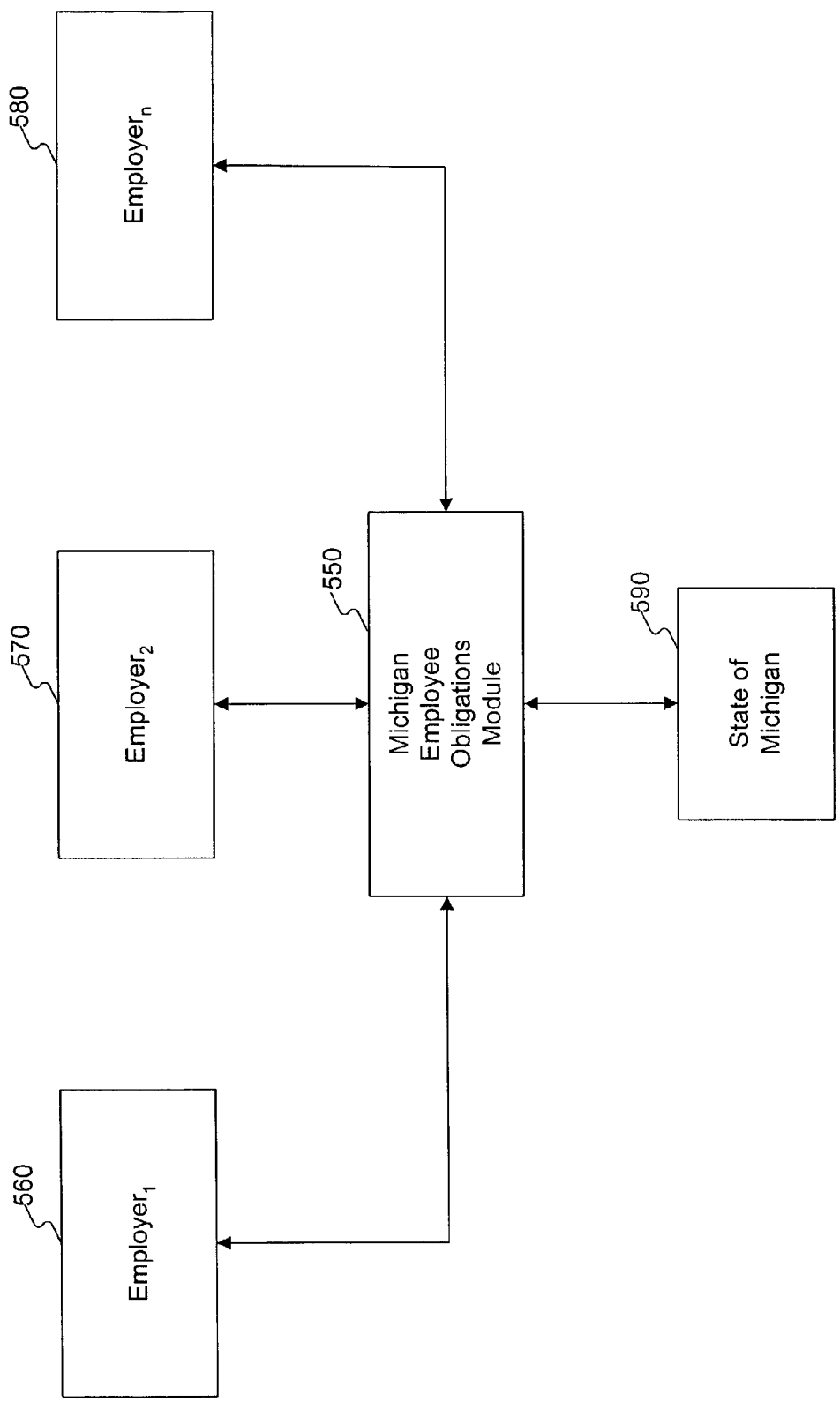
FIG. 5B is a block diagram of another embodiment of an employee obligations module with multiple employers in one state.

FIG. 5B is a block diagram of another embodiment of an employee obligations module 550 with multiple employers in one state. As shown in FIG. 5B, the employee obligations module may be specific to a particular state. Here, the employee obligations module may include a Michigan employee obligations module 550. Thus, as shown in FIG. 5B, $employer_1$ 560, $employer_2$ 570, and $employer_n$ 580 may interact with Michigan employee obligations module 550. As indicated by $employer_n$ 580, any number of employers in Michigan may interact with Michigan employee obligations module 550. The State of Michigan 590 also may interact with the Michigan employee obligations module.

Figure 6A:
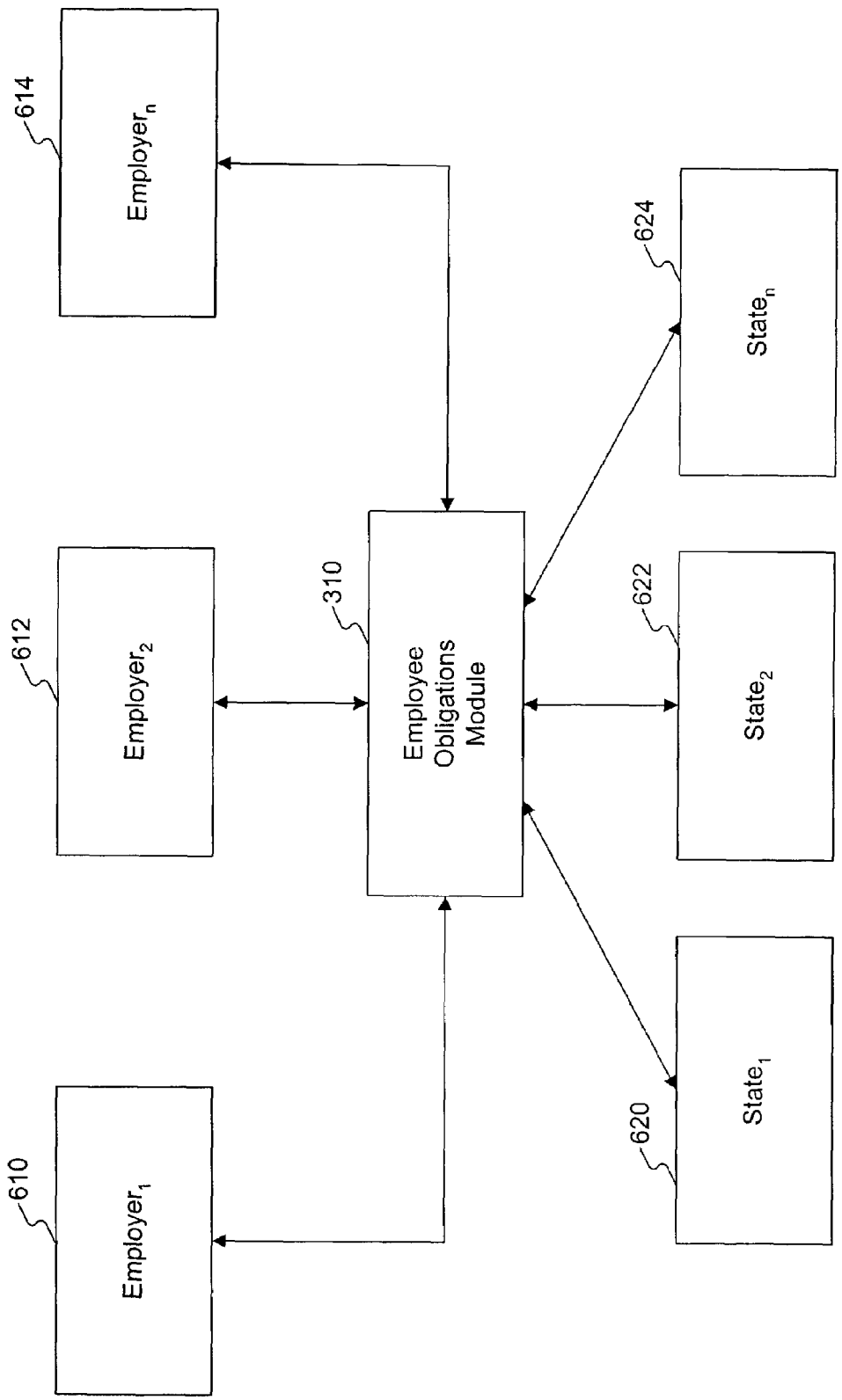
FIG. 6A is a block diagram of one embodiment of an employee obligations module with multiple employers and multiple states.

FIG. 6A is a block diagram of one embodiment of employee obligations module 310 with multiple employers and multiple states. As shown in FIG. 6A, $employer_1$ 610, $employer_2$ 612, and $employer_n$ 614 may interact with employee obligations module 310. Also, $state_1$ 620, $state_2$ 622, and $state_n$ 624 may also interact with employee obligations module 310. As shown in FIG. 6A, any number of employers ($employer_n$ 614) and any number of states ($state_n$ 624) may interact with employee obligations module 310. Alternatively, multiple employee obligation modules, each specific to one or more states may be included in national portal 200, with employers and states being automatically connected to the appropriate employee obligations module.

Figure 6B:
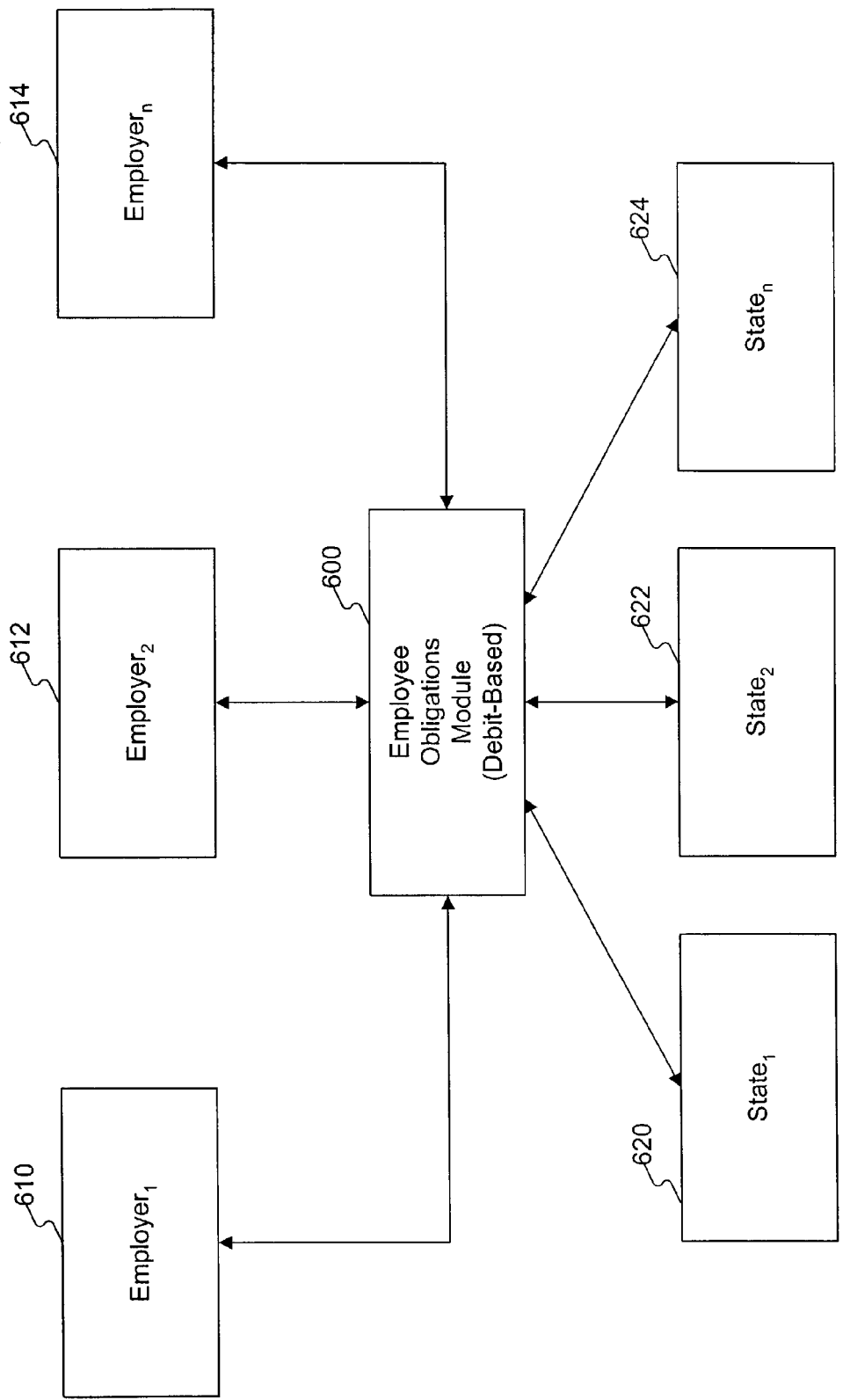
FIG. 6B is a block diagram of one embodiment of a debit-based employee obligations module with multiple employers and multiple states.

FIG. 6B is a block diagram of one embodiment of a debit-based employee obligations module with multiple employers and multiple states. As shown in FIG. 6B, $employer_1$ 610, $employer_2$ 612, and $employer_n$ 614 may interact with debit-based employee obligations module 600, and $state_1$ 620, $state_2$ 622, and $state_n$ 624 may also interact with debit-based employee obligations module 600. As shown in FIG. 6B, any number of employers ($employer_n$ 614) or any number of states ($state_n$ 624) may interact with debit-based employee obligations module 600. Notably, employee obligations module 600 in FIG. 6B may include a debit-based employee obligation module. Therefore, any financial information processed by debit-based employee obligations module 600 may be processed as a debit transaction.

Figure 6C:
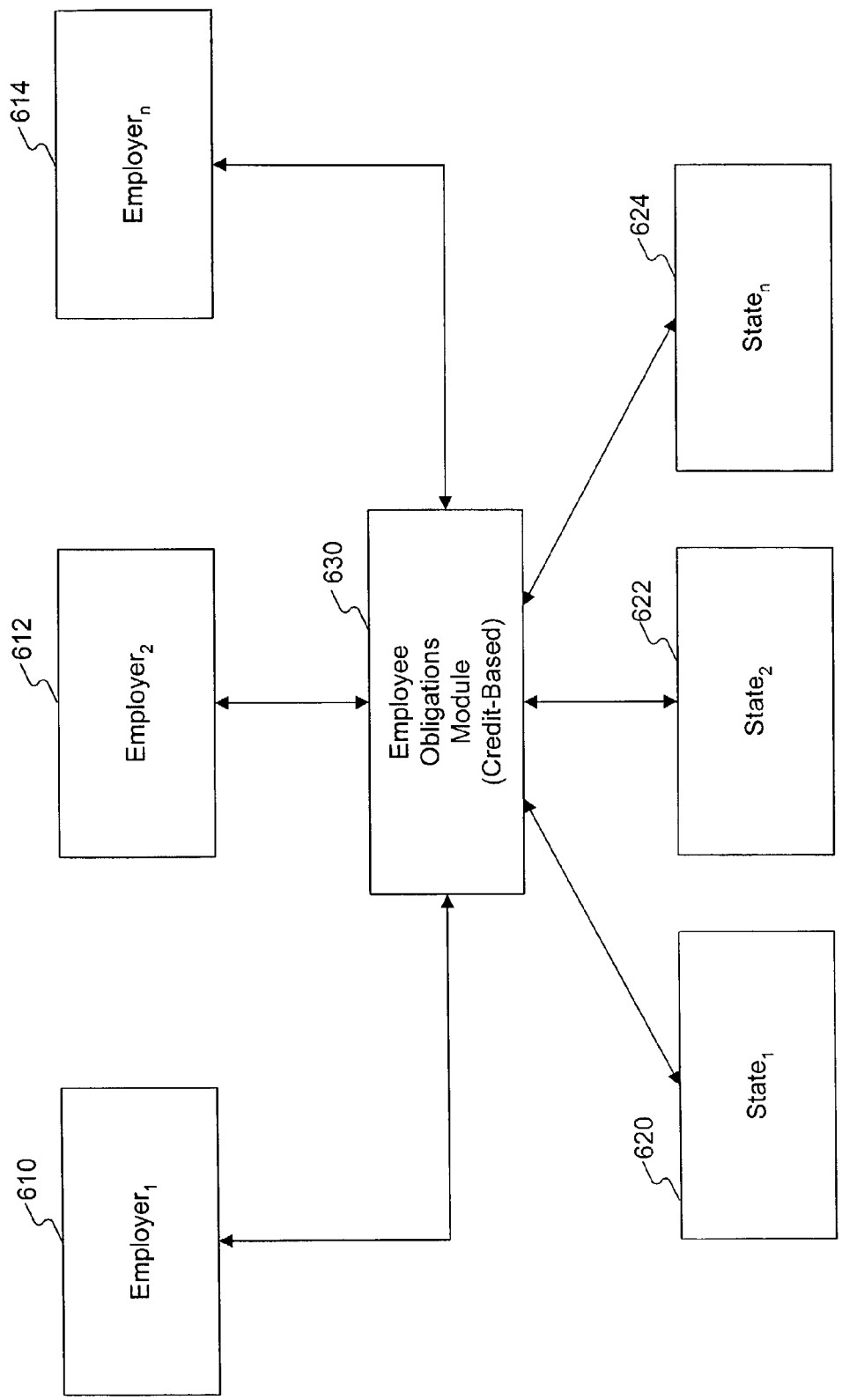
FIG. 6C is a block diagram of one embodiment of a credit-based employee obligations module with multiple employers and multiple states.

FIG. 6C is a block diagram of one embodiment of a credit-based employee obligations module with multiple employers and multiple states. As shown in FIG. 6C, $employer_1$ 610, $employer_2$ 612, and $employer_n$ 614 may interact with credit-based employee obligations module 630, and $state_1$ 620, state$_2$ 622, and state$_n$ 624 may also interact with credit-based employee obligations module 630. As shown in FIG. 6C, any number of employers (employer$_n$ 614) or any number of states (state$_n$ 624) may interact with credit-based employee obligations module 630. In contrast to the debit-based employee obligations module of FIG. 6B, credit-based employee obligations module 630 may process financial information as credit transactions.

Figure 6D:
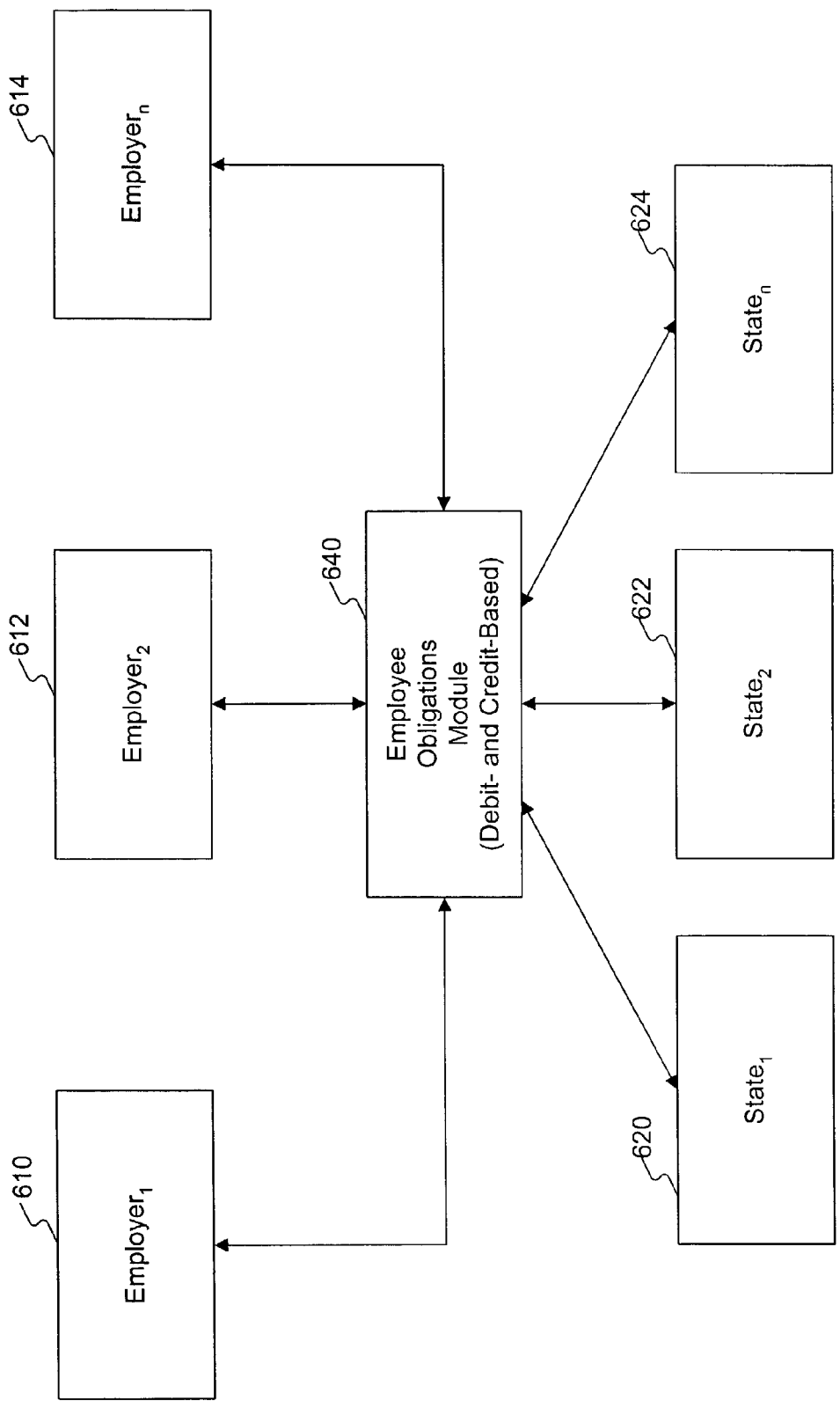
FIG. 6D is a block diagram of one embodiment of a debit- and credit-based employee obligations module with multiple employers and multiple states.

FIG. 6D is a block diagram of one embodiment of a debit- and credit-based employee obligations module with multiple employers and multiple states. As shown in FIG. 6D, employer$_1$ 610, employer$_2$ 612, and employer$_n$ 614 may interact with debit- and credit-based employee obligations module 640, and state$_1$ 620, state$_2$ 622, and state$_n$ 624 may also interact with debit- and credit-based employee obligations module 640. As shown in FIG. 6D, any number of employers (employer$_n$ 614) or any number of states (state$_n$ 624) may interact with debit- and credit-based employee obligations module 640. In contrast to the employee obligations module of FIGS. 6B-6C, debit- and credit-based employee obligations module 640 may process financial information as either debit transactions or credit transactions.

Figure 6E:
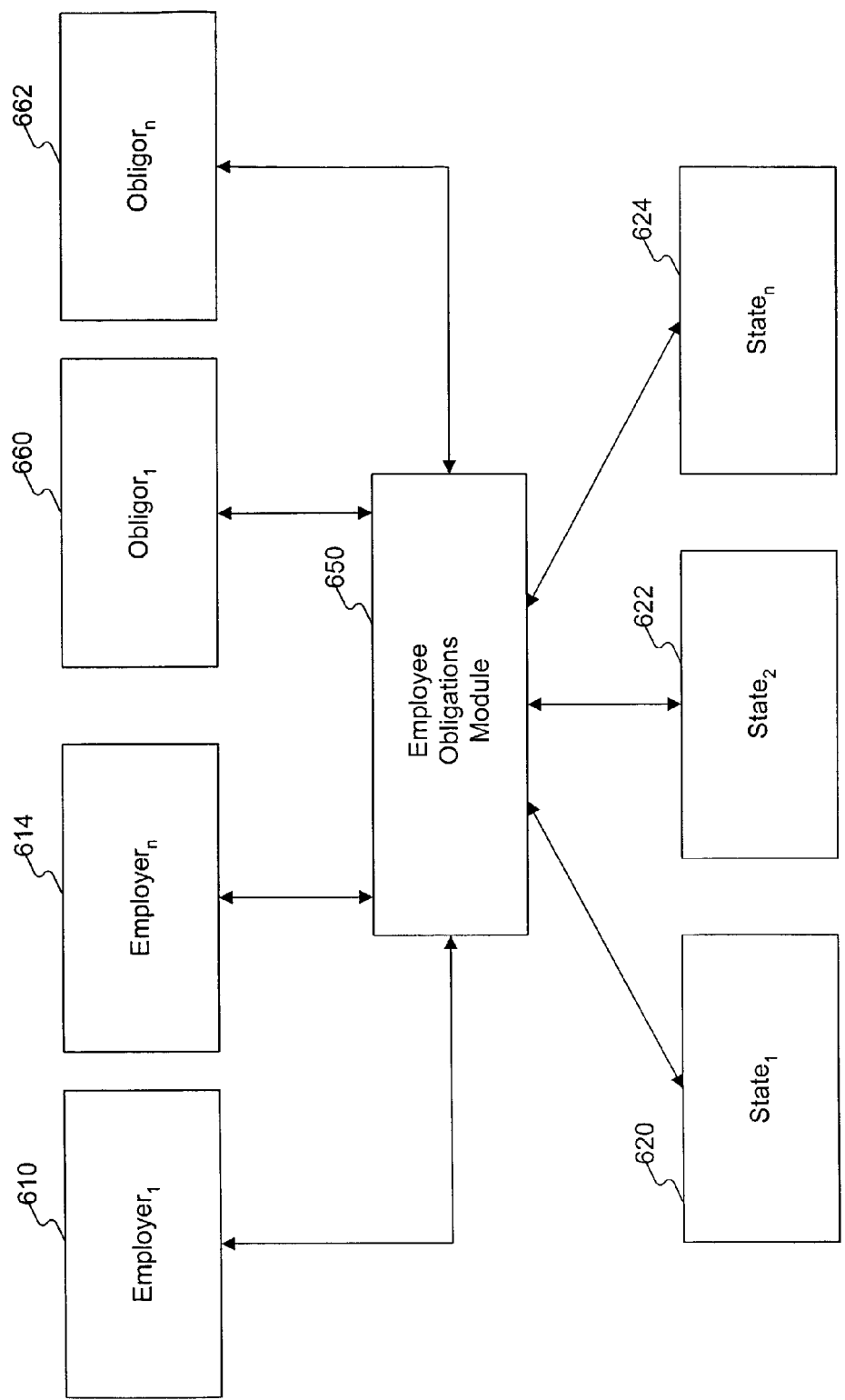
FIG. 6E is a block diagram of another embodiment of an employee obligations module with multiple employers and multiple states.

FIG. 6E is a block diagram of another embodiment of an employee obligations module 650 with multiple employers and multiple states. As shown in FIG. 6E, employer$_1$ 610 and employer$_n$ 614 may interact with employee obligations module 650, and state$_1$ 620, state$_2$ 622, and state$_n$ 624 may also interact with employee obligations module 650. In addition, as shown in FIG. 6E, obligor$_1$ 660 and obligor$_n$ 662 may also interact with employee obligations module 650. Obligor$_1$ 660 and obligor$_n$ 662 may represent an employee of an employer that owes an obligation. In addition to child support payments, as described above, obligations owed by an obligor may include alimony or any other obligation. Employee obligation module 650 in FIG. 6E may process financial information as debit-based transactions, credit-based transactions, or a combination of debit- and credit-based transactions. Other processing architectures may also be used by the employee obligations module.

FIGS. 6A-6E depict one set of embodiments of a normal developmental progression that could be used by a national portal with an employee obligations module. For example, a national portal may begin with the employee obligations module depicted in FIG. 6A, then develop the debit-based employee obligations module of FIG. 6B, then develop the credit-based employee obligations module of FIG. 6C, then develop the debit- and credit-based employee obligations module of FIG. 6D, and finally, develop the employee obligations module of FIG. 6E. Of course, other development schemes also may be used to develop an employee obligations module for a national portal. Similarly, other employee obligations modules may be used.

Figure 7:
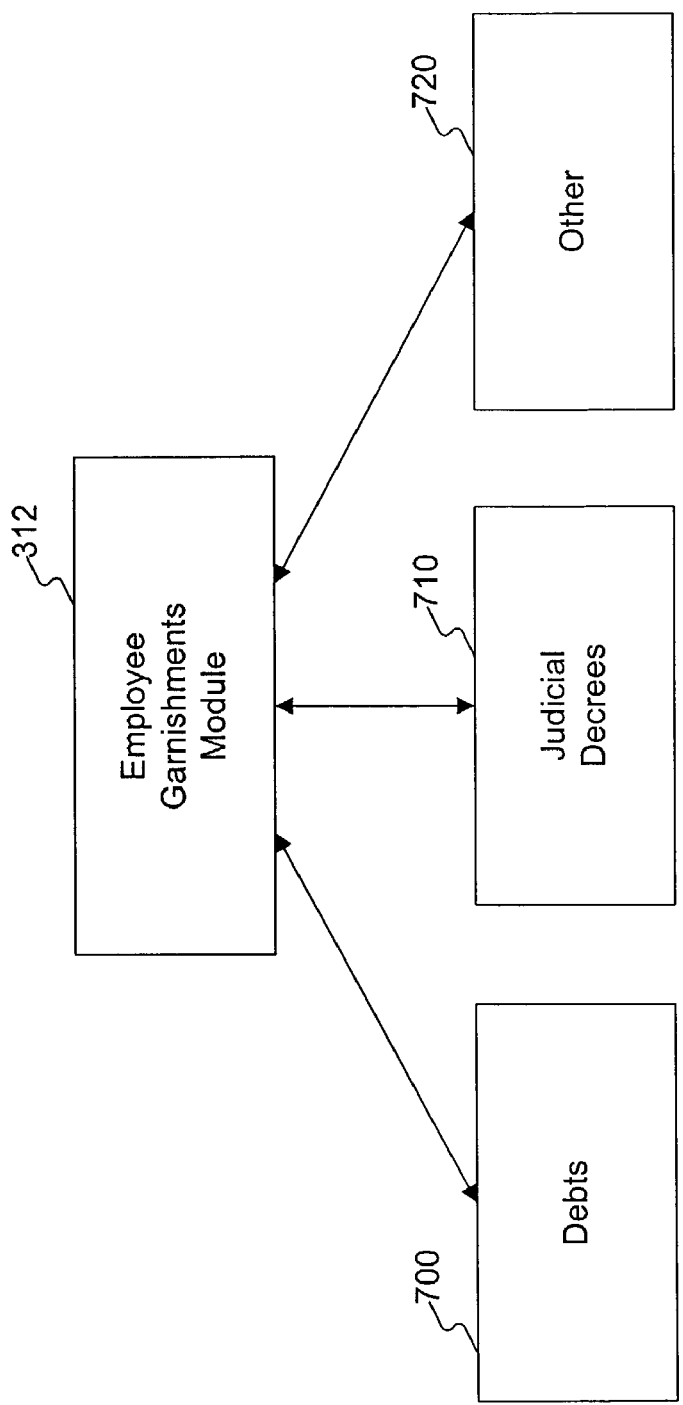
FIG. 7 is a block diagram of one embodiment of the employee garnishments module, as shown in FIG. 3.

FIG. 7 is a block diagram of one embodiment of employee garnishments module 312, as shown in FIG. 3. As shown in FIG. 7, employee garnishments module 312 may include debts 700, judicial decrees 710, and other garnishments 720. In one embodiment, employee garnishments module 312 may process financial information for a state. For example, a state may send garnishment information to employee garnishments module 312 at the national portal, and then the national portal may process the garnishment against the salary of the employee at the employer.

In another embodiment, employee garnishments module 312 may process financial information for an employee. For example, an employee may have a debt 700, for which the employee wishes to have a garnishment made from the employee's salary. In this circumstance, the employee may access employee garnishments module 312 at the national portal to implement the garnishment of the employee's salary. Employee garnishment module 312 at the national portal may then process the garnishment with the employer for the employee. In still another embodiment, a court may issue a judicial decree 710 to garnish an employee's salary through the national portal using employee garnishments module 312. In this circumstance, a court may inform employee garnishments module 312 at the national portal of the court-ordered garnishment. Employee garnishments module 312 at the national portal may then process the garnishment against the salary of the employee at the employer. Other garnishments 720 may also be implemented by the employee garnishments module.

Figure 8A:
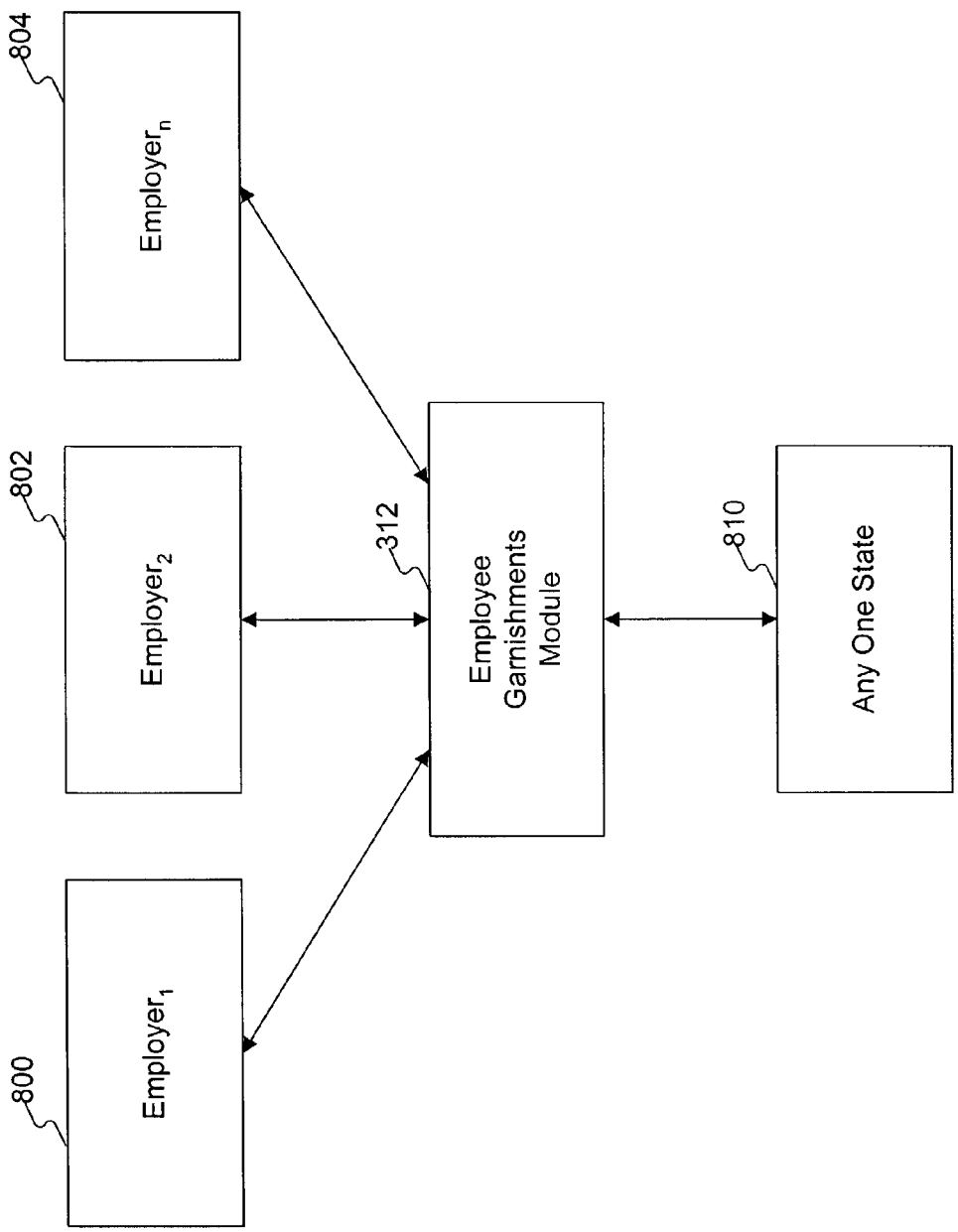
FIG. 8A is a block diagram of one embodiment of an employee garnishments module with multiple employers in one state.

FIG. 8A is a block diagram of one embodiment of employee garnishments module 312 with multiple employers and one state. As shown in FIG. 8A, employee garnishments module 312 may be accessed by employer$_1$ 800, employer$_2$ 802, and employer$_n$ 804. As indicated on FIG. 8A, any number of employers (employer$_n$ 804) may access employee garnishments module 312. Employee garnishments module 312 may also be accessed by any one state 810. In this embodiment, only one state (any one state 810) may access employee garnishments module 312.

Figure 8B:
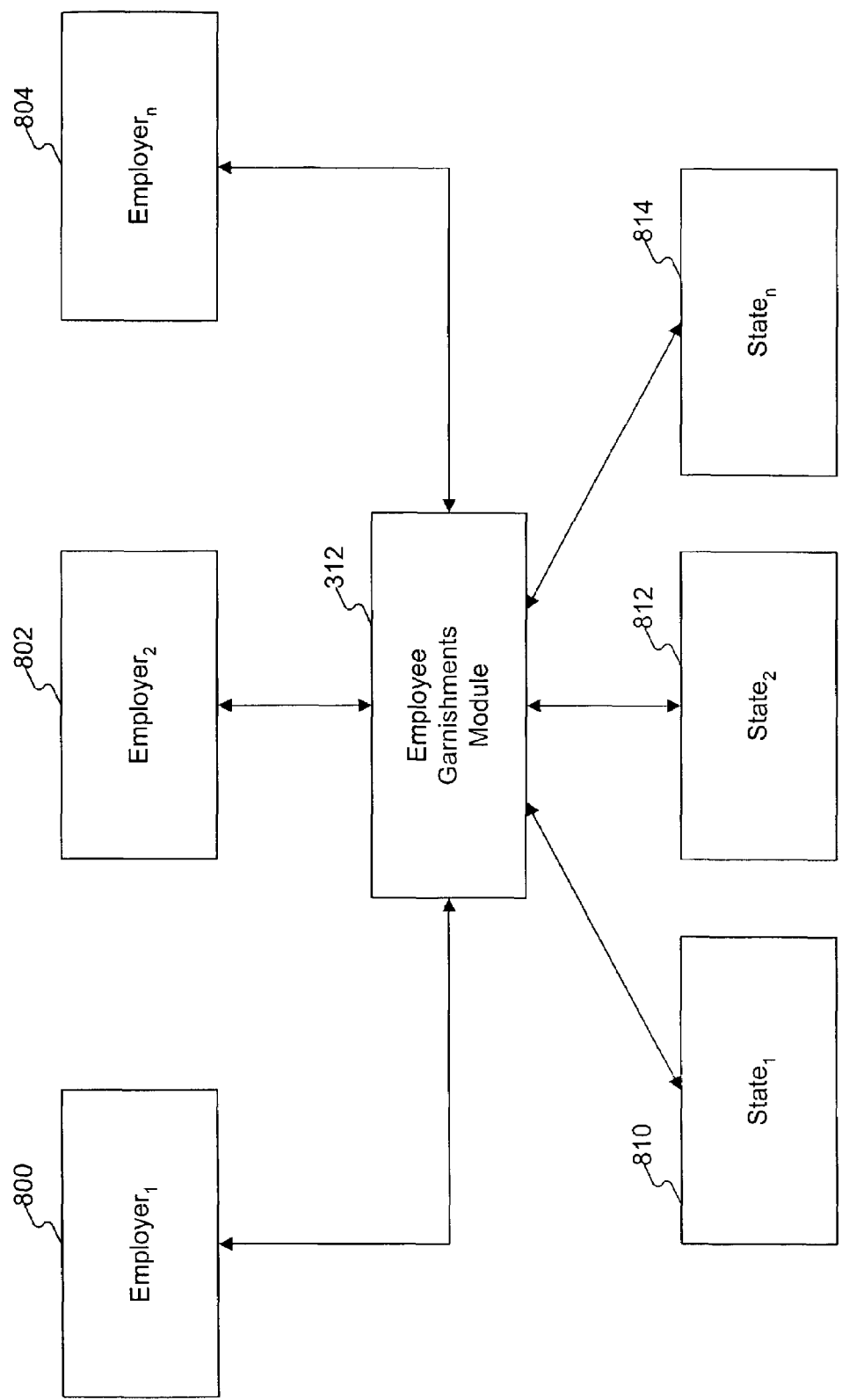
FIG. 8B is a block diagram of one embodiment of an employee garnishments module with multiple employers and multiple states.

FIG. 8B is a block diagram of one embodiment of employee garnishments module 312 with multiple employers and multiple states. As shown in FIG. 8B, employee garnishments module 312 may be accessed by employer$_1$ 800, employer$_2$ 802, and employer$_n$ 804, and employee garnishments module 312 may also be accessed by state$_1$ 810, state$_2$ 812, and state$_n$ 814. In contrast to FIG. 8A, the employee garnishments module in FIG. 8B may be accessed by any number of employers (employer$_n$ 804) and any number of states (state$_n$ 814). Additionally, as referenced above (but not shown), the employee garnishments module may also be accessed by any other entity 720 (such as a court).

FIGS. 8A-8B depict various embodiments of employee garnishments modules by a national portal. In one implementation of these modules, the withholding of the garnishment from an employee's salary may be accomplished through an electronic format. One format for performing this transaction is defined by the American National Standards Institute (ANSI) and the Federal Office of Child Support Enforcement (FOCSE). Other ways may also be used to accomplish the garnishment through an electronic format. Additionally, non-electronic ways may also be used to process the garnishments by the national portal.

Figure 9:
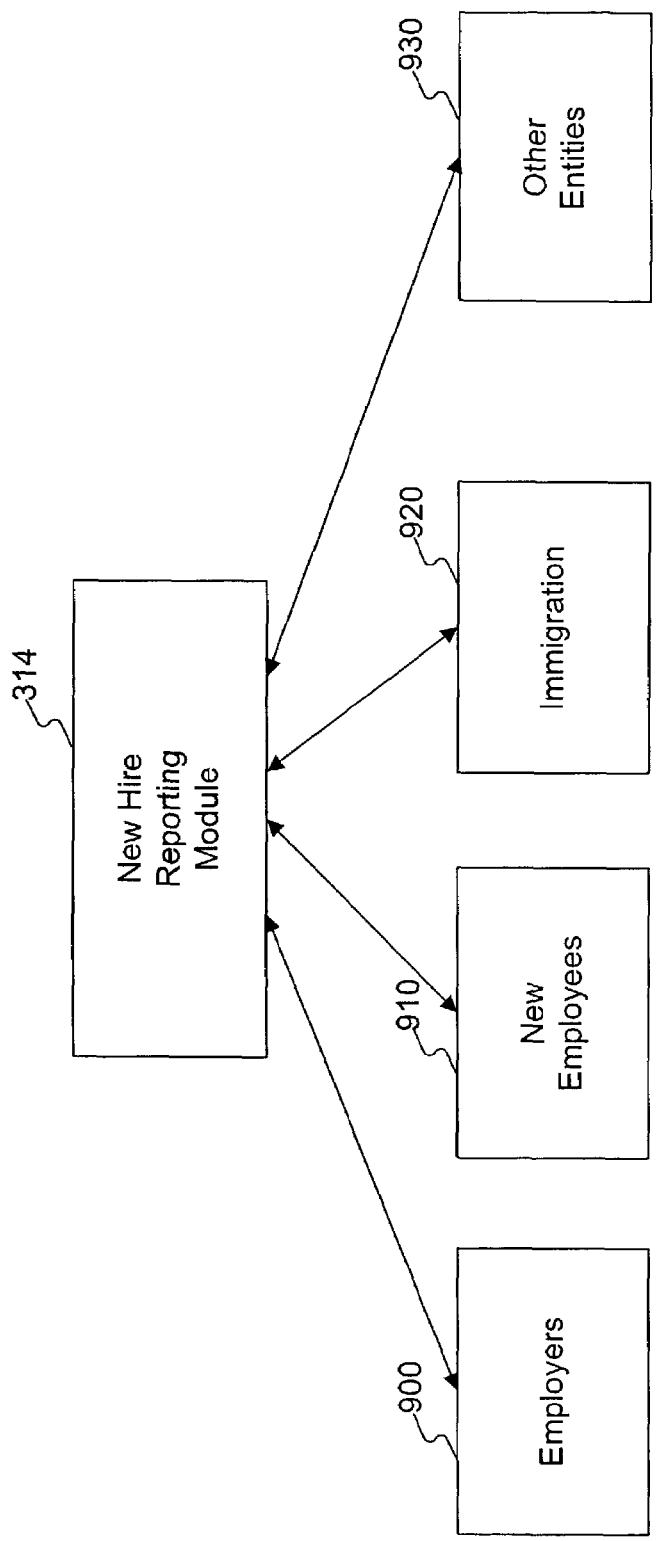
FIG. 9 is a block diagram of one embodiment of a new hire reporting module, as shown in FIG. 3.

FIG. 9 is a block diagram of one embodiment of new hire reporting module 314, as shown in FIG. 3. As shown in FIG. 9, new hire reporting module 314 may be accessed by employers 900, new employees 910, immigration agencies 920, and other entities 930. In one embodiment, new hire reporting module 314 may be used by employers 900 to report new employees 910 that have been hired. Under the Personal Responsibility and Work Opportunities Reconciliation Act of 1996, in certain circumstances, employers must report the hiring of new employees within 20 days of hiring. Using new hire reporting module 314, employers 900 may report the hiring of employees 910, and the new hire reporting module will then automatically transmit this information to all of the necessary reporting agencies (whether state, municipal, or any other governmental or non-governmental entity). In other embodiments, new employees 910, immigration 920, and other entities 930 may also access new hire reporting module 314 to report the hiring of new employees 910. In still other embodiments, new hire reporting module 314 may be used to report terminations of employment. New hire reporting module 314 may also have other functions.

Figure 10A:
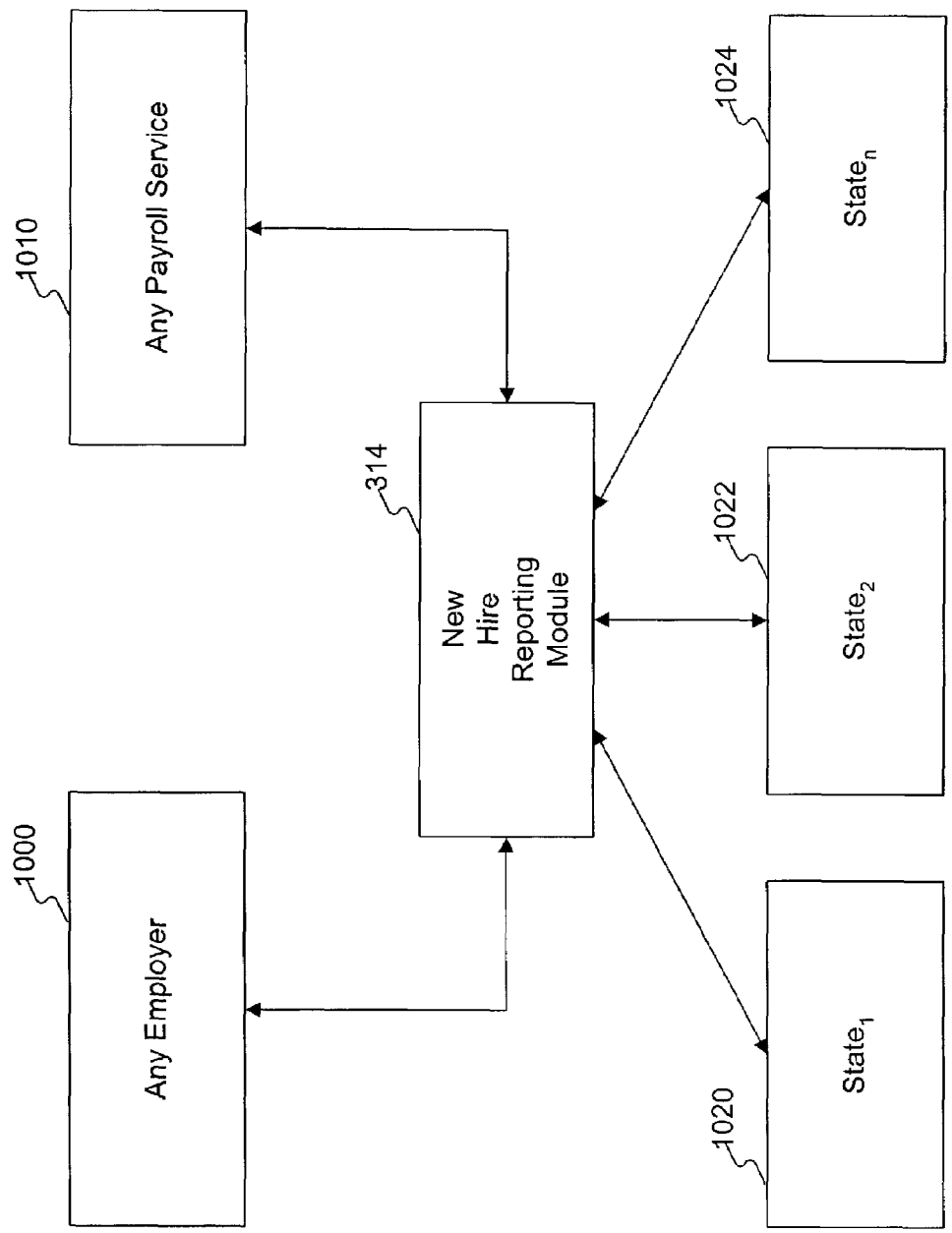
FIG. 10A is a block diagram of one embodiment of a new hire reporting module, as shown in FIG. 3.

FIG. 10A is a block diagram of another embodiment of new hire reporting module 314, as shown in FIG. 3. As shown in FIG. 10A, new hire reporting module 314 may be accessed by any employer 1000, any payroll service 1010, state$_1$ 1020, state$_2$ 1022, and state$_n$ 1024. As explained earlier, other entities may also access the new hire reporting module (not shown). Any employer 1000 may access the new hire reporting module 314 to report the hiring of a new employee. Similarly, any payroll service 1010 may also access the new hire reporting module 314. Some payroll services 1010 may automatically record and prepare information regarding the hiring of new employees, and these payroll services may be able to automatically interact with new hire reporting module 314. Any number of states 1020, 1022, and 1024 may also be able to access new hire reporting module 314, and new hire reporting module 314 may also be able to access any number of states 1020, 1022, and 1024. The access between new hire reporting module 314 and various states 1020, 1022, and 1024 will allow the information provided by employers or payroll services to be transmitted to the states. States 1020, 1022, and 1024 may also be able to access new hire reporting module 314, should the states have questions regarding the information transmitted from the employers or from the payroll services.

Figure 10B:
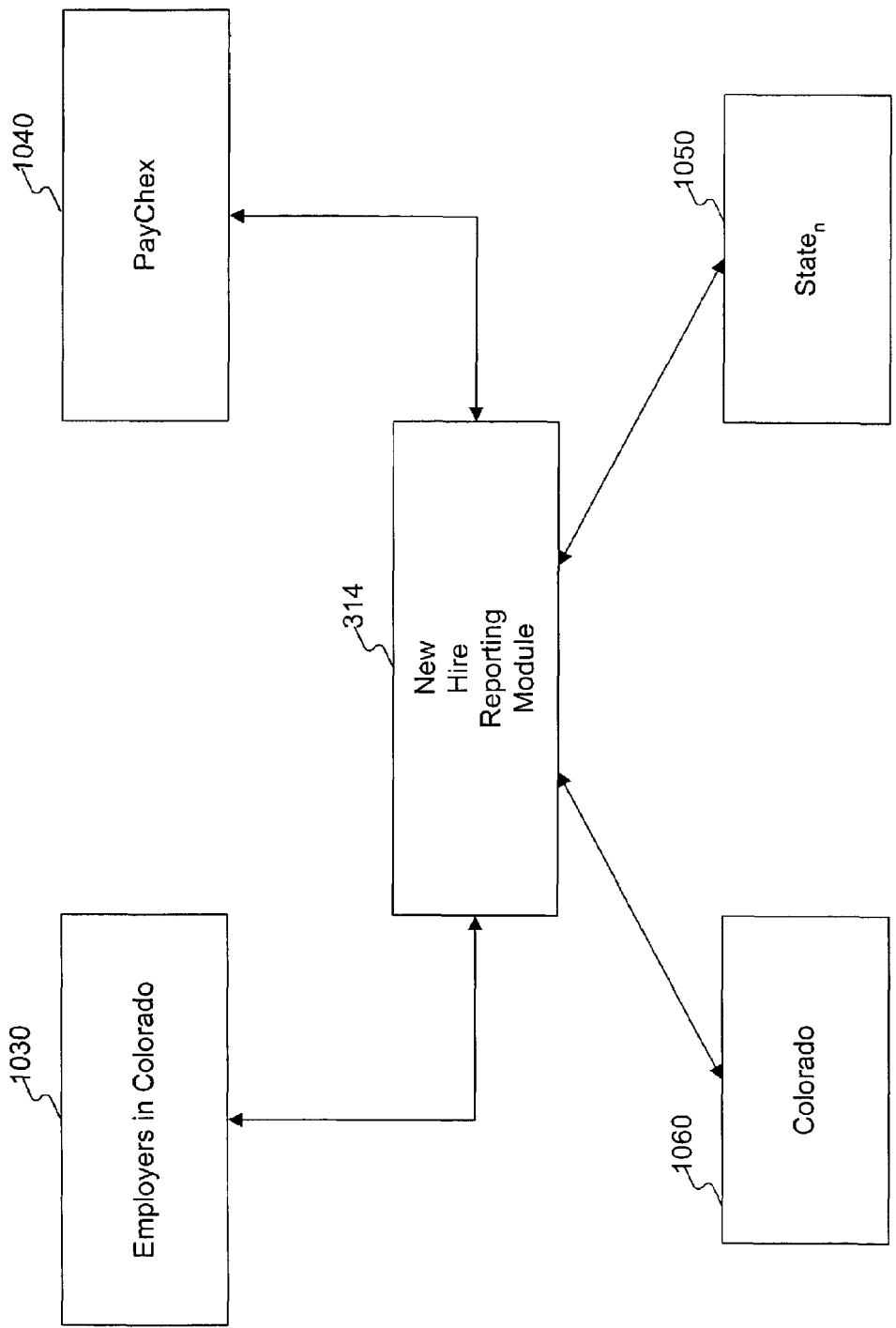
FIG. 10B is a block diagram of another embodiment of a new hire reporting module, as shown in FIG. 10A.

FIG. 10B is a block diagram of another embodiment of new hire reporting module 314, as shown in FIG. 10A. As shown in FIG. 10B, new hire reporting module 314 may be linked to a single group of employers, in this case the employers in Colorado 1030. Similarly, new hire reporting module 314 also may be linked to a single payroll service, in this case PayChex 1040. However, even though one state is listed specifically (in this case, Colorado 1060), any number of states (states$_n$ 1050) may access new hire reporting module 314.

Figure 10C:
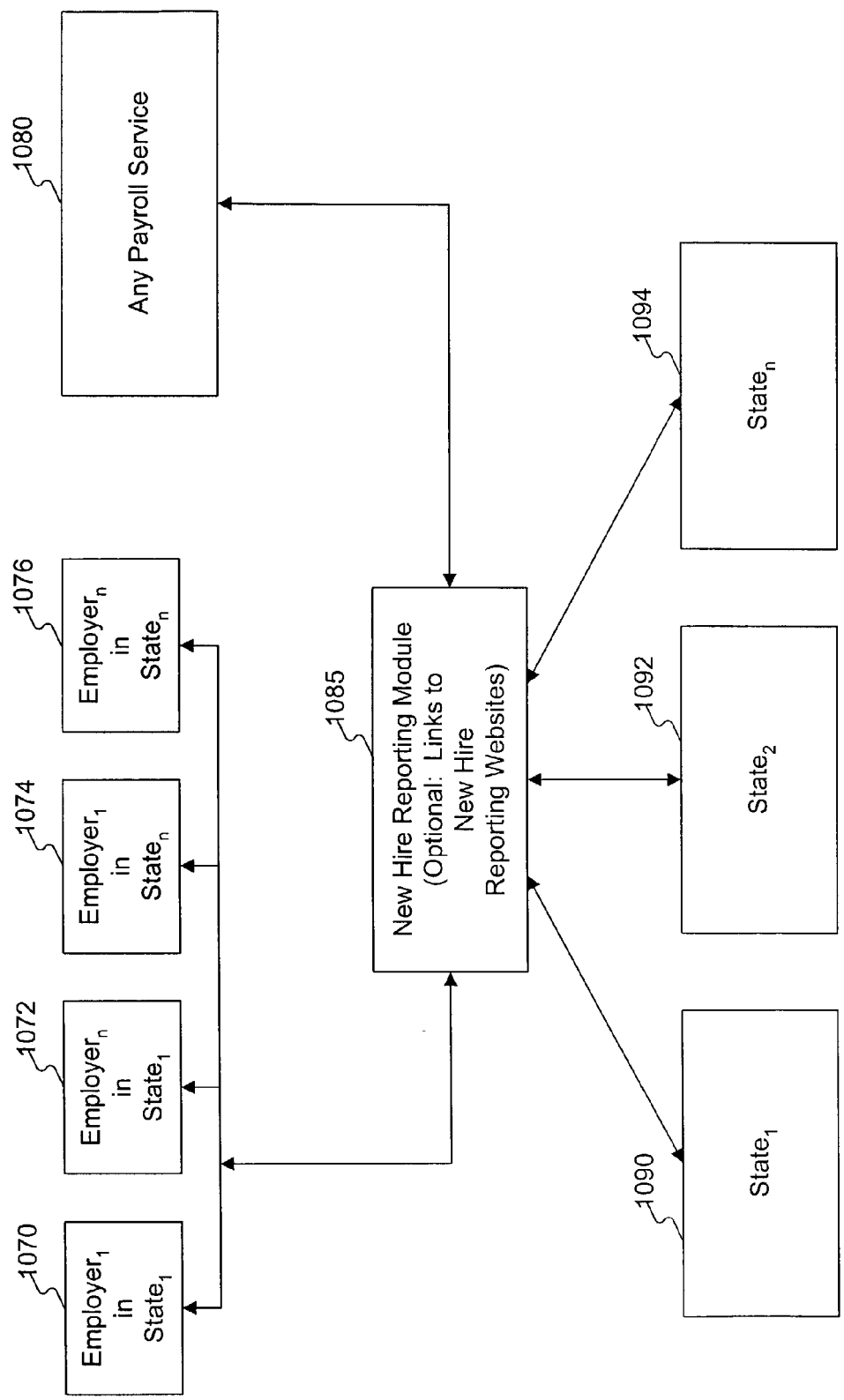
FIG. 10C is a block diagram of another embodiment of a new hire reporting module, as shown in FIG. 10A.

FIG. 10C is a block diagram of another embodiment of new hire reporting module 314, as shown in FIG. 10A. As shown in FIG. 10C, any number of employers in any number of states may access this new hire reporting module. Thus, employer$_1$ in state$_1$ 1070, employer$_n$ in state$_1$ 1072, employer$_1$ in state$_n$ 1074, and employer$_n$ in state$_n$ 1076 may all access new hire reporting module 1085. Similarly, any payroll service 1080 may also access new hire reporting module 1085. Any state may also access new hire reporting module 1085, such as state$_1$ 1090, state$_2$ 1092, and state$_n$ 1094. FIG. 10C also indicates that new hire reporting module 1085 may have an optional feature, including links to new hire reporting websites. This optional feature allows users of the new hire reporting module to locate information from other new hire reporting websites. This optional feature is consistent with the other services available at the national portal, which allow employers and other users of the national portal to find all information at one location, that is, at the national portal.

FIGS. 10A-10C depict one set of embodiments of a normal developmental progression for the creation of a new hire reporting module. A new hire reporting module at a national portal may first include only a single group of employers, as shown in FIG. 10B, or a single type of payroll service, as also shown in FIG. 10B. However, subsequent development may allow the addition of other employers and the addition of other payroll services, as shown in FIG. 10C. Subsequent development may also include additional capabilities. For example, in addition to communications between employers and states (or employers and payroll services, or any other combination of entities to states), the new hire reporting module may also allow the transfer of files either from employers or payroll services to states or from states to employers or payroll services. These files may include information regarding the hiring of new employees or any other information. All of these embodiments of a new hire reporting module, or any combination thereof, are included in the current invention.

Figure 11:
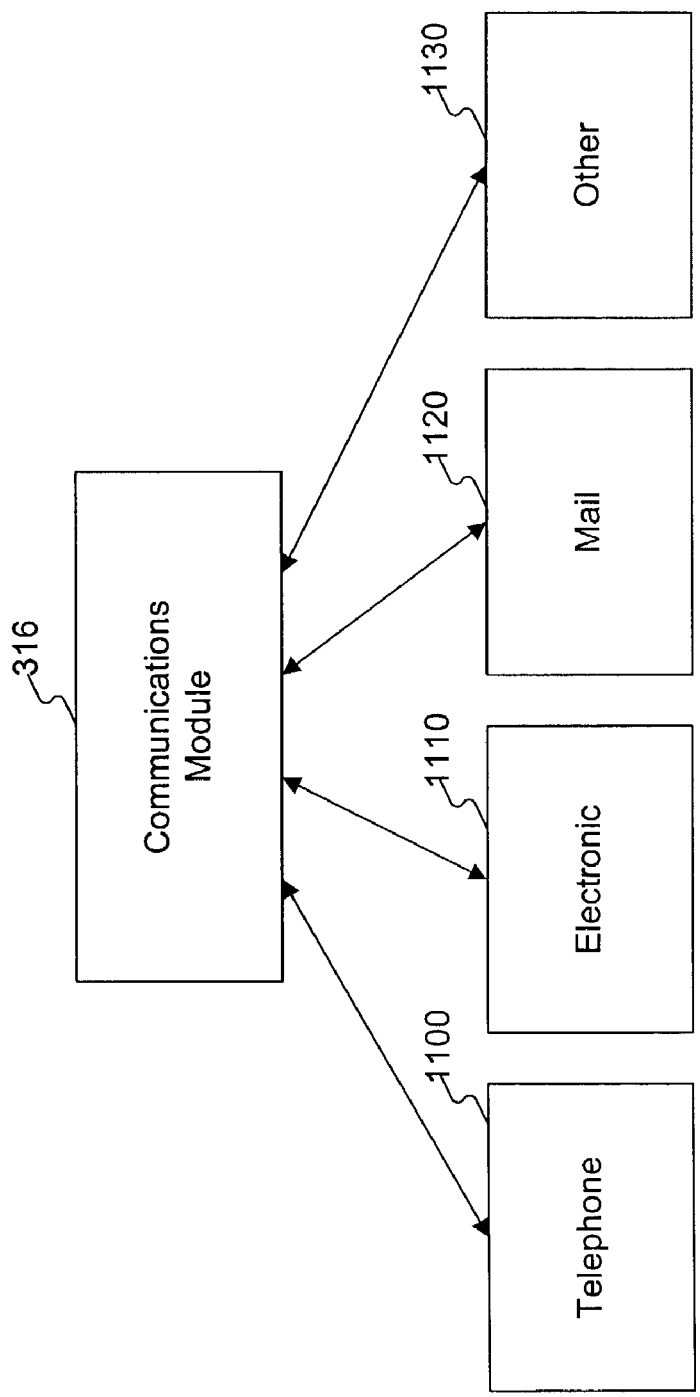
FIG. 11 is a block diagram of one embodiment of a communications module, as shown in FIG. 3.

FIG. 11 is a block diagram of one embodiment of communications module 316, as shown in FIG. 3. As shown in FIG. 11, communications module 316 may include telephone 1100, electronic 1110, mail 1120, and other types of communication 1130. Communications module 316 includes any capability by which an employer (or any other entity) may access the national portal. Communications module 316 is also the way by which an employer (or any other entity) may make contact with a state (or any other entity), which has access to the national portal. In short, communications module 316 is also the way by which any entity may communicate with another entity through the national portal.

Figure 12:
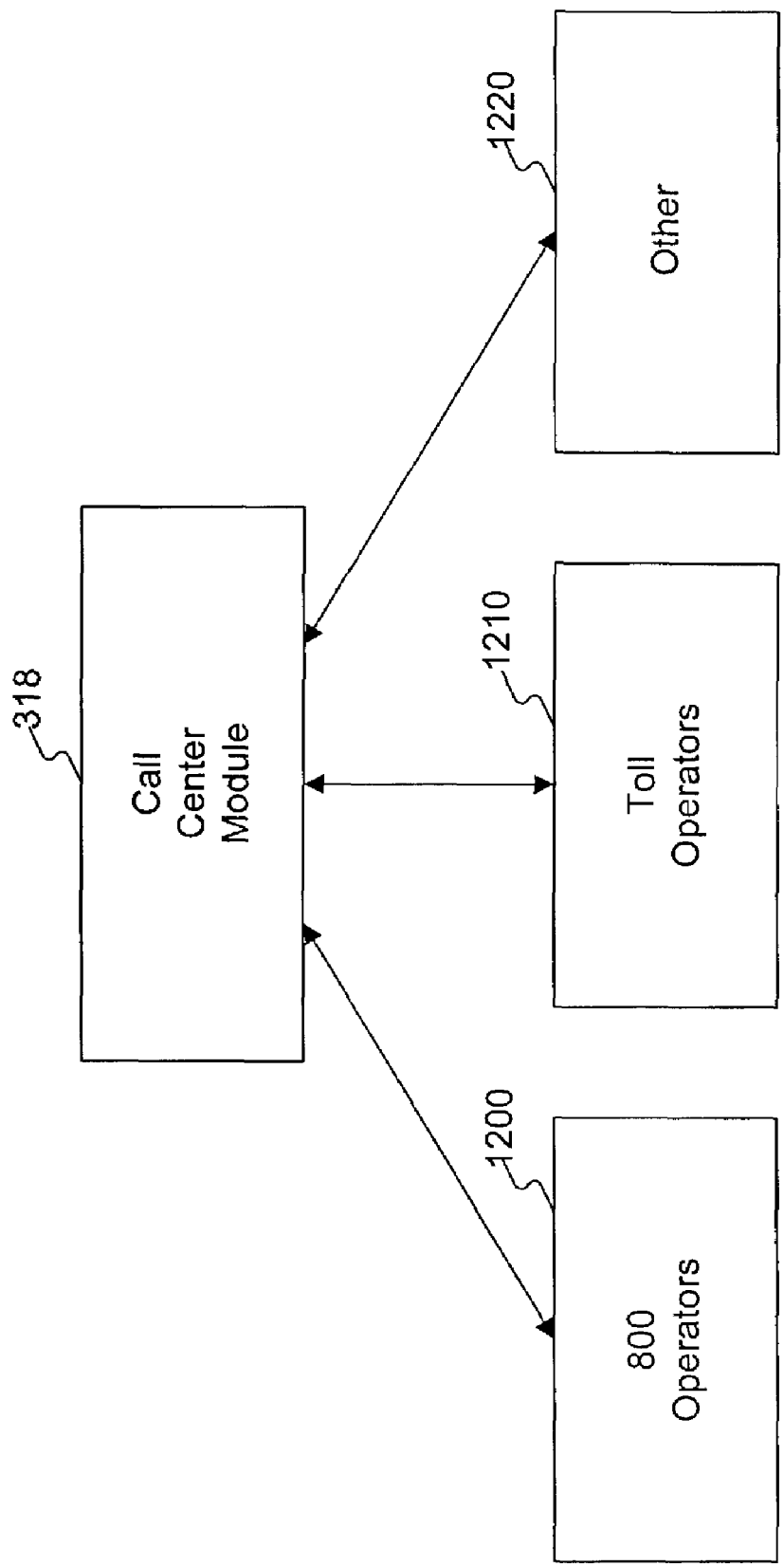
FIG. 12 is a block diagram of one embodiment of a call center module, as shown in FIG. 3.

FIG. 12 is a block diagram of one embodiment of call center module 318, as shown in FIG. 3. As shown in FIG. 12, call center 318 may include 800 operators 1200, toll operators 1210, and any other means of accessing the call center module 1220. In one embodiment, the call center module may be the customer support component of the national portal. Users of the national portal may be able to contact individuals at the national portal via the call center module. This contact may be by telephone (800 operators 1200 or toll operators 1210), by e-mail (not shown), or by any other method 1220. Services available at the call center may include registration with the national portal, obtaining information about services at the national portal, technical assistance with the use of the national portal, and other services. In one embodiment, the call center may include live individuals to answer telephones as well as pre-recorded information available to callers. Other embodiments may provide other services to users at the call center.

Figure 13:
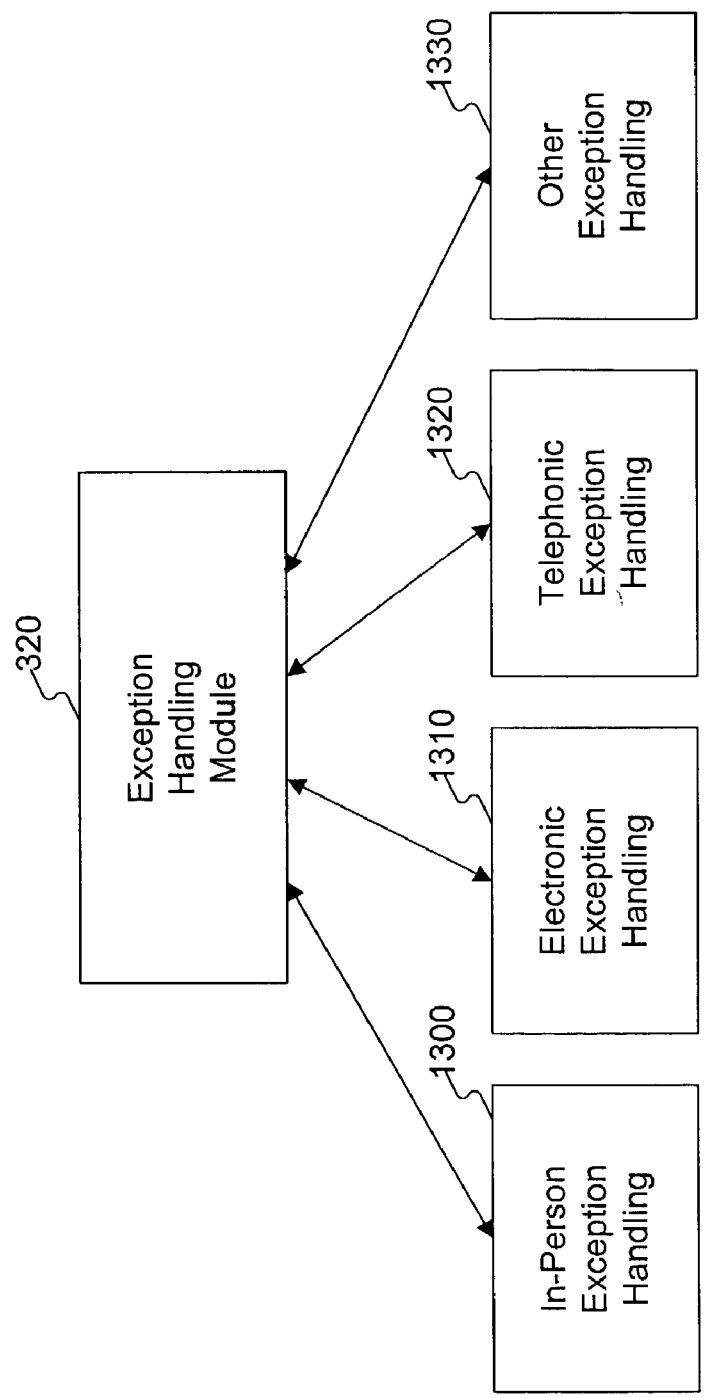
FIG. 13 is a block diagram of one embodiment of a exception handling module, as shown in FIG. 3.

FIG. 13 is a block diagram of one embodiment of exception handling module 320, as shown in FIG. 3. As shown in FIG. 13, exception handling module 320 may include in-person exception handling 1300, electronic exception handling 1310, telephonic exception handling 1320, and other exception handling 1330. In one embodiment, exception handling module 320 may be used by users of the national portal to validate transactions. If transactions initiated by users are validated, then exception handling module 320 may no longer be needed. However, if the transactions are not validated, exception handling module 320 may provide solutions for resolving the invalid transactions. These solutions may include human interaction by in-person exception handling 1300, the transmission of an e-mail to the user by electronic exception handling 1310, the initiation of a telephone call to the user by telephonic exception handling 1320, or other ways of informing the user that the transaction was rendered invalid by the exception handling module (other exception handling 1330). Exception handling module 320 may also resolve invalid transactions, after the user has contacted the national portal. Exception handling module 320 may further include other functions regarding transactions conducted through the national portal.

Figure 14:
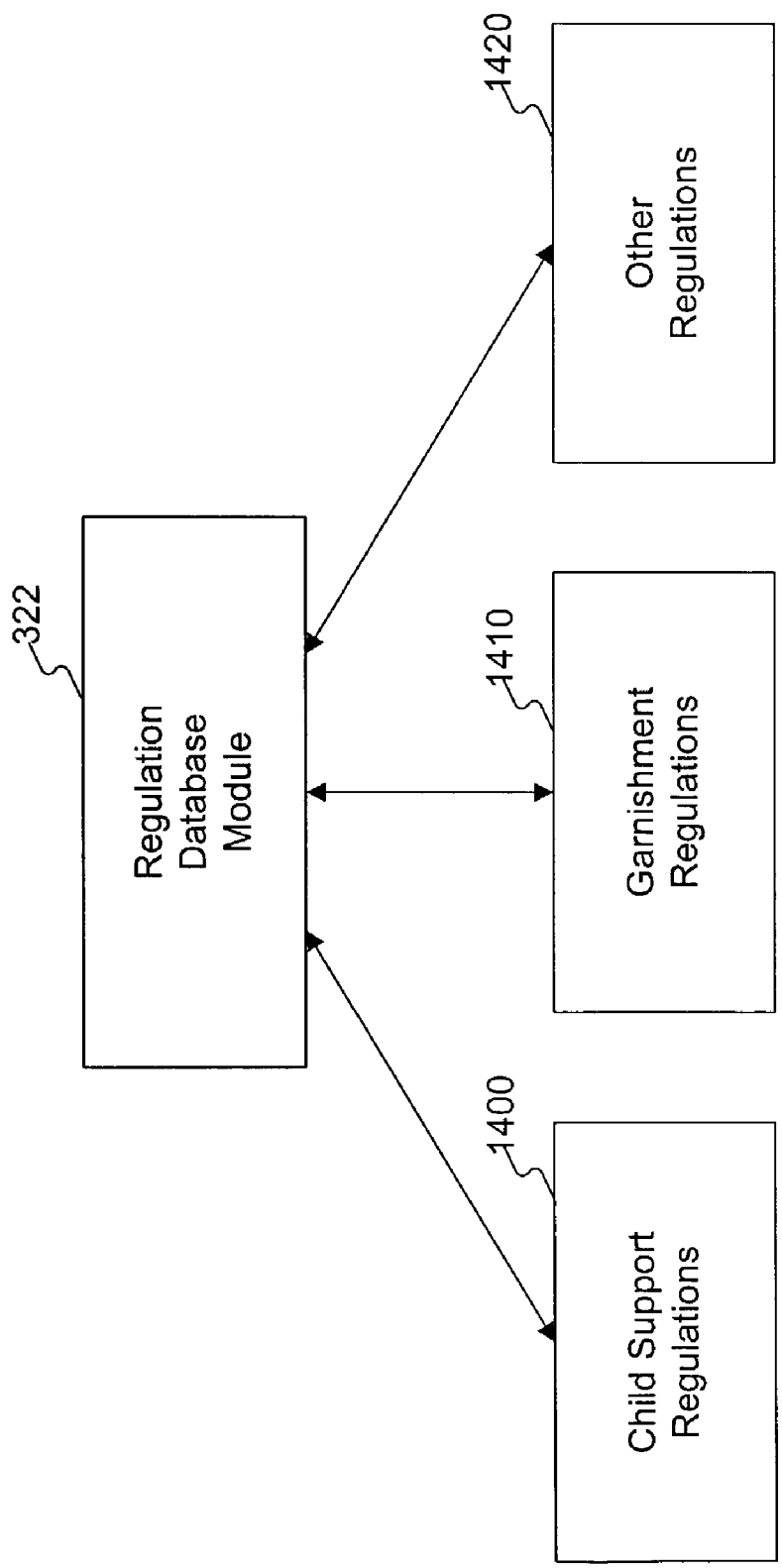
FIG. 14 is a block diagram of one embodiment of a regulation database module, as shown in FIG. 3.

FIG. 14 is a block diagram of one embodiment of regulation database module 322, as shown in FIG. 3. As shown in FIG. 14, regulation database module 322 may include child support regulations 1400, garnishment regulations 1410, and other regulations 1420. In one embodiment, regulation database module 322 may provide a source of information regarding regulations that are pertinent to the users of the national portal. For example, a user may need to access child support regulations or garnishment regulations. As users need to access other regulations, the national portal may add those regulations to regulation database module 322, as shown by other regulations. FIG. 14 shows how the national portal provides all of the information that employers (or other users) may need at one location, that location being the national portal. In one embodiment, regulation database module 322 may include regulations from government entities, such as federal regulations or state regulations. However, in other embodiments, other regulations (or even other information) may also be included within regulation database module 322.

Figure 15:
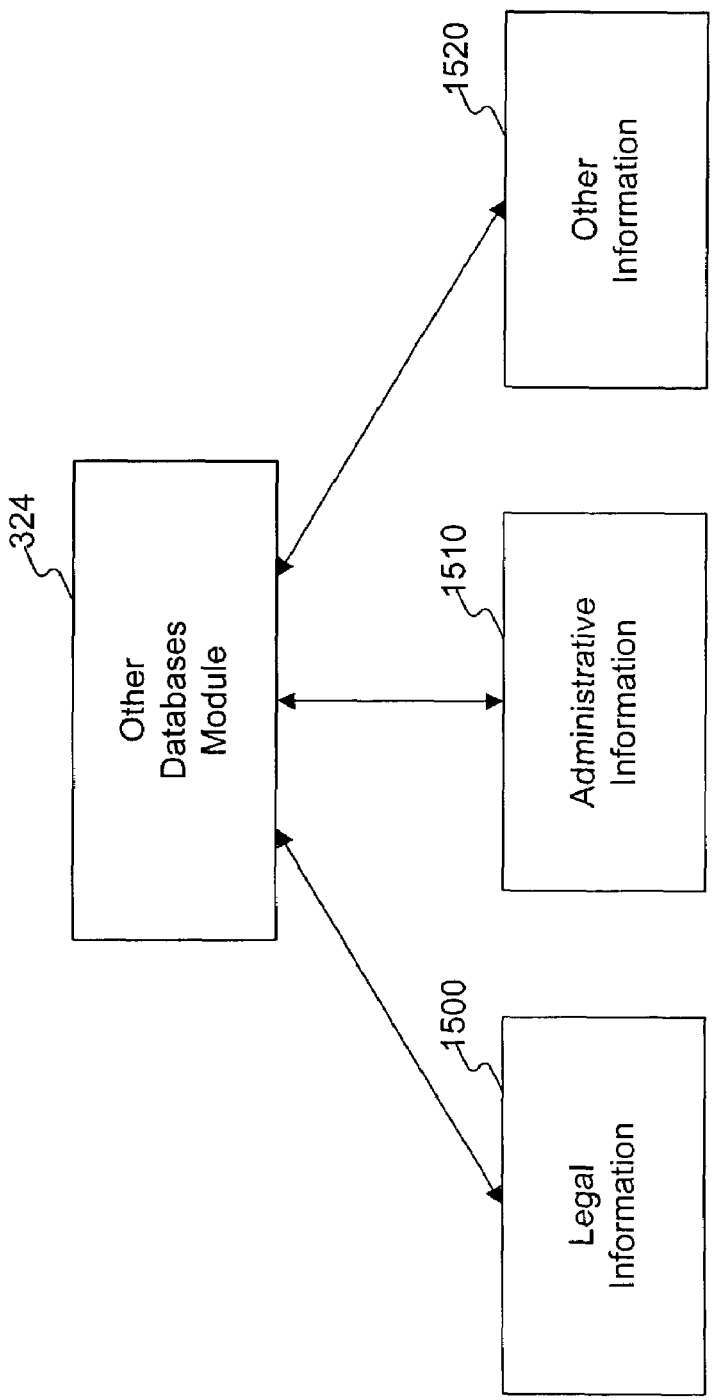
FIG. 15 is a block diagram of one embodiment of an other databases module, as shown in FIG. 3.

FIG. 15 is a block diagram of one embodiment of other databases module 324, as shown in FIG. 3. As shown in FIG. 15, other databases module 324 may include legal information 1500, administrative information 1510, and other information 1520. In one embodiment, users of the national portal may need to access information that is not available in the regulation database module, as shown in FIG. 14. Other databases module 324 may provide a source for other information, such as legal information or administrative information. Legal information 1500 may include tax information or other information. Administrative information 1510 may include department of motor vehicle information or other information. Other information 1520 may further include any type of information that would be of interest to an employer (or other user) of the national portal.

Figure 16:
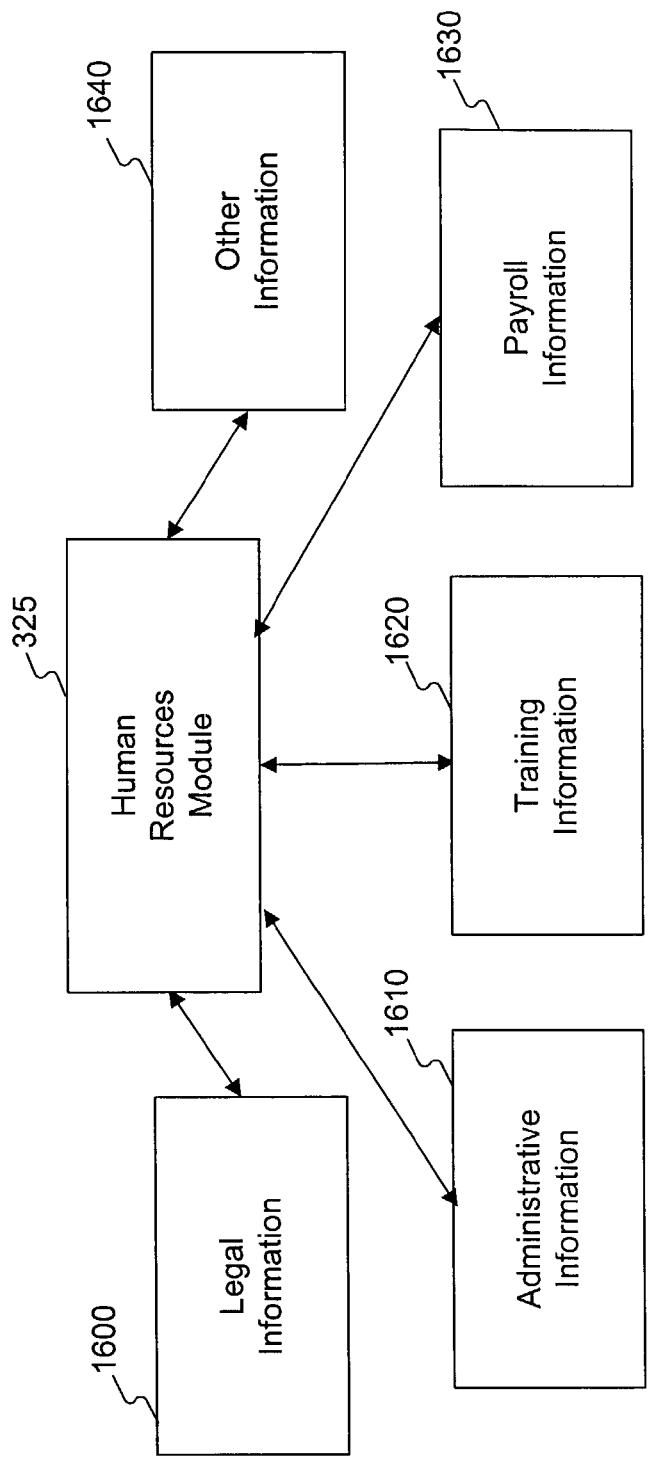
FIG. 16 is a block diagram of one embodiment of a human resources module, as shown in FIG. 3.

FIG. 16 is a block diagram of one embodiment of human resources module 325, as shown in FIG. 3. As shown in FIG. 16, human resources module 325 may include legal information 1600, administrative information 1610, training information 1620, payroll information 1630, and other information 1640. Human resources module 325 may allow employers (or other users) to update human resource information at the national portal, allowing the information uniform across various departments and readily accessible.

Legal information 1600 may include any legal information, such as information regarding employer legal rights and employee legal rights. Some information may include non-competition agreements, equal employment information, and information on protection for workers with disabilities. Administrative information 1610 may include any employee data, potential employee data, or company related data, such as employee personal data, employee evaluations, inter-department transfers, job candidate referrals, recruiting information, family leave, company functions, relocation expenses, and travel expenses. Training information 1620 may include information and materials regarding orientation, on-site training, continuing education programs, and any reimbursement for such training. Payroll information 1630 may include any information that would adjust an employee's net take-home pay, such as salary information, tax information, retirement plan contributions by employee and employer, charitable deductions by employee, and employee contributions to employer provided benefit plans including medical, dental, and vision insurance, dependant care assistance, and savings programs for college or medical expenses.

Human resources module 325 may accept legal information 1600, administrative information 1610, training information 1620, payroll information 1630, and other information 1640 and adjust an employee's paycheck accordingly. For example, based on payroll information 1630 provided to human resources 325, an employee who chooses not to receive medical and dental insurance offered by an employer may receive additional money in his paycheck representing an amount saved in insurance fees by the employer. Similarly, an employee who chooses to receive the insurance may receive a deduction in his paycheck to cover at least a portion of the cost. In yet another example, human resources module may accept administrative information 1610 and provide a bonus to employees who refer a job candidate who is subsequently hired.

Figure 17:
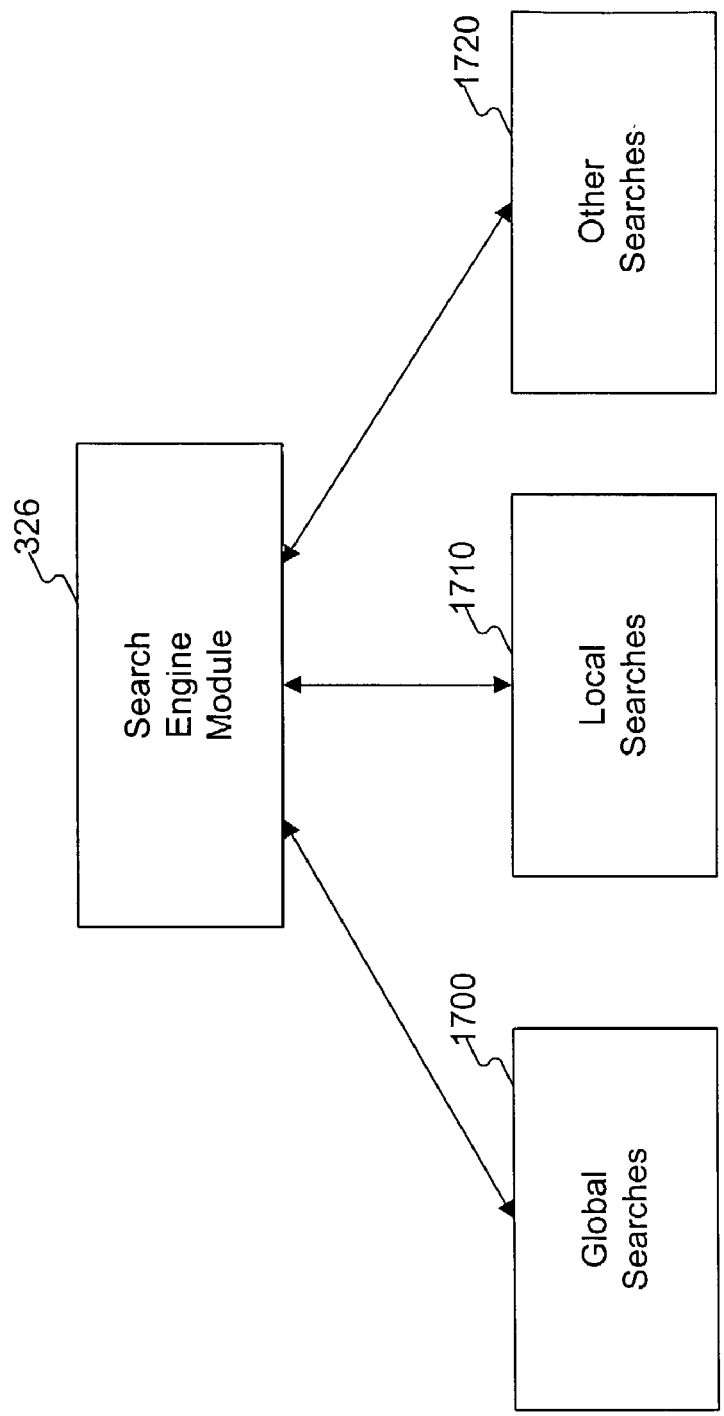
FIG. 17 is a block diagram of one embodiment of a search engine module, a shown in FIG. 3.

FIG. 17 is a block diagram of one embodiment of search engine module 326, as shown in FIG. 3. As shown in FIG. 17, search engine module 326 may include global searches 1700, local searches 1710, and other searches 1720. In one embodiment, search engine module 326 may allow an employer (or other user) to perform searches at the national portal. The searches available through the search engine module may include global searches 1700. Global searches may include searches not only done at the national portal but also searches outside of the national portal. The searches available through search engine module 326 may also include local searches 1710. Local searches 1710 may include only searches at the national portal. The searches available through the search engine module may also include other searches 1720. Other searches 1720 may include searches other than global searches 1700 or local searches 1710.

Figure 18:
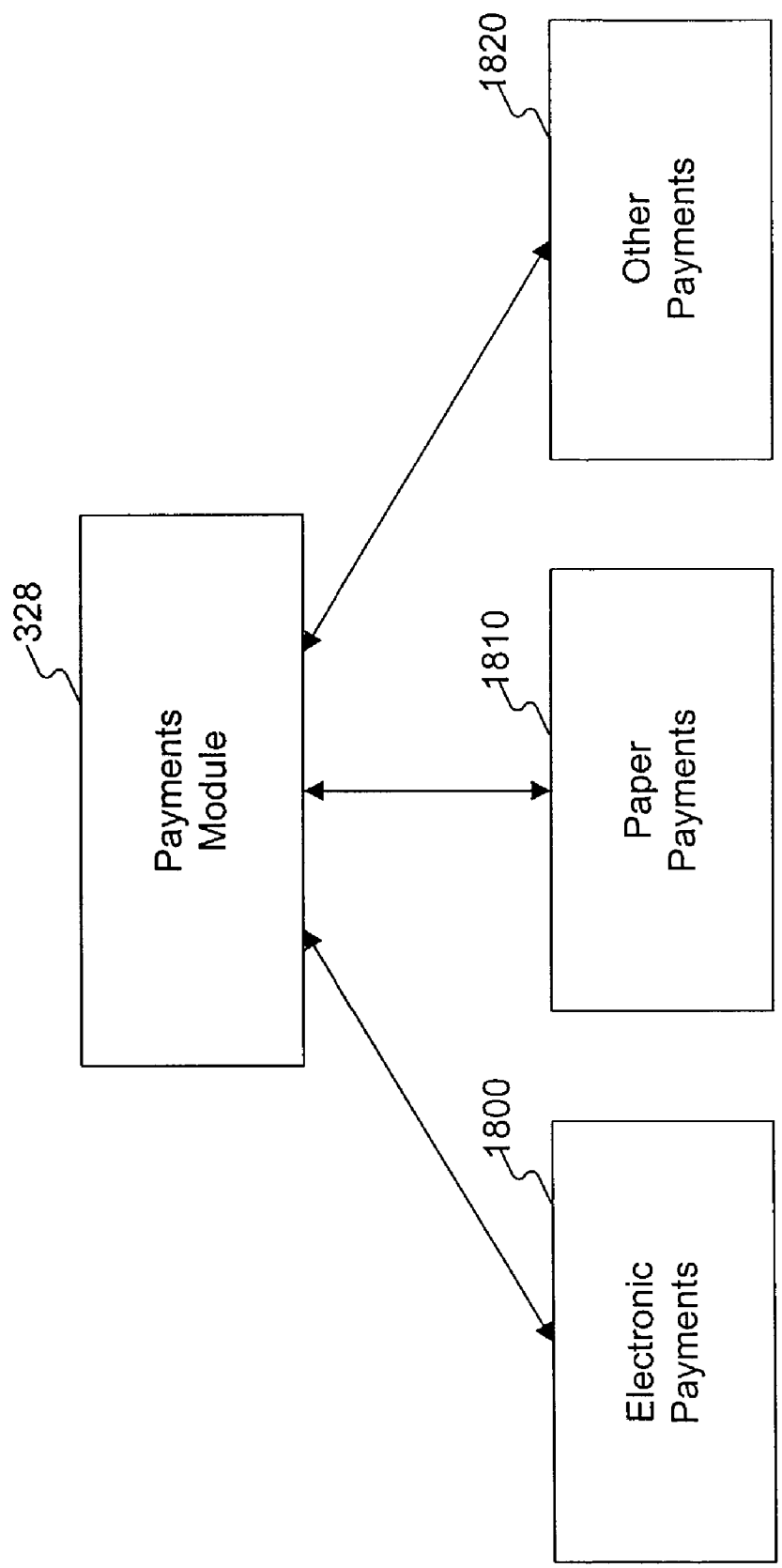
FIG. 18 is a block diagram of one embodiment of a payments module, as shown in FIG. 3.

FIG. 18 is a (block diagram of one embodiment of payments module 326, as shown in FIG. 3. As shown in FIG. 18, payments module 328 may include electronic payments 1800, paper payments 1810 and other payments 1820. In one embodiment, most payments processed by the national portal may be performed through payments module 328. These payments may be processed either electronically by electronic payments 1800, as a paper document by paper payments 1810, or by any other method by other payments 1820. Other payments 1820 may include payments by facsimile or payments by any other payment methodology. As referenced in FIGS. 6B-6C, in one embodiment, payments processed by the payments module may be either debit-based transactions or credit-based transactions. Notably, in other embodiments, payments need not necessarily be processed by the national portal.

Figure 19:
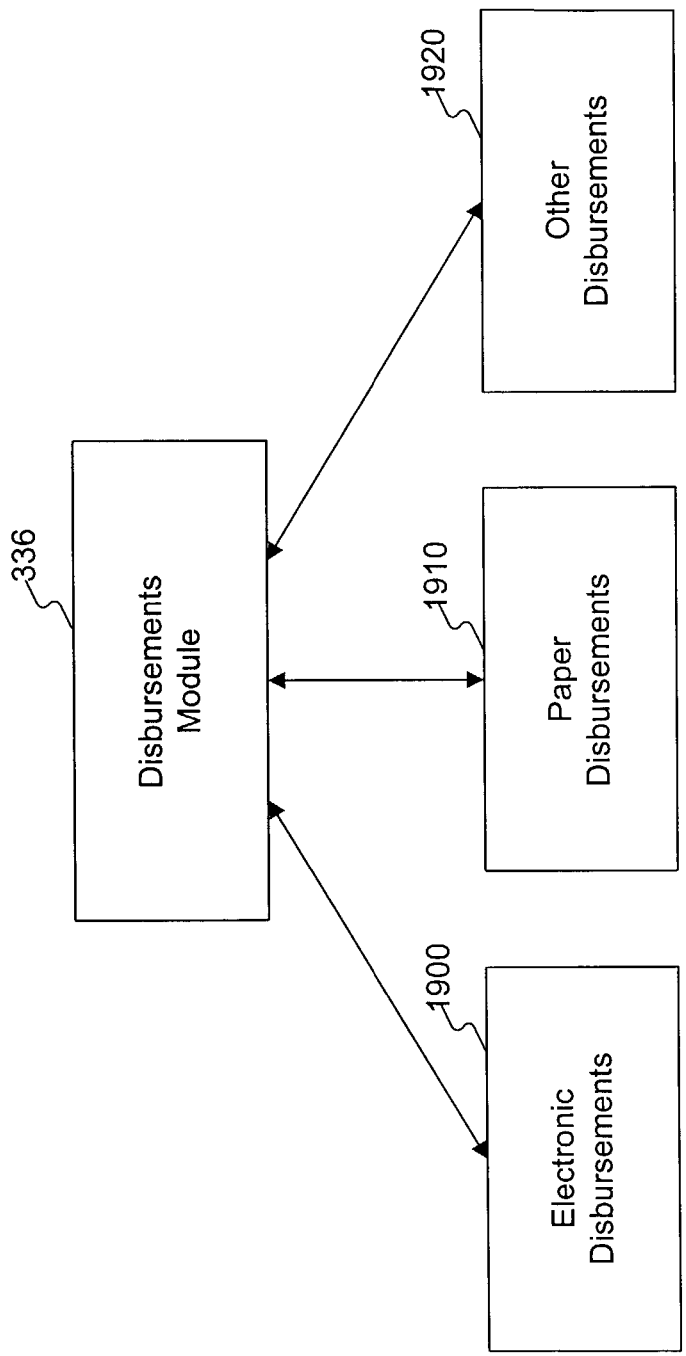
FIG. 19 is a block diagram of one embodiment of a disbursements module, as shown in FIG. 3.

FIG. 19 is a block diagram of one embodiment of disbursements module 330, as shown in FIG. 3. As shown in FIG. 19, disbursements module 330 may include electronic disbursements 1900, paper disbursements 1910, and other disbursements 1920. In one embodiment, most disbursements may be processed by disbursements module 330 as required by the employers (or other users). For example, if a child support payment must be made by the national portal, based upon an obligation owed by an employee to a custodial parent, the disbursements module may make payment to that custodial parent (or to the appropriate state for the benefit of the custodial parent). In one embodiment, disbursements module 330 may make payment either by electronic disbursements 1900 or paper disbursements 1910. Electronic disbursements 1900 may include electronic payment methods, such as electronic funds transfer (EFT). Paper disbursements 1910 may include paper-based methods, such as the transmission of a check. Other disbursements 1920 may also be used by disbursements module 330. One example of another form of disbursement includes the use of a payment card. Disbursements module 330 may issue payment cards, which have a set amount of value. These payment cards may be used to make payments to persons or entities, e.g., to persons who do not have a bank account. Notably, in other embodiments, disbursements need not necessarily be processed by the national portal.

Figure 20:
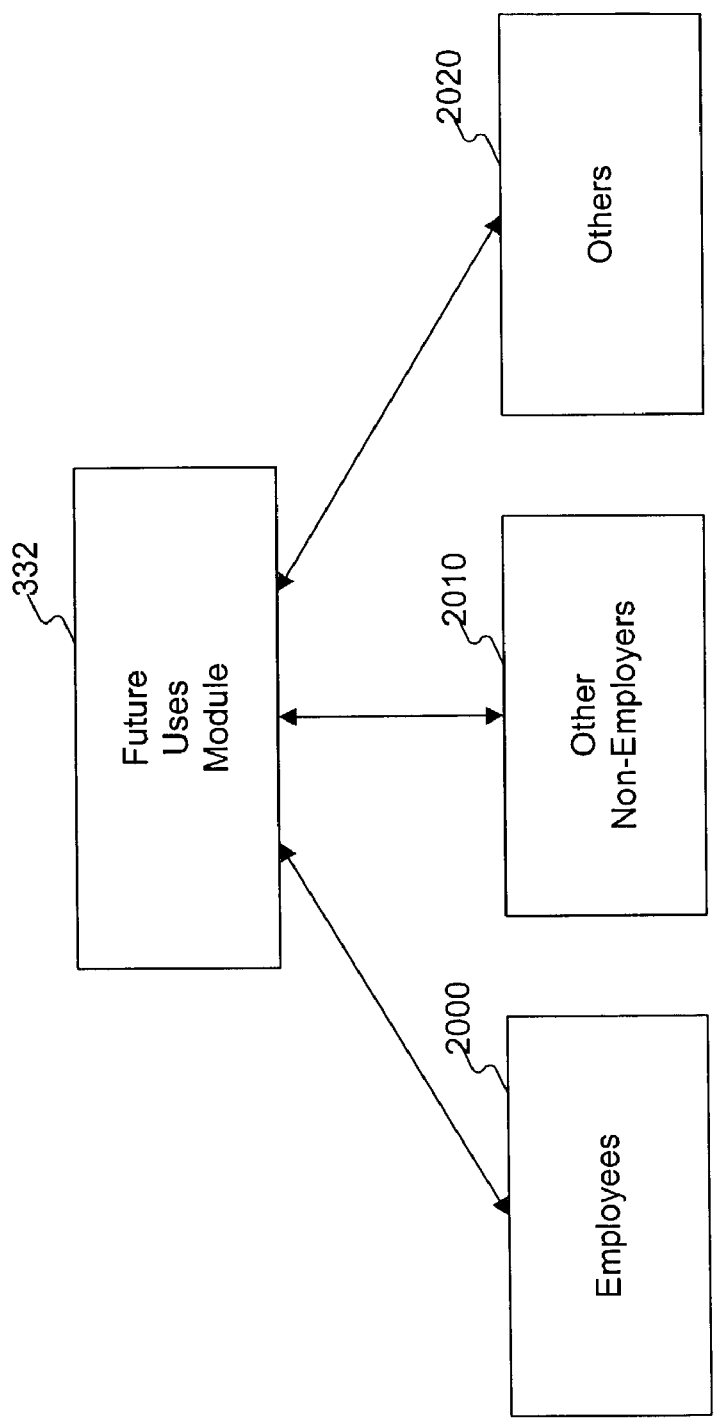
FIG. 20 is a block diagram of one embodiment of a future uses module, as shown in FIG. 3.

FIG. 20 is a block diagram of one embodiment of future uses module 332, as shown in FIG. 3. As shown in FIG. 20, future uses module 332 may include employees 2000, non-employers 2010, and others 2020. In one embodiment, the users of the national portal may include employers. In other embodiments, there may be other users or additional users, e.g., employers and states. Future uses module 332 may include the other users (or uses) for the national portal. For example, employees 2000 may use the national portal, which would be incorporated into future uses module 332. Similarly, other non-employers 2010 may use the national portal, which would also be included in future uses module 332. Still other users or uses 2020 of the national portal may also be included in future uses module 332. Other uses 2020 of the national portal may include any services other than those listed in FIG. 2C.

Processes

Figure 21A:
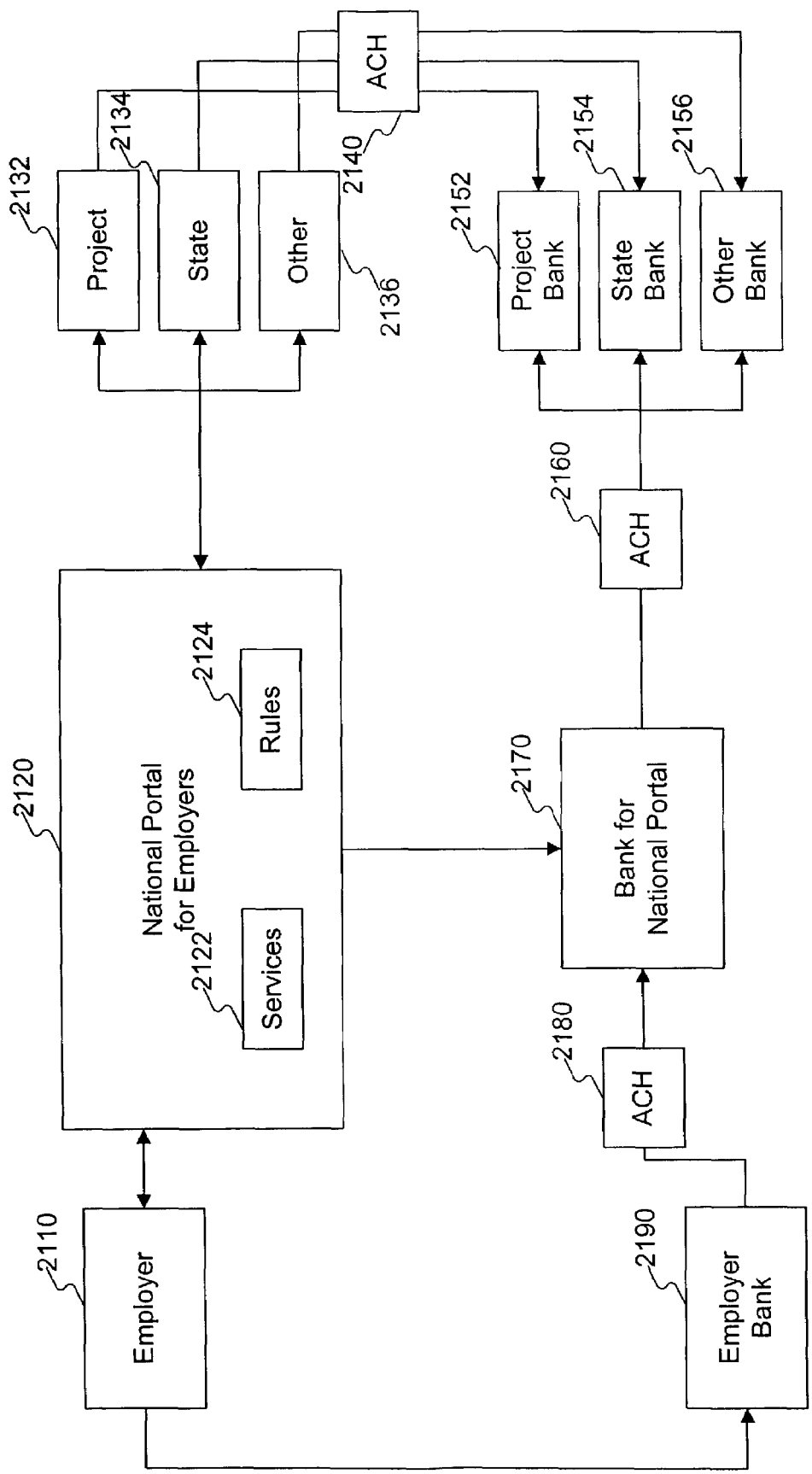
FIG. 21A is a block diagram of one embodiment of a national portal for employers with financial institutions.

FIG. 21A is a block diagram of one embodiment of a national portal for employers with financial institutions. As shown in FIG. 21A, an employer 2110 may access a national portal for employers 2120 for services needed by the employer. The national portal for employers may include services 2122 and rules 2124. Services 2122 may include the services that are available at the national portal for employers 2120, and rules 2124 may includes the rules that limit the services that are available by the national portal for employers.

Examples of services are shown in FIG. 2C. Examples of rules include the rules for certain payments or financial transactions. One example of rules would include those set by the National Automated Clearing House Association (NACHA), which pertain to the electronic transfer of funds from one entity to another through an ACH. Another example of rules includes the rules pertaining to the American National Standards Institute (ANSI). Another example of rules pertains to the rules for payment order remittance (standard 521 for liens and garnishments). Another examples of rules includes the rules for new hiring reporting (standard 540). The invention includes any type of rules.

As shown in FIG. 21A, national portal for employers 2120 may interact with project 2132, state 2134, and other 2136. Project 2132 may include any project (or any application or any other type of services) that an employer may need to be performed. State 2134 may include any state that may need information from an employer (or that may need to provide information to an employer). Other 2134 may include any interaction with an employer which is different from the interaction needed by project 2132 or state 2134. Project 2132, state 2134, and other 2136 may also interact with a respective bank for financial transactions. For example, for the financial transactions, the processing may include the transfer of data from a source to a bank through an automated clearing house. Thus, project 2132 may connected to project bank 2152 via an ACH 2140, state 2134 may be connected to state bank 2154 via ACH 2140, and other 2136 may be connected to other bank 2156 via ACH 2140.

For financial transactions, the employer may also be connected to an employer bank 2190. Employer 2110 may interact with employer bank 2190 directly (shown) or via an ACH (not shown). Similarly, national portal for employers 2120 may also be connected to a bank for national portal 2170. National portal for employers 2120 may interact directly with bank for national portal 2170 (shown) or via an ACH (not shown). Thus, as shown in FIG. 21A, if employer 2110 needs to make a payment to the national portal for employers 2120, employer 2110 may make that payment through employer bank 2190, which then makes the payment to bank for national portal 2170 via an ACH 2180. Bank for national portal 2170 may then forward the payment to the proper recipient via an ACH 2160, such as to project bank 2152, to state bank 2154, or to other bank 2156.

Figure 21B:
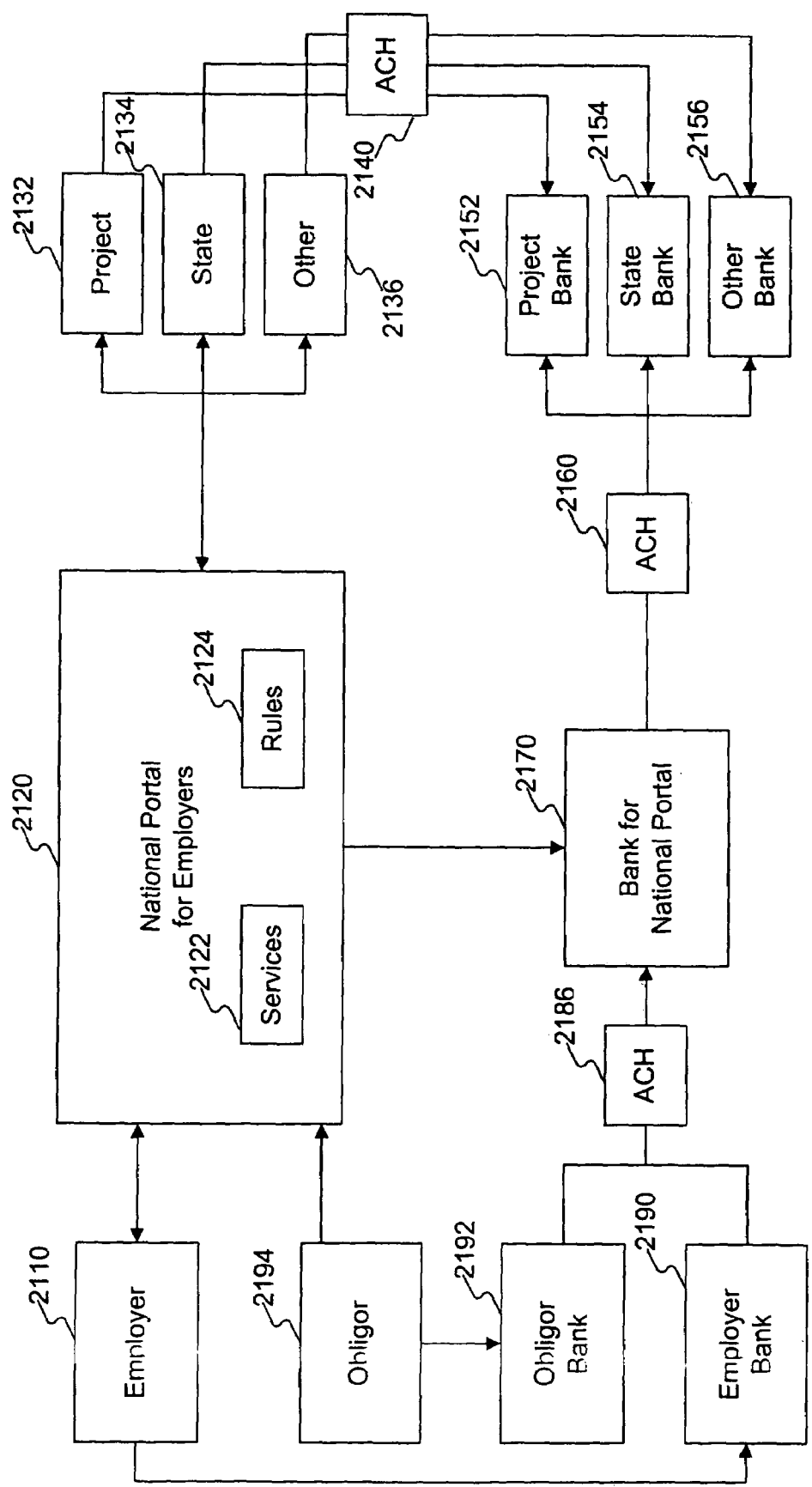
FIG. 21B is a block diagram of another embodiment of a national portal for employers with financial institutions.

FIG. 21B is a block diagram of another embodiment of a national portal for employers with financial institutions. As shown in FIG. 21B, the national portal for employers is similar to that shown in FIG. 21A, except FIG. 21B additionally includes an obligor 2194 and obligor bank 2192. Obligor 2194 may be any entity other than an employer (such as an employee, or even a state or other entity) that establishes a financial transaction through national portal for employers 2120. Thereafter, national portal for employers 2120 may process the transaction as described in FIG. 21A.

Figure 22A:
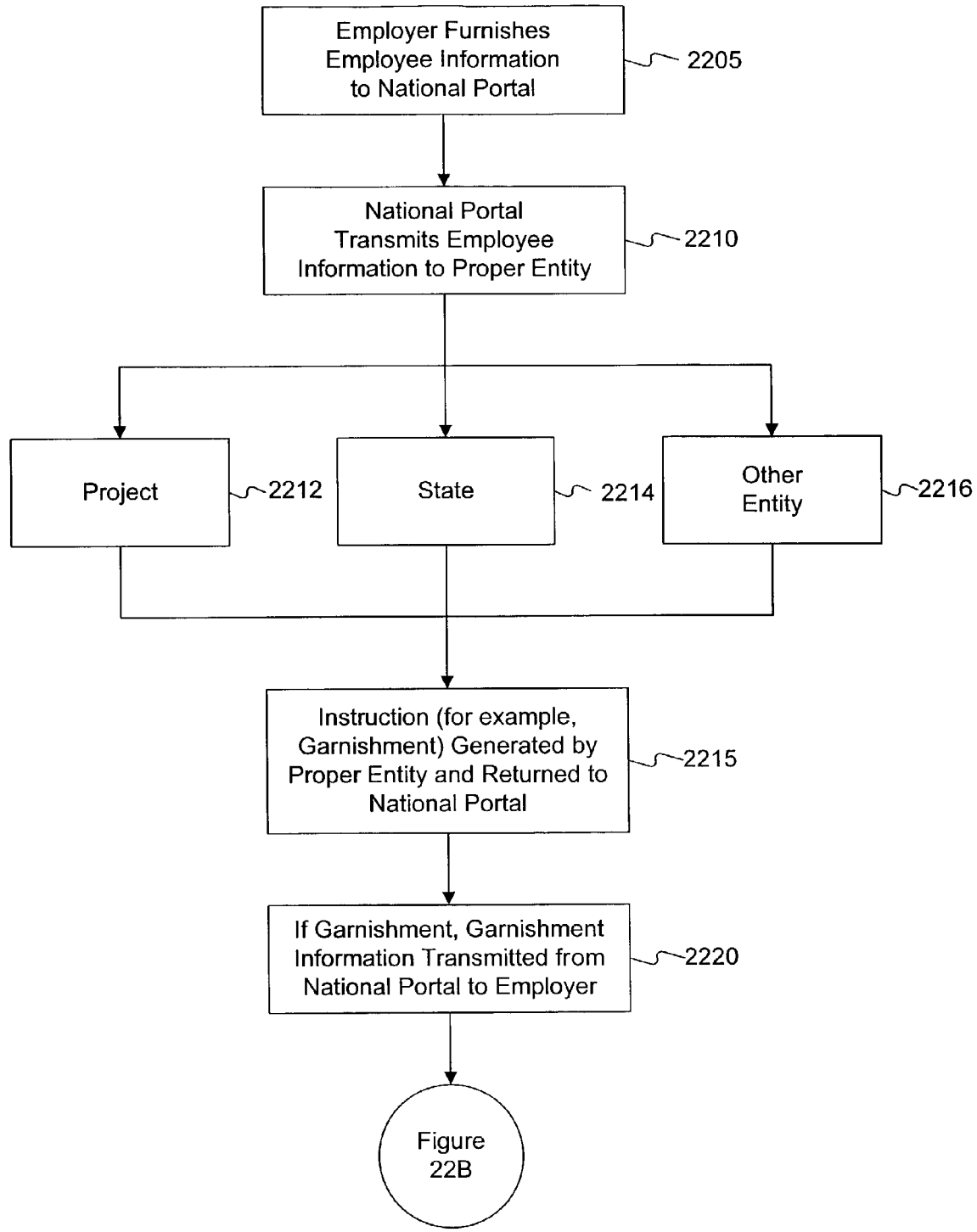
FIGS. 22A and 22B are exemplary flow charts of the operation of a national portal for employers with financial institutions consistent with one embodiment of the present invention, as shown in FIG. 21A.
Figure 22B:
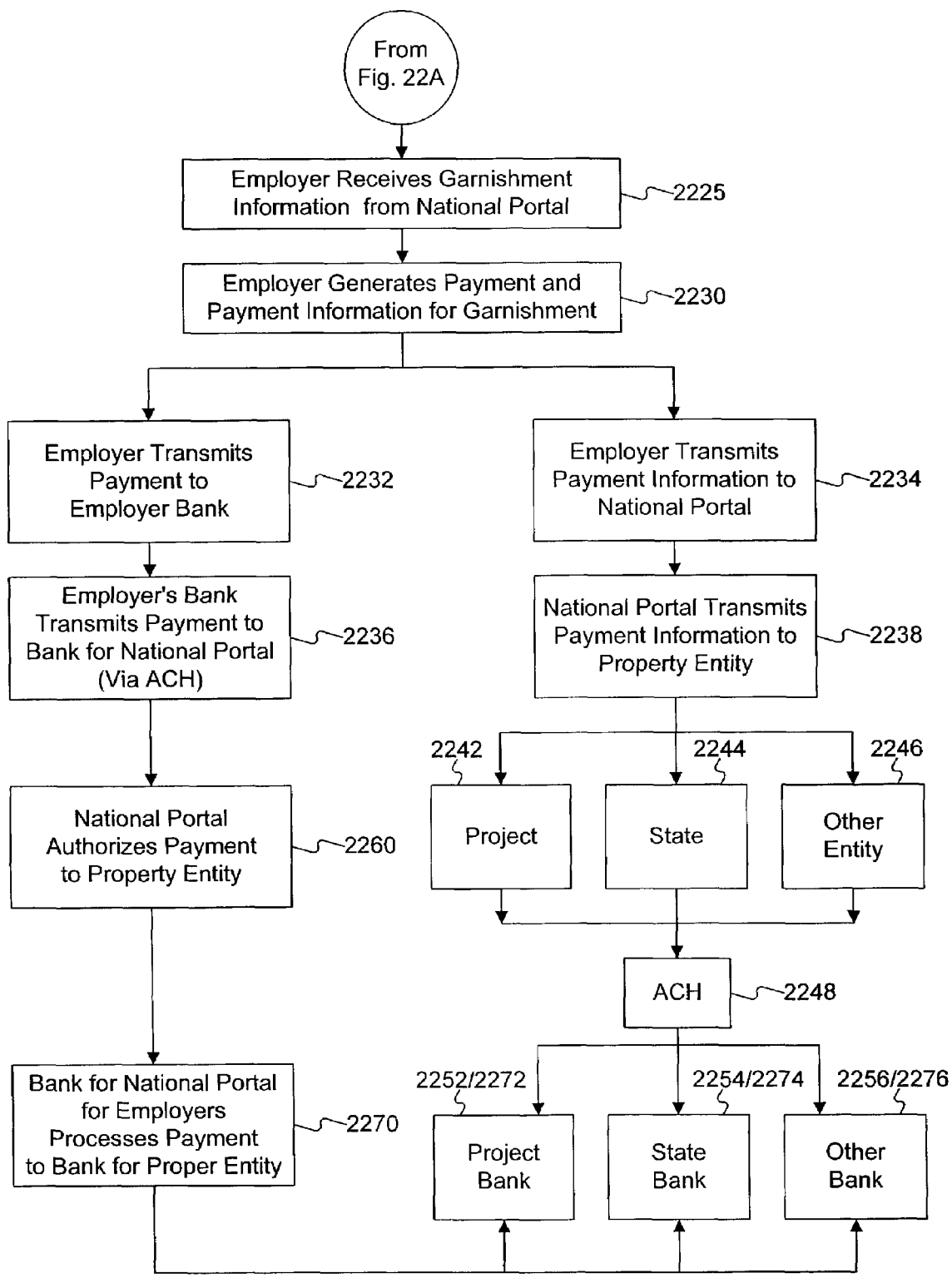

FIGS. 22A-22B are exemplary flow charts of the operation of a national portal for employers with financial institutions consistent with one embodiment of the present invention, as shown in FIG. 21A. As shown in FIG. 22A, the operation of a national portal for employers includes a number of steps. The steps depicted in FIG. 22A are only one example of one embodiment of the operation of the national portal. Other methodologies for the operation of the national portal (not depicted) are also within the scope of the present invention, examples of which are illustrated in part by FIGS. 1-21.

As shown in FIG. 22A, the employer first furnishes employee information to the national portal (step 2205). This employee information may include new hire information, information regarding an employee obligation, or any other information. The national portal then transfers the employee information to the proper entity (step 2210). The proper entity to receive the employee information depends on the information. For example, step 2210 may include sending the information to the project (step 2212), to the state (step 2214), or the other entity (step 2216). Once the employee information has been transmitted from the national portal to the project, state, or other entity, an instruction is generated by the proper entity and returned to the national portal (step 2215). An example of an instruction would be a garnishment against a salary of the employee. The instruction is then transferred from the national portal to the employer (step 2220).

As shown in FIG. 22B, after the national portal has transferred the instruction to the employer, the employer receives the information e.g., garnishment information (step 2225). The employer then generates a payment and payment information for the instruction (step 2230). The employer then transmits the payment to the employer bank (step 2232), and then, the employer bank transmits the payment to the bank for the national portal via an ACH (step 2236). The employer also transmits the payment information to the national portal (step 2234), and then, the national portal transmits the payment information to the proper entity (step 2238). In transmitting the payment information to the proper entity, the national portal transmits the payment information either to the project (step 2242), the state (step 2244), or the other entity (step 2246). The payment information is then transferred via an ACH (step 2248). Finally, the payment information is transferred to the proper bank for the proper entity, either project bank (step 2252), state bank (step 2254), other bank (step 2256).

Following the transmission of the payment information from the national portal to the proper entity, the payment is then processed by the national portal, when the national portal authorizes the payment to be made to the proper entity (step 2260). When the national portal authorizes payment to the proper entity, the national portal informs the bank for national portal that the payment is authorized. The bank for national portal then processes the payment to the bank for the proper entity (step 2270). In this step, the bank for national portal sends the payment either to a project bank (step 2272), a state bank (step 2274), or other bank (step 2276).

Notably, as described in more detail above, payment processing according to the invention may occur by debit-based processing or by credit-based processing. Additionally, the order of any of these steps may be changed without departing from the scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing electronic services to employers via a national portal in communication with an employer, a reporting agency, and a state, comprising:
   receiving information regarding a newly-hired employee from the employer at the national portal;
   automatically submitting the information regarding the newly-hired employee by the national portal to the reporting agency based on the newly-hired employee;
   receiving an employee financial obligation corresponding to the newly-hired employee from the employer at the national portal for processing;
   processing, using a computer processor, the financial obligation at the national portal;
   electronically communicating with the state regarding the financial obligation; and
   collecting the financial obligation at the national portal for the employer.

2. The method of claim 1, wherein processing the financial obligation includes processing financial information as a debit transaction.

3. The method of claim 1, wherein processing the financial obligation includes processing financial information as a credit transaction.

4. The method of claim 1, wherein processing the financial obligation includes processing financial information as either a debit or credit transaction.

5. The method of claim 1, wherein the financial obligation includes an electronic payment.

6. The method of claim 1, further comprising disbursing the financial obligation to a third party.

7. The method of claim 6, wherein the employee financial obligation comprises a child support payment and the third party comprises a custodial parent.

8. The method of claim 6, wherein disbursing comprises disbursing an electronic disbursement.

9. A system for providing electronic services to employers via a national portal in communication with an employer, a reporting agency, and a state, comprising:
   a receiving component for receiving information regarding a newly-hired employee and an employee financial obligation corresponding to the newly-hired employee from the employer at the national portal for processing;
   a processor for automatically submitting the information regarding the newly-hired employee by the national portal to the reporting agency based on the newly-hired employee and for processing the financial obligation;
   a communication component for electronically communicating with the state regarding the financial obligation; and
   a collection component for collecting the financial obligation at the national portal for the employer.

10. The system of claim 9, wherein the processor processes financial information as a debit transaction.

11. The system of claim 9, wherein the processor processes financial information as a credit transaction.

12. The system of claim 9, wherein the processor processes financial information as either a debit or credit transaction.

13. The system of claim 9, wherein the financial obligation includes an electronic payment.

14. The system of claim 9, further comprising a disbursement component for disbursing the financial obligation to a third party.

15. The system of claim 14, wherein the employee financial obligation comprises a child support payment and the third party comprises a custodial parent.

16. The system of claim 14, wherein the disbursement component disburses an electronic disbursement.

17. A system for providing electronic services to employers via a national portal in communication with an employer, a reporting agency, and a state, comprising:
   means for receiving information regarding a newly-hired employee from the employer at the national portal;
   means for automatically submitting the information regarding the newly-hired employee by the national portal to the reporting agency based on the newly-hired employee;
   means for receiving an employee financial obligation corresponding to the newly-hired employee from the employer at the national portal for processing;
   means for processing the financial obligation at the national portal;
   means for electronically communicating with the state regarding the financial obligation; and
   means for collecting the financial obligation at the national portal for the employer.

18. A computer program product for providing electronic services to employers via a national portal in communication with an employer, a reporting agency, and a state, the computer program product comprising the following computer-readable program code for effecting actions in a computing platform:
   program code for receiving information regarding a newly-hired employee and an employee financial obligation corresponding to the newly-hired employee from the employer at the national portal for processing;
   program code for automatically submitting the information regarding the newly-hired employee by the national portal to the reporting agency based on the newly-hired employee and for processing the financial obligation;
   program code for electronically communicating with the state regarding the financial obligation; and
   program code for collecting the financial obligation at the national portal for the employer.

* * * * *